US007438973B2

(12) United States Patent
Geddes et al.

(10) Patent No.: US 7,438,973 B2
(45) Date of Patent: *Oct. 21, 2008

(54) THERMAL TRANSFER ASSEMBLY FOR CERAMIC IMAGING

(75) Inventors: Pamela A. Geddes, Alden, NY (US); Barry J. Briggs, Baldwinsville, NY (US); Daniel J. Harrison, Pittsford, NY (US)

(73) Assignee: International Imaging Materials, Inc., Amherst, NY (US)

( * ) Notice: Subject to any disclaimer, the term of this patent is extended or adjusted under 35 U.S.C. 154(b) by 328 days.

This patent is subject to a terminal disclaimer.

(21) Appl. No.: 11/074,155

(22) Filed: Mar. 7, 2005

(65) Prior Publication Data

US 2005/0150412 A1 Jul. 14, 2005

Related U.S. Application Data

(63) Continuation of application No. 10/621,976, filed on Jul. 17, 2003, now Pat. No. 6,990,904, which is a continuation-in-part of application No. 10/265,013, filed on Oct. 4, 2002, now Pat. No. 6,766,734, which is a continuation-in-part of application No. 10/080,783, filed on Feb. 22, 2002, now Pat. No. 6,722,271, which is a continuation-in-part of application No. 09/961,493, filed on Sep. 22, 2001, now Pat. No. 6,629,792, which is a continuation-in-part of application No. 09/702,415, filed on Oct. 31, 2000, now Pat. No. 6,481,353.

(51) Int. Cl.
*B32B 18/00* (2006.01)

(52) U.S. Cl. .................... 428/325; 428/195.1; 428/432; 501/11; 501/14; 501/17

(58) Field of Classification Search .............. 428/32.51, 428/195.1, 325, 432; 156/235, 277, 279, 156/283, 284; 252/519.1, 520; 501/11, 14, 501/17
See application file for complete search history.

(56) References Cited

U.S. PATENT DOCUMENTS

| | | | |
|---|---|---|---|
| 3,614,241 | A | 10/1971 | Sanford |
| 3,898,362 | A | 8/1975 | Blanco |
| 3,899,346 | A | 8/1975 | Ferrigno |
| 3,956,558 | A | 5/1976 | Blanco |
| 4,087,343 | A | 5/1978 | Custer |

(Continued)

FOREIGN PATENT DOCUMENTS

| | | | |
|---|---|---|---|
| EP | 576128 | A1 | 12/1993 |

(Continued)

*Primary Examiner*—Callie Shosho
*Assistant Examiner*—David J Joy
(74) *Attorney, Agent, or Firm*—Howard J. Greenwald

(57) ABSTRACT

A thermal transfer assembly that comprises a thermal transfer ribbon and a covercoated transfer sheet. The thermal transfer ribbon includes a support and a ceramic ink layer. The ceramic ink layer is present at a coating weight of from about 2 to about 15 grams per square meter, and it includes from about 15 to about 94.5 percent of a solid carbonaceous binder, and at least one of a film-forming glass frit, an opacifying agent and a colorant (at a combined level for the film forming glass frit, the opacifying agent and the colorant of at least 0.5 weight percent).

30 Claims, 40 Drawing Sheets

U.S. PATENT DOCUMENTS

| | | | |
|---|---|---|---|
| 4,125,411 | A | 11/1978 | Lyons |
| 4,131,591 | A | 12/1978 | MacFarlane, Jr. |
| 4,154,899 | A | 5/1979 | Hershey |
| 4,304,700 | A | 12/1981 | Shimp |
| 4,389,445 | A | 6/1983 | Yoshida |
| 4,396,393 | A | 8/1983 | Schaetzer |
| 4,402,704 | A | 9/1983 | Raisin |
| 4,405,727 | A | 9/1983 | Brownscombe |
| 4,465,797 | A | 8/1984 | Brownscombe |
| 4,481,352 | A | 11/1984 | McConnell |
| 4,497,851 | A | 2/1985 | de Vroom |
| 4,532,525 | A | 7/1985 | Takahashi |
| 4,536,218 | A | 8/1985 | Ganho |
| 4,544,761 | A | 10/1985 | Taylor |
| 4,548,801 | A | 10/1985 | Nagai |
| 4,873,078 | A | 10/1989 | Edmundson |
| 4,891,768 | A | 1/1990 | Willems |
| 4,895,516 | A | 1/1990 | Hulten |
| 4,955,056 | A | 9/1990 | Stentiford |
| 4,977,013 | A | 12/1990 | Ritchie |
| 5,012,522 | A | 4/1991 | Lambert |
| 5,024,705 | A | 6/1991 | Cahill |
| 5,032,449 | A | 7/1991 | af Strom |
| 5,040,232 | A | 8/1991 | Kanno |
| 5,047,952 | A | 9/1991 | Kramer |
| 5,059,964 | A | 10/1991 | Bateman |
| 5,062,714 | A | 11/1991 | Peterson |
| 5,069,954 | A | 12/1991 | Cole |
| 5,076,990 | A | 12/1991 | Kitamura |
| 5,093,306 | A | 3/1992 | Mukoyoshi |
| 5,100,181 | A | 3/1992 | Nathans |
| 5,104,722 | A | 4/1992 | Kojima |
| 5,118,183 | A | 6/1992 | Cargill |
| 5,121,636 | A | 6/1992 | Seiter |
| 5,124,187 | A | 6/1992 | Aeschbacher |
| 5,132,104 | A | 7/1992 | Yamamoto |
| 5,132,165 | A | 7/1992 | Blanco |
| 5,139,815 | A | 8/1992 | Patterson |
| 5,153,250 | A | 10/1992 | Sinclair |
| 5,194,124 | A | 3/1993 | Leary |
| 5,196,131 | A | 3/1993 | Baumgartner |
| 5,209,903 | A | 5/1993 | Kanamori |
| 5,227,283 | A | 7/1993 | Mori |
| 5,229,201 | A | 7/1993 | Blanco |
| 5,231,127 | A | 7/1993 | Kroenke |
| 5,237,655 | A | 8/1993 | Statt |
| 5,242,614 | A | 9/1993 | Baumgartner |
| 5,264,933 | A | 11/1993 | Rosser |
| 5,270,012 | A | 12/1993 | Kanamori |
| 5,271,990 | A | 12/1993 | Kronzer |
| 5,282,269 | A | 1/1994 | Willems |
| 5,319,475 | A | 6/1994 | Kay |
| 5,328,535 | A | 7/1994 | Blanco |
| 5,339,737 | A | 8/1994 | Lewis |
| 5,364,828 | A | 11/1994 | Cox |
| 5,389,129 | A | 2/1995 | Jordan |
| 5,397,634 | A | 3/1995 | Cahill |
| 5,412,449 | A | 5/1995 | Lam |
| 5,415,935 | A | 5/1995 | Pankratz |
| 5,437,720 | A | 8/1995 | Cox |
| 5,443,989 | A | 8/1995 | Alvarez |
| 5,447,782 | A | 9/1995 | Inaba |
| 5,451,559 | A | 9/1995 | Smith |
| 5,457,628 | A | 10/1995 | Theyanayagam |
| 5,460,935 | A | 10/1995 | Toya |
| 5,471,252 | A | 11/1995 | Iu |
| 5,476,894 | A | 12/1995 | Huber |
| 5,487,338 | A | 1/1996 | Lewis |
| 5,525,403 | A | 6/1996 | Kawabata |
| 5,525,571 | A | 6/1996 | Hosoi |
| 5,536,595 | A | 7/1996 | Inkmann |
| 5,536,627 | A | 7/1996 | Wang |
| 5,543,231 | A | 8/1996 | Kidon |
| 5,560,983 | A | 10/1996 | Ishida |
| 5,561,475 | A | 10/1996 | Jung |
| 5,562,748 | A | 10/1996 | Huber |
| 5,569,347 | A | 10/1996 | Obata |
| 5,573,693 | A | 11/1996 | Lorence |
| 5,585,555 | A | 12/1996 | McRae |
| 5,597,638 | A | 1/1997 | Saito |
| 5,601,675 | A | 2/1997 | Hoffmeyer |
| 5,601,916 | A | 2/1997 | Yamazaki |
| 5,602,202 | A | 2/1997 | Groves |
| 5,605,964 | A | 2/1997 | Groves |
| 5,623,010 | A | 4/1997 | Groves |
| 5,631,057 | A | 5/1997 | Sundet |
| 5,645,635 | A | 7/1997 | Behl |
| 5,654,093 | A | 8/1997 | Kidon |
| 5,656,360 | A | 8/1997 | Faykish |
| 5,657,516 | A | 8/1997 | Berg |
| 5,665,462 | A | 9/1997 | Dewar |
| 5,665,472 | A | 9/1997 | Tanaka |
| 5,672,428 | A | 9/1997 | Muschelweicz |
| 5,677,376 | A | 10/1997 | Groves |
| 5,693,397 | A | 12/1997 | Saito |
| 5,702,520 | A | 12/1997 | Boaz |
| 5,716,717 | A | 2/1998 | Yeung |
| 5,716,900 | A | 2/1998 | Kronzer |
| 5,728,442 | A | 3/1998 | Noguchi |
| 5,761,595 | A | 6/1998 | Tarnawskyj et al. |
| 5,774,357 | A | 6/1998 | Hoffberg |
| 5,776,280 | A | 7/1998 | Puckett |
| 5,777,014 | A | 7/1998 | Hopper |
| 5,779,784 | A | 7/1998 | Eadon |
| 5,780,154 | A | 7/1998 | Okano |
| 5,795,501 | A | 8/1998 | Kano |
| 5,802,589 | A | 9/1998 | Brady |
| 5,807,632 | A | 9/1998 | Pedginski |
| 5,820,991 | A | 10/1998 | Cabo |
| 5,824,395 | A | 10/1998 | Zemel |
| 5,830,364 | A | 11/1998 | Bleakley |
| 5,830,529 | A | 11/1998 | Ross |
| 5,838,758 | A | 11/1998 | Krug |
| 5,844,682 | A | 12/1998 | Kiyomoto |
| 5,866,236 | A | 2/1999 | Faykish |
| 5,875,108 | A | 2/1999 | Hoffberg |
| 5,882,753 | A | 3/1999 | Pedginski |
| 5,891,294 | A | 4/1999 | Shih |
| 5,891,476 | A | 4/1999 | Reo |
| 5,895,511 | A | 4/1999 | Tikhonova |
| 5,895,542 | A | 4/1999 | Wadzinski |
| 5,897,885 | A | 4/1999 | Petticrew |
| 5,912,064 | A | 6/1999 | Azuma |
| 5,916,399 | A | 6/1999 | Olsen |
| 5,928,783 | A | 7/1999 | Phan |
| 5,931,000 | A | 8/1999 | Turner |
| 5,944,931 | A | 8/1999 | Cranford |
| 5,961,454 | A | 10/1999 | Kooy |
| 5,962,152 | A | 10/1999 | Nakamura |
| 5,965,244 | A | 10/1999 | Tang |
| 5,968,856 | A | 10/1999 | Schweiger |
| 5,977,263 | A | 11/1999 | Phillips |
| 5,981,058 | A | 11/1999 | Shih |
| 5,985,076 | A | 11/1999 | Misuda |
| 5,985,424 | A | 11/1999 | DeMatte |
| 5,988,968 | A | 11/1999 | Hansmeier |
| 5,997,227 | A | 12/1999 | Bundy |
| 6,004,467 | A | 12/1999 | Bleakley |
| 6,004,718 | A | 12/1999 | Shinohara |
| 6,007,918 | A | 12/1999 | Tan |
| 6,008,157 | A | 12/1999 | Takeuchi |
| 6,013,409 | A | 1/2000 | Chou |
| 6,017,440 | A | 1/2000 | Lewis |
| 6,022,819 | A | 2/2000 | Panzera |

| | | | |
|---|---|---|---|
| 6,024,950 | A | 2/2000 | Takada |
| 6,025,860 | A | 2/2000 | Rosenfeld |
| 6,031,021 | A | 2/2000 | Kenny |
| 6,031,556 | A | 2/2000 | Tutt |
| 6,031,980 | A | 2/2000 | Oota |
| 6,040,267 | A | 3/2000 | Mano |
| 6,040,269 | A | 3/2000 | Imoto |
| 6,041,137 | A | 3/2000 | Van Kleeck |
| 6,045,646 | A | 4/2000 | Yoshikawa |
| 6,045,859 | A | 4/2000 | Klein |
| 6,051,097 | A | 4/2000 | Higuchi |
| 6,051,171 | A | 4/2000 | Takeuchi |
| 6,057,028 | A | 5/2000 | Tan |
| 6,060,214 | A | 5/2000 | Ehrhart |
| 6,063,589 | A | 5/2000 | Kellogg |
| 6,071,585 | A | 6/2000 | Roth |
| 6,075,223 | A | 6/2000 | Harrison |
| 6,075,927 | A | 6/2000 | Sakai |
| 6,075,965 | A | 6/2000 | Tombs |
| 6,077,594 | A | 6/2000 | Roth |
| 6,077,797 | A | 6/2000 | Sperlich |
| 6,078,346 | A | 6/2000 | Isobe |
| 6,082,912 | A | 7/2000 | Shimizu |
| 6,083,610 | A | 7/2000 | Hirose |
| 6,083,872 | A | 7/2000 | Adkins |
| 6,084,623 | A | 7/2000 | Shibasaki |
| 6,086,700 | A | 7/2000 | Valentini |
| 6,086,846 | A | 7/2000 | Burow |
| 6,092,942 | A | 7/2000 | Koichi |
| 6,102,534 | A | 8/2000 | Herbert |
| 6,103,389 | A | 8/2000 | Tanaka |
| 6,106,910 | A | 8/2000 | Tan |
| 6,108,456 | A | 8/2000 | Yamamoto |
| 6,110,632 | A | 8/2000 | Dunford |
| 6,113,725 | A | 9/2000 | Kronzer |
| 6,114,088 | A | 9/2000 | Wolk |
| 6,116,709 | A | 9/2000 | Hirabayashi |
| 6,117,572 | A | 9/2000 | Tidrow |
| 6,118,467 | A | 9/2000 | Park |
| 6,120,637 | A | 9/2000 | Barry |
| 6,120,882 | A | 9/2000 | Faykish |
| 6,121,356 | A | 9/2000 | Lundberg |
| 6,123,794 | A | 9/2000 | Saff |
| 6,124,031 | A | 9/2000 | Yoshida |
| 6,124,239 | A | 9/2000 | Chapman |
| 6,124,944 | A | 9/2000 | Ohta |
| 6,126,669 | A | 10/2000 | Rijken |
| 6,127,316 | A | 10/2000 | Chapman |
| 6,128,047 | A | 10/2000 | Chang |
| 6,128,561 | A | 10/2000 | Janata |
| 6,130,912 | A | 10/2000 | Chang |
| 6,134,892 | A | 10/2000 | Turner et al. |
| 6,139,615 | A | 10/2000 | Jones |
| 6,149,747 | A * | 11/2000 | Lorenz et al. ............ 156/89.11 |
| 6,153,709 | A | 11/2000 | Xiao |
| 6,195,475 | B1 | 2/2001 | Beausoleil, Jr. |
| 6,221,444 | B1 | 4/2001 | Okada |
| 6,225,409 | B1 | 5/2001 | Davis |
| 6,248,435 | B1 | 6/2001 | Leck |
| 6,267,810 | B1 | 7/2001 | Pfaff |
| 6,270,871 | B1 | 8/2001 | Scholz |
| 6,275,559 | B1 | 8/2001 | Ramani |
| 6,277,903 | B1 | 8/2001 | Sophiea |
| 6,278,798 | B1 | 8/2001 | Rao |
| 6,280,552 | B1 | 8/2001 | Bottari |
| 6,284,338 | B1 | 9/2001 | Bauman |
| 6,295,133 | B1 | 9/2001 | Bloomquist |
| 6,302,134 | B1 | 10/2001 | Kellogg |
| 6,332,953 | B1 | 12/2001 | Singh |
| 6,481,353 | B1 | 11/2002 | Geddes |
| 6,504,559 | B1 | 1/2003 | Newton |
| 6,717,686 | B1 | 4/2004 | Farros |
| 2001/0001060 | A1 | 5/2001 | Kellogg |
| 2002/0015836 | A1 | 2/2002 | Jonza |
| 2002/0063901 | A1 | 5/2002 | Hicks |
| 2003/0110182 | A1 | 6/2003 | Christophersen |
| 2004/0046788 | A1 | 3/2004 | Keane |
| 2004/0050279 | A1 * | 3/2004 | Ibarra et al. ................. 101/488 |
| 2005/0145120 | A1 * | 7/2005 | Geddes et al. ................ 101/33 |

FOREIGN PATENT DOCUMENTS

| | | | |
|---|---|---|---|
| EP | 530267 | B1 | 10/1996 |
| EP | 942003 | A1 | 9/1999 |
| EP | 684133 | B1 | 1/2000 |
| EP | 833866 | B1 | 8/2000 |
| EP | 576530 | B2 | 11/2000 |
| EP | 833965 | B1 | 9/2002 |
| WO | WO9700781 | A1 | 1/1997 |
| WO | WO9700913 | A1 | 1/1997 |
| WO | WO9700922 | A1 | 1/1997 |
| WO | WO0077115 | A1 | 12/2000 |
| WO | WO0160607 | A1 | 8/2001 |
| WO | WO0211978 | A1 | 2/2002 |

* cited by examiner

THERMAL TRANSFER ASSEMBLY FOR CERAMIC IMAGING

CROSS-REFERENCE TO RELATED PATENT APPLICATIONS

This application is a continuation of patent application U.S. Ser. No. 10/621,976 filed on Jul. 17, 2003, now U.S. Pat. No. 6,990,904, which is a continuation-in-part of patent application U.S. Ser. No. 10/265,013, filed on Oct. 4, 2002, now U.S. Pat. No. 6,766,734, which in turn is a continuation-in-part of U.S. Ser. No. 10/080,783, filed on Feb. 22, 2002, now U.S. Pat. No. 6,722,271, which in turn is a continuation-in-part of U.S. Ser. No. 09/961,493, filed on Sep. 22, 2001, now U.S. Pat. No. 6,629,792, which in turn is a continuation-in-part of U.S. Ser. No. 09/702,415, filed on Oct. 31, 2000, now U.S. Pat. No. 6,481,353, issued on Nov. 19, 2002. The entire disclosure of each of these United States patent documents is hereby incorporated by reference into this specification.

FIELD OF THE INVENTION

An assembly for, and a method of, transferring an image to a ceramic substrate that utilizes a thermal transfer ribbon and a covercoated thermal transfer sheet.

BACKGROUND OF THE INVENTION

Processes for preparing "decals" are well known. Thus, e.g., in U.S. Pat. No. 5,132,165 of Louis A. Blanco, a wet printing technique was described comprising the step of offset printing a first frit layer onto a backing sheet, forming a wet ink formulation free of glass and including a liquid printing vehicle and oxide coloring agent, wet printing the wet ink formulation onto the first frit layer to form a design layer, and depositing a second frit layer onto the design layer.

The process described by this Blanco patent is not readily adaptable to processes involving digital imaging, for the wet inks of this patent are generally too viscous for ink jet printing and not suitably thermoplastic for thermal transfer or electrophotographic printing.

Digital printing methodologies offer a more convenient and lower cost method of mass customization of ceramic articles than do conventional analog printing methodologies, but they cannot be effectively utilized by the process of the Blanco patent.

The Blanco patent issued in July of 1992. In September of 1997, U.S. Pat. No. 5,665,472 issued to Konsuke Tanaka. This patent described a dry printing process that overcame some of the disadvantages of the Blanco process. The ink formulations described in the Tanaka patent are dry and are suitable to processes involving digital imaging.

However, although the Tanaka process is an improvement over the Blanco process, it still suffers from several major disadvantages, which are described below.

The Tanaka patent discloses a thermal transfer sheet which allegedly can ". . . cope with color printing. . . . " According to Tanaka, ". . . thermal transfer sheets for multi-color printing also fall within the scope of the invention" (see Column 4, lines 64-67). However, applicants have discovered that, when the Tanaka process is used to prepare digitally printed backing sheets for multi-coloring printing on ceramic substrates, unacceptable results are obtained.

The Tanaka process requires the presence of two "essential components" in a specified glass frit (see lines 4-12 of Column 4). According to claim 1 of U.S. Pat. No. 5,665,472, the specified glass frit consists essentially of 75 to 85 weight percent of $Bi_2O_3$ and 12 to 18 weight percent of $B_2O_3$, which are taught to be the "essential components" referred to by Tanaka. In the system of Tanaka's patent, the glass frit and colorant particles are dispersed in the same ink. It is taught that, in order to obtain good dispersibility in this ink formulation, the average particle size of the dispersed particles should be from about 0.1 to about 10 microns (see Column 4 of the patent, at lines 13-17).

In the example presented in the Tanaka patent (at Column 7 thereof), a temperature of 450 degrees Celsius was used to fire images printed directly from thermal transfer sheets made in accordance with the Tanaka process to a label comprised of inorganic fiber cloth coated with some unspecified ceramic material.

When one attempts to use the process of the Tanaka patent to transfer images from a backing sheet to solid ceramic substrates (such as glass, porcelain, ceramic whitewares, etc.), one must use a temperature in excess of 550 degrees Celsius to effectively transfer an image which is durable. However, when such a transfer temperature is used with the Tanaka process, a poor image comprising a multiplicity of surface imperfections (such as bubbles, cracks, voids, etc.) is formed. Furthermore, when the Tanaka process is used to attempt to transfer color images, a poor image with low color density and poor durability is formed. The Tanaka process, although it may be useful for printing on flexible ceramic substrates such as glass cloth, is not useful for printing color images on most solid ceramic substrates.

It is an object of this invention to provide a thermal transfer assembly that overcomes many of the disadvantages of the prior art assemblies and processes.

SUMMARY OF THE INVENTION

In accordance with one embodiment of this invention, there is provided a thermal assembly that comprises a thermal transfer ribbon and a covercoated transfer sheet.

The thermal transfer ribbon comprises a support and, disposed above said support, a ceramic ink layer. The ceramic ink layer is present at a coating weight of from about 2 to about 15 grams per square meter, and preferably comprises from about 15 to about 94.5 weight percent of a solid carbonaceous binder, and at least one of a film-forming glass frit, an opacifying agent and a colorant (at a combined level for the film forming glass frit, the opacifying agent and the colorant of at least 0.5 weight percent). The film-forming frit may be present in the ceramic ink layer at a level of from about 0 to about 75 weight percent; the opacifying agent may be present in the ceramic ink layer at a level of from about 0 to about 75 weight percent and preferably has a melting point at least 50 degrees Celsius greater than that of the film forming glass frit; and the colorant may be present in the ceramic ink layer at a level of from about 0 to about 75 weight percent.

The covercoated transfer sheet comprises a flat, flexible support and a transferable covercoat releaseably bound to said flat, flexible support. The transferable covercoat is present at a coating weight of from about 2 to about 30 grams per square meter, and it comprises from about 15 to about 94.5 weight percent of a solid carbonaceous binder, 0 to about 75 weight percent a film-forming frit, 0 to 75 weight percent of a colorant and 0 to 75 weight percent of an opacifying agent. When the transferable covercoat is printed with an image from said thermal transfer ribbon to form an imaged covercoated transfer decal, the image has a higher adhesion to the covercoat than the covercoat has to the flexible substrate, the imaged covercoat has an elongation to break of at least about 1 percent, and the imaged covercoat can be separated from said flexible substrate with a peel force of less than about 30 grams per centimeter.

In one embodiment, the imaged covercoated transfer decal is subsequently used to transfer the image from the covercoated transfer sheet to a substrate to form an imaged substrate. The image may take the form of variable information (such as a lot number, a serial number, an identification number, a date and the like), a name, logo, trademark, make, model, manufacturer and the like, and/or an image, photograph, decoration, drawing, design, pattern and the like.

The imaged substrate may be comprised of a ceramic substrate (such as, e.g., a substrate comprised of glass, porcelain, ceramic whiteware material, metal oxides, one or more clays, porcelain enamel, and the like). The imaged substrate may comprise non-ceramic material (such as, e.g., natural and/or man-made polymeric material, thermoplastic material, elastomeric material, thermoset material, organic coatings, films, composites, sheets and the like).

Any substrate capable of receiving the imaged transfer decal of this invention may be used herein.

BRIEF DESCRIPTION OF THE DRAWINGS

The invention will be described by reference to this specification and the attached drawings, in which like numerals refer to like elements, and in which.

Figure 1:
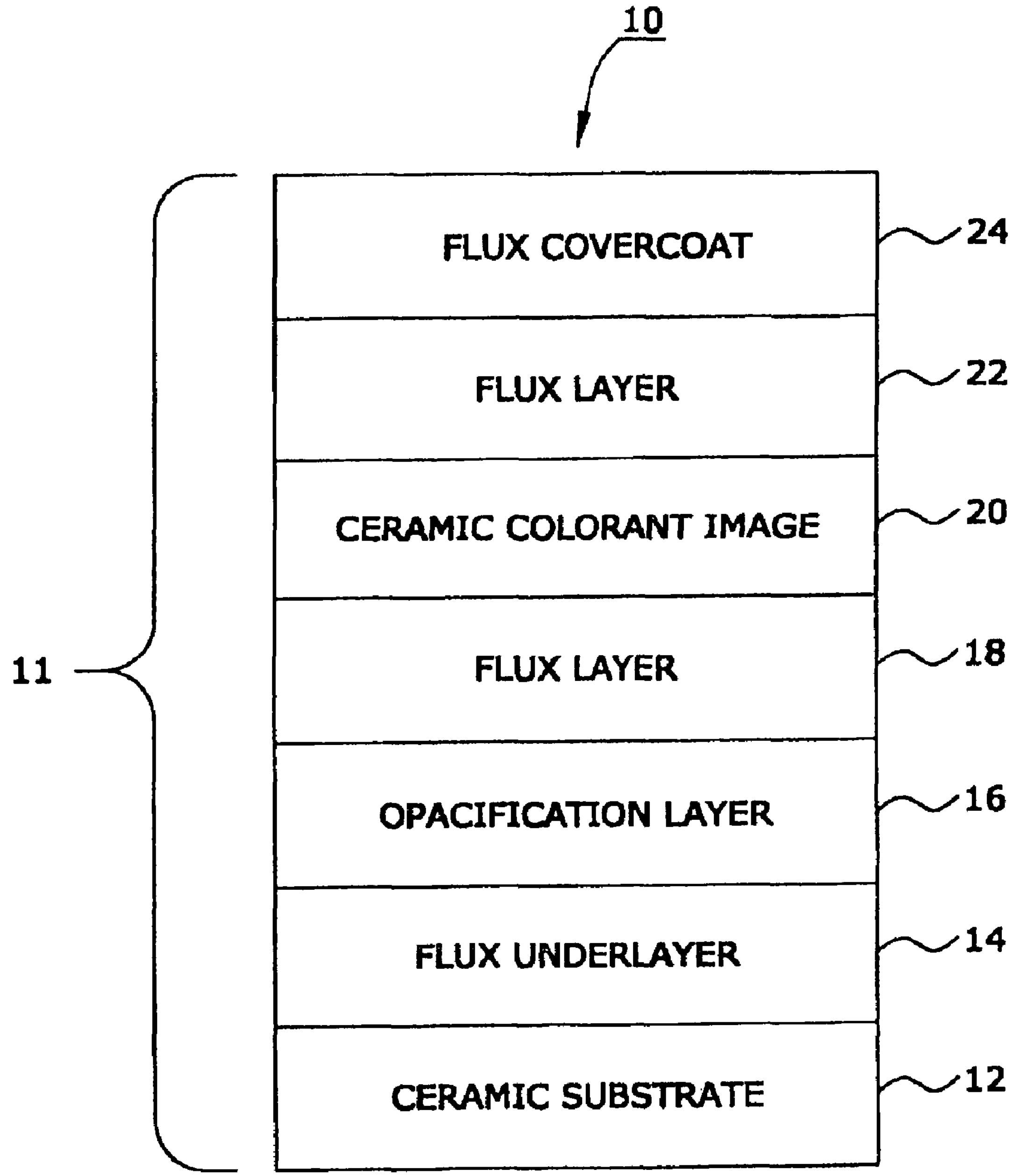
FIG. 1 is a schematic representation of a ceramic substrate to which a color image has been transferred in accordance with the invention.
Figure 6:
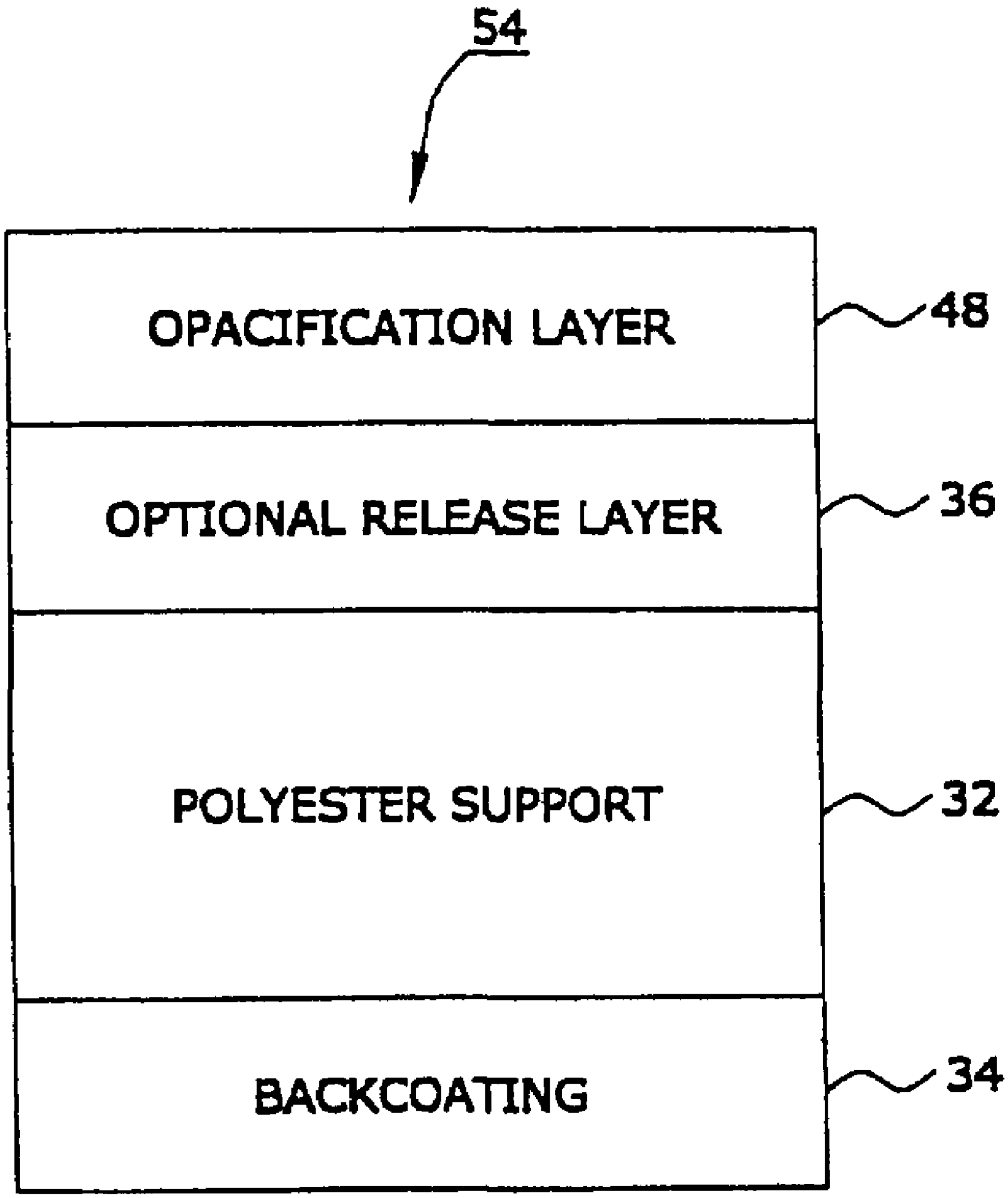
Figure 6A:
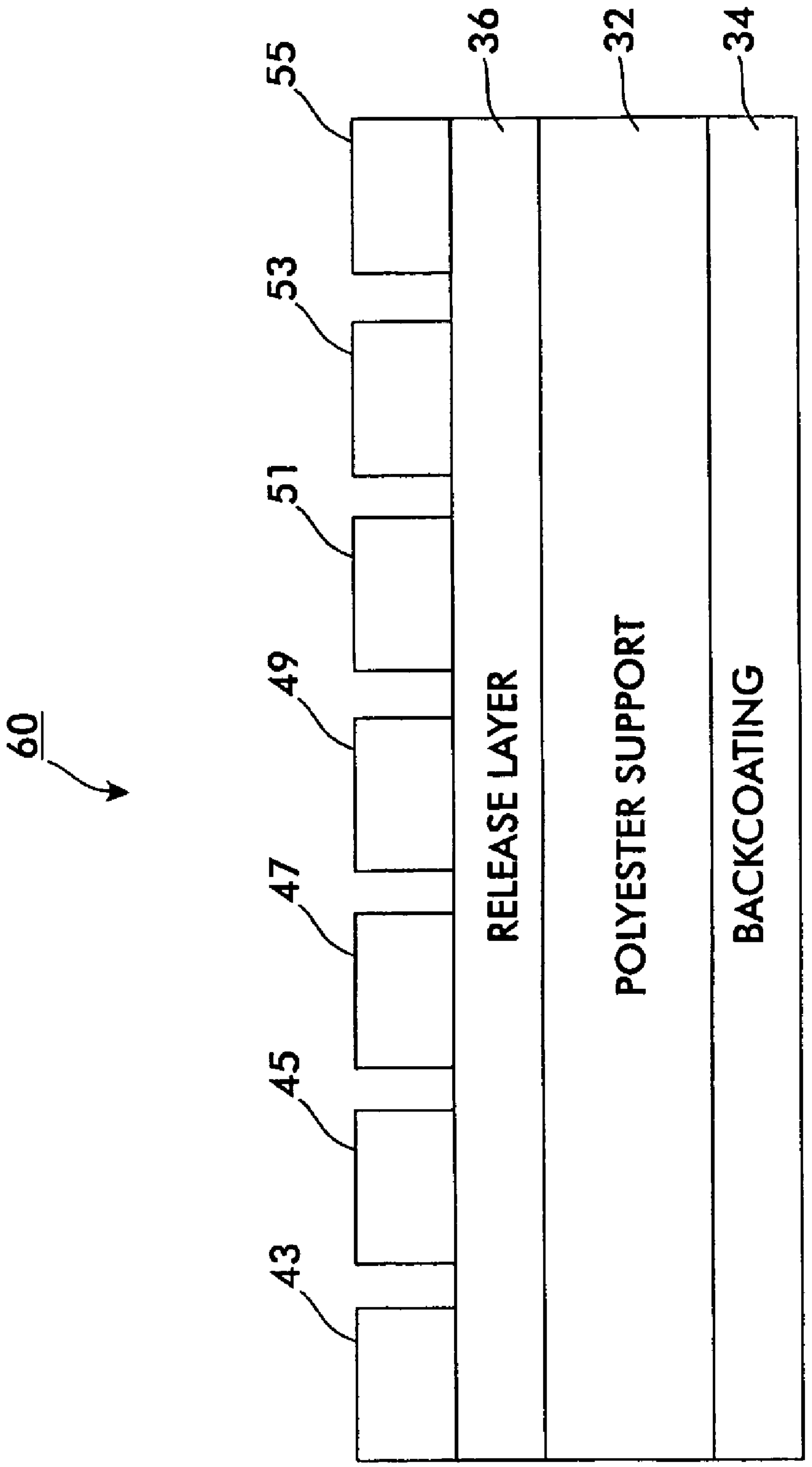
Figure 7:
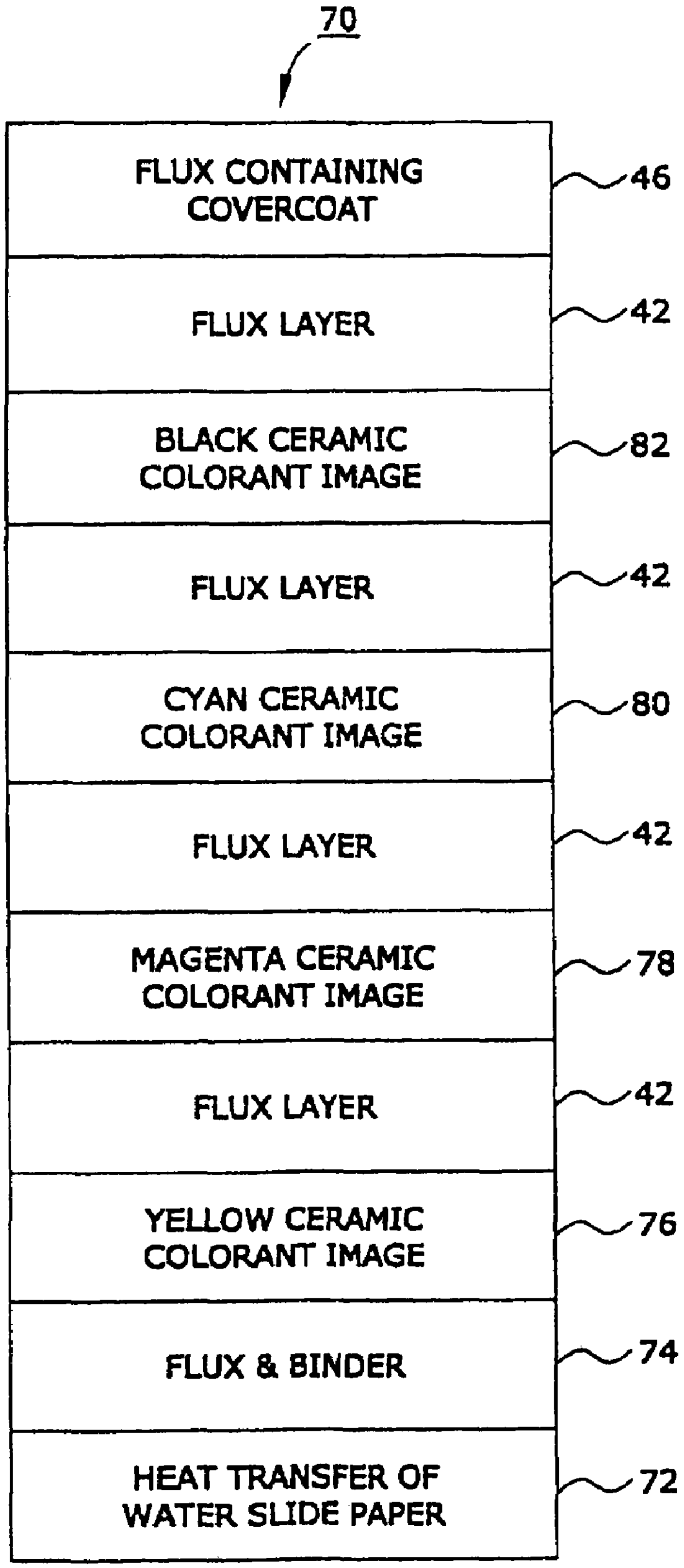
Figure 8:
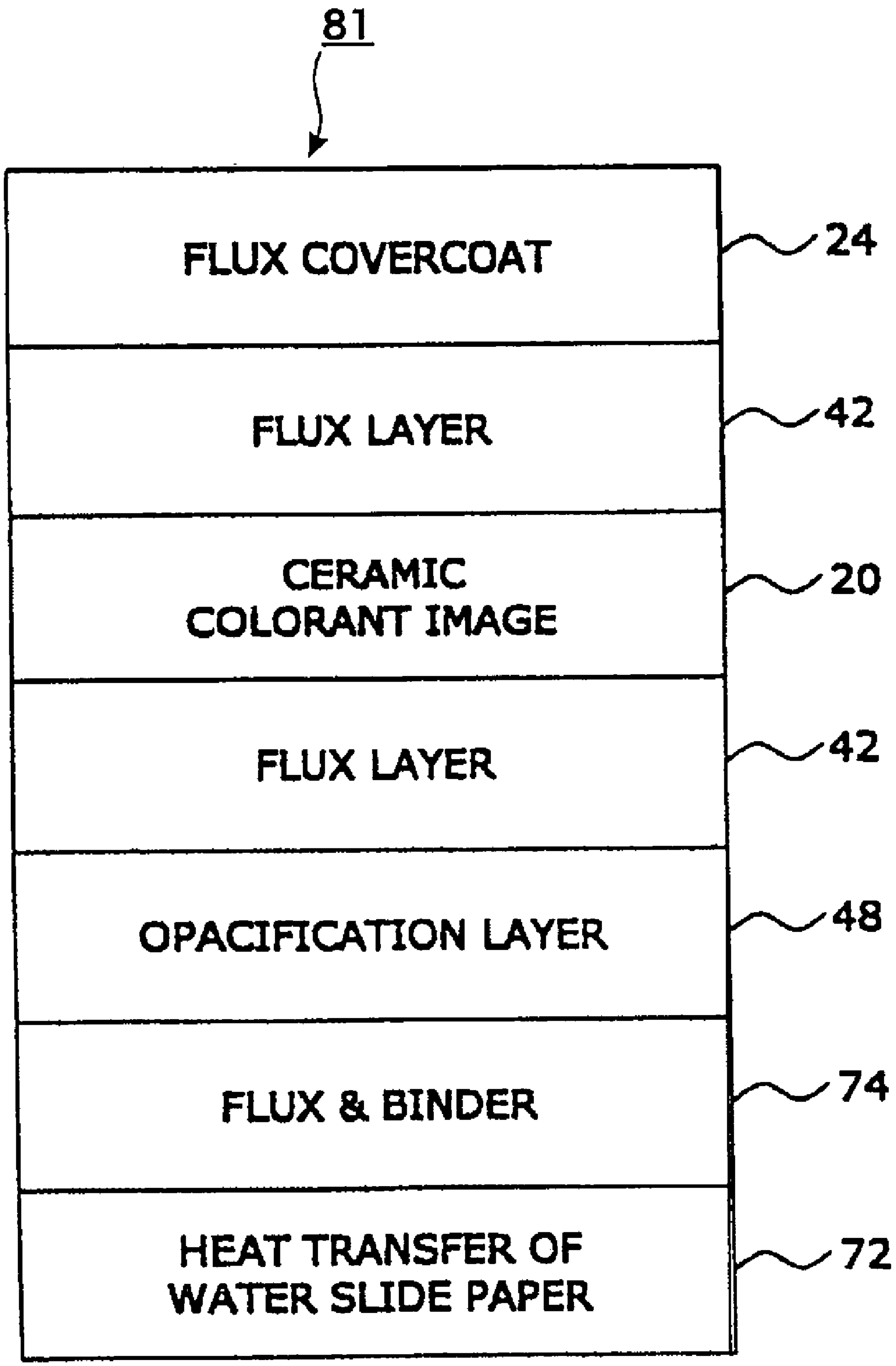
Figure 12:
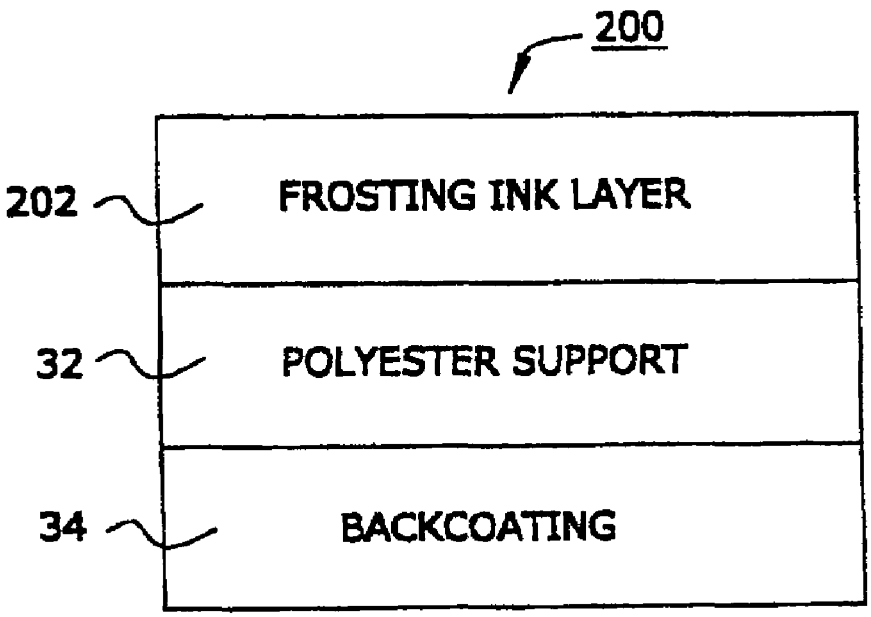
Figure 13:
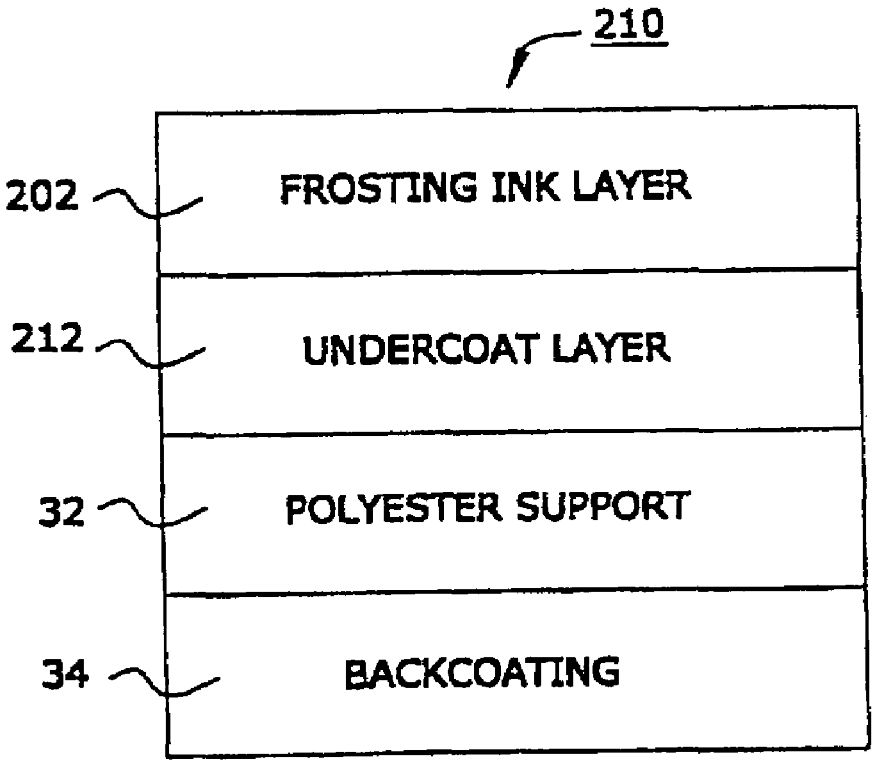
Figure 13A:
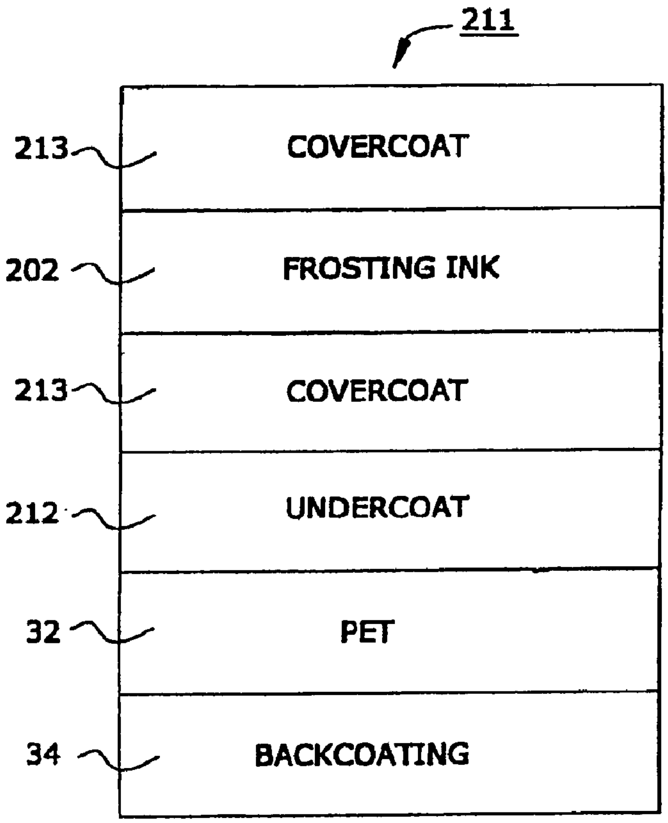
Figure 13B:
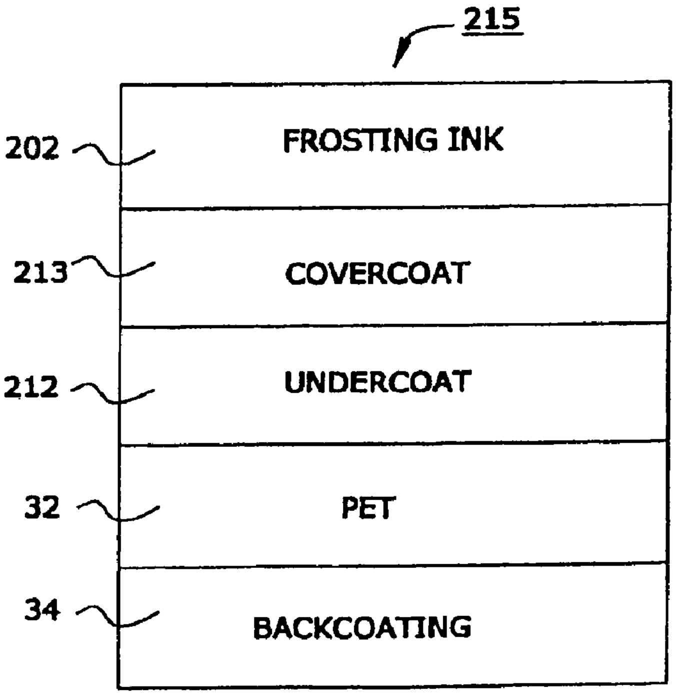
Figure 14:
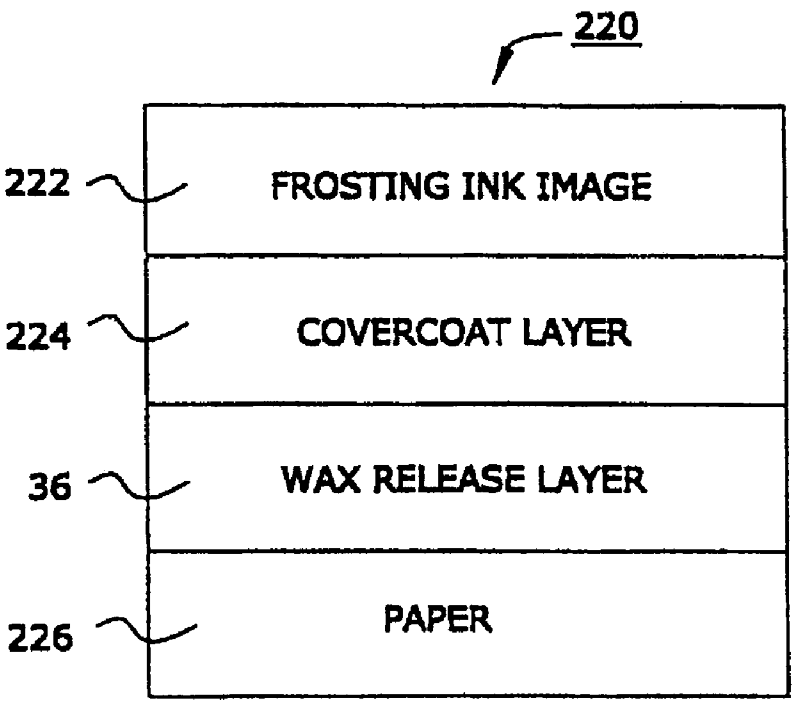
Figure 15:
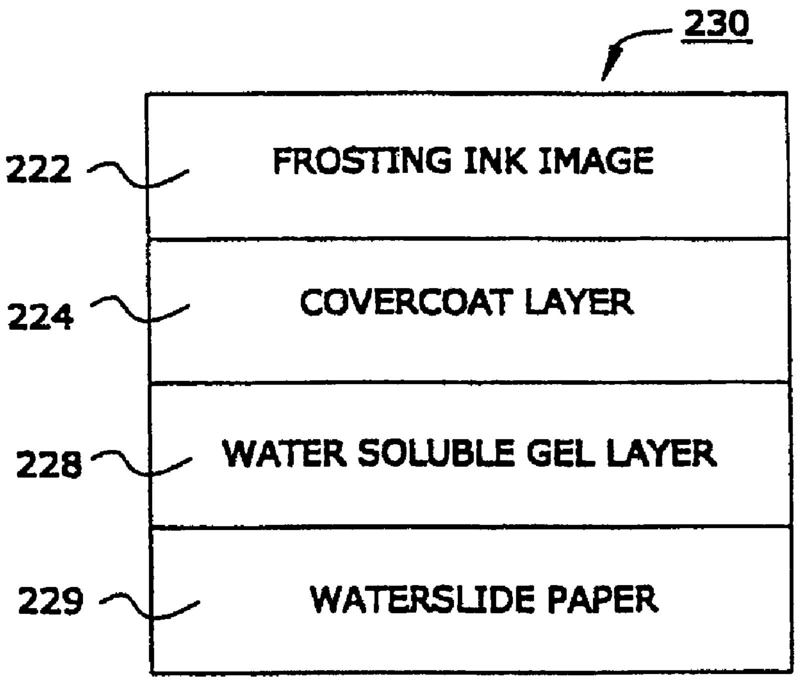
Figure 16:
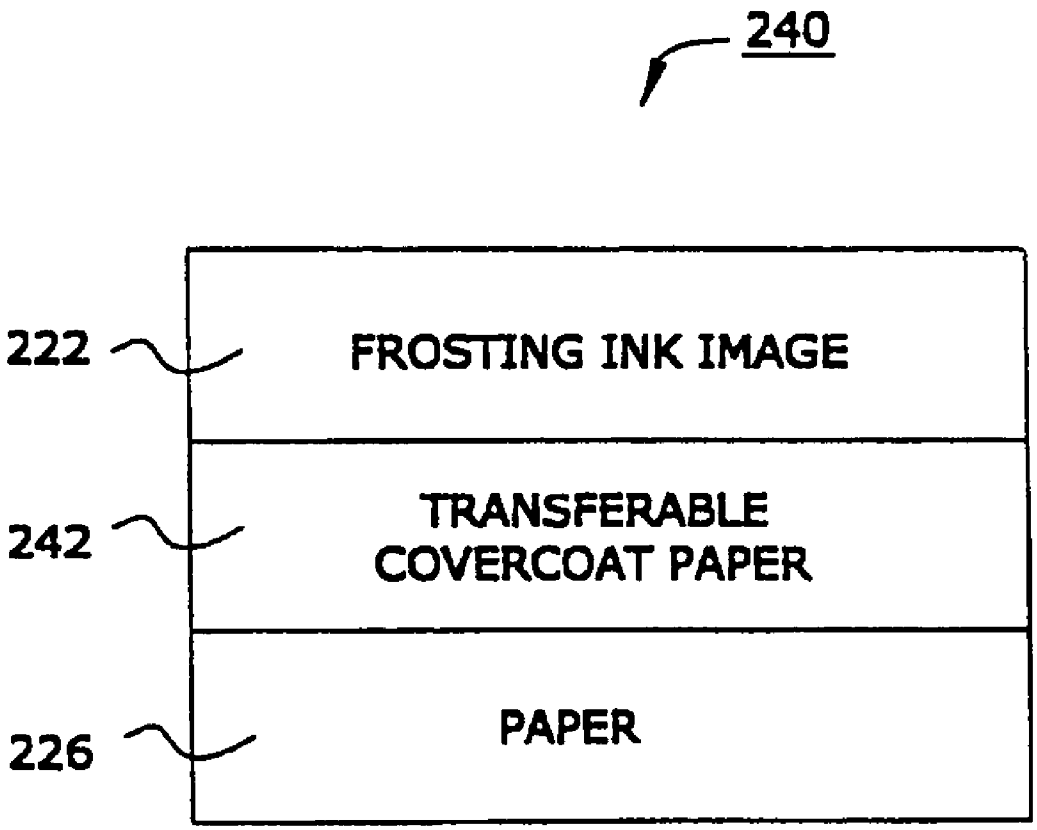
Figure 17:
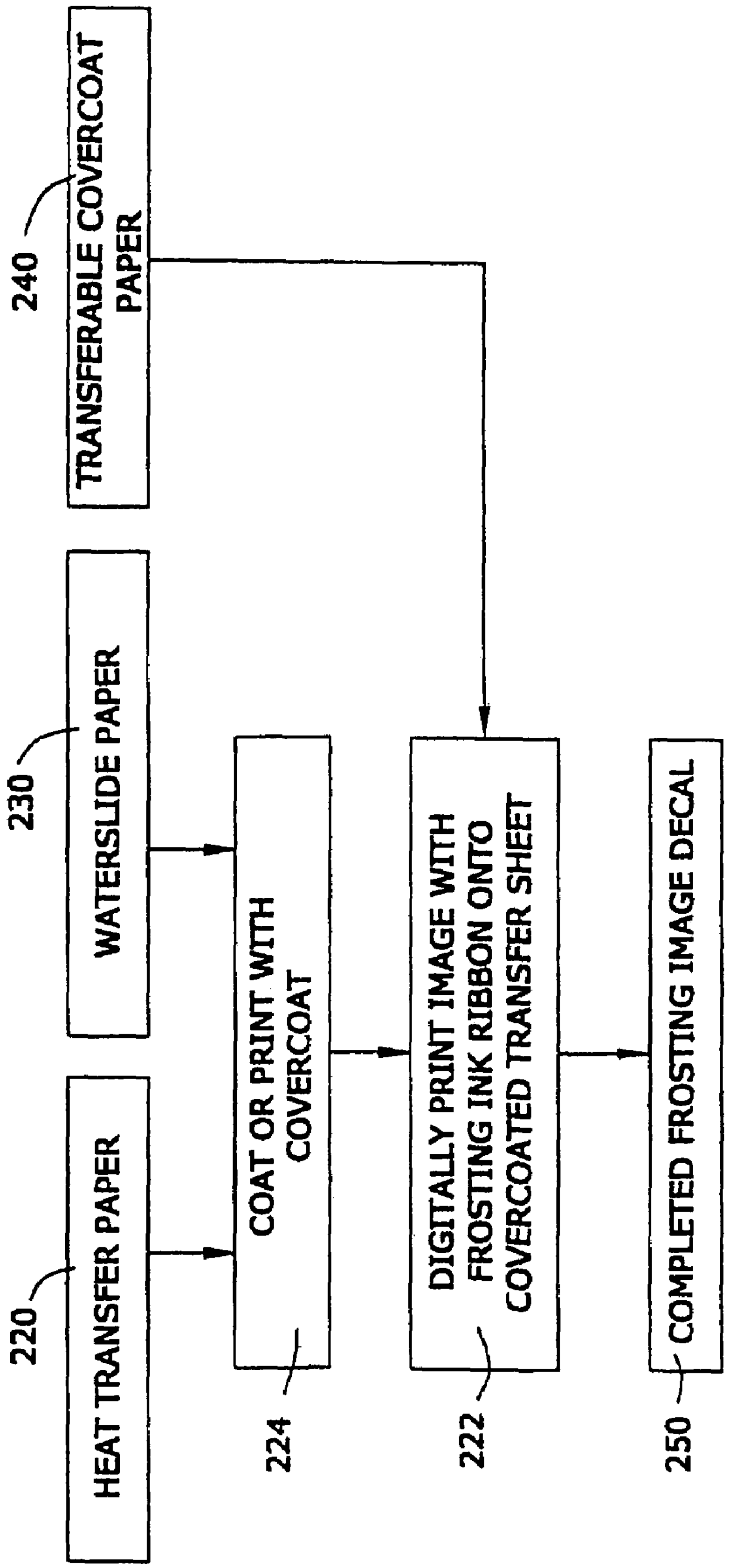
Figure 18:
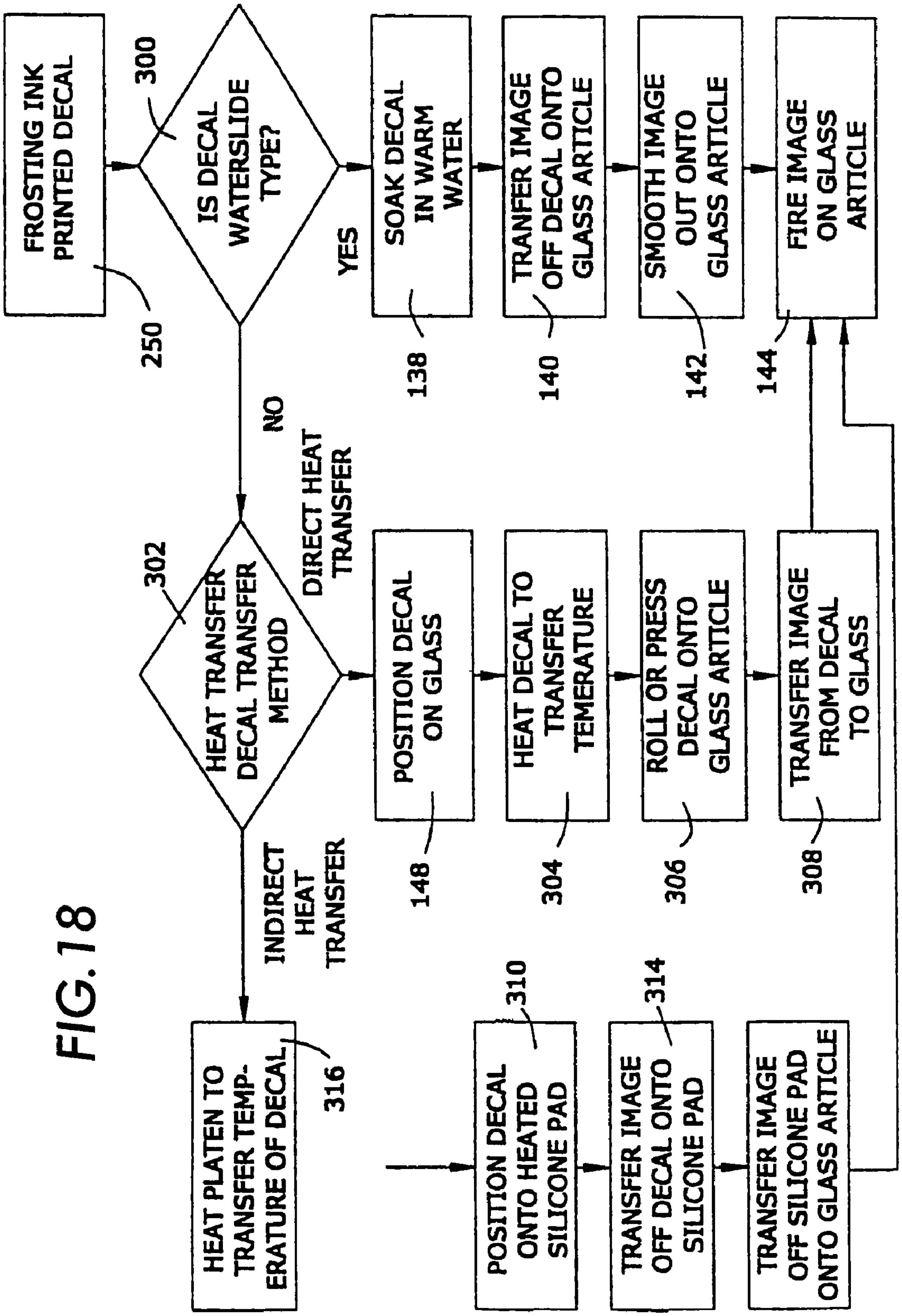
Figure 19:
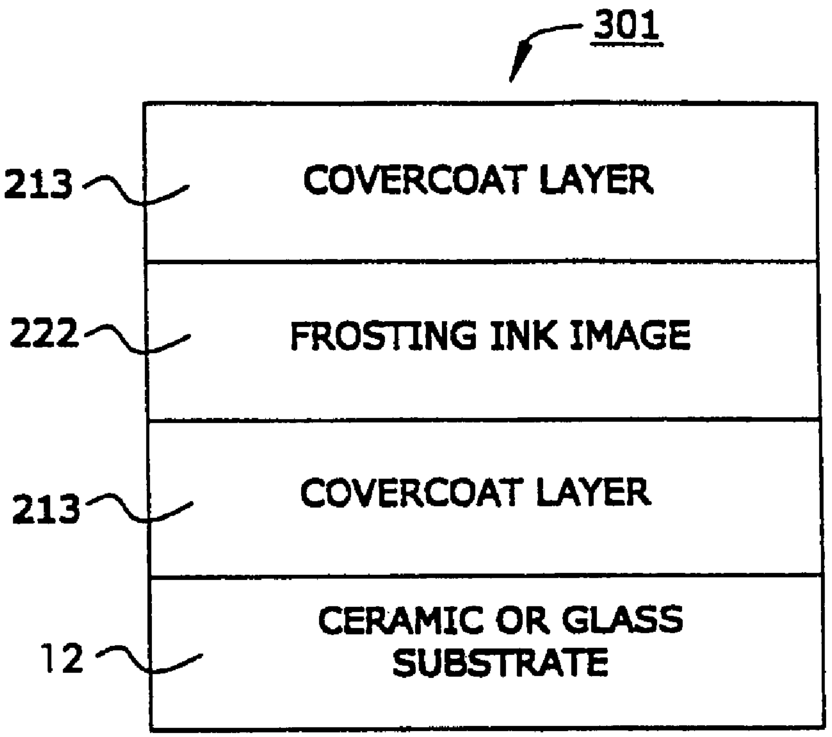
Figure 20:
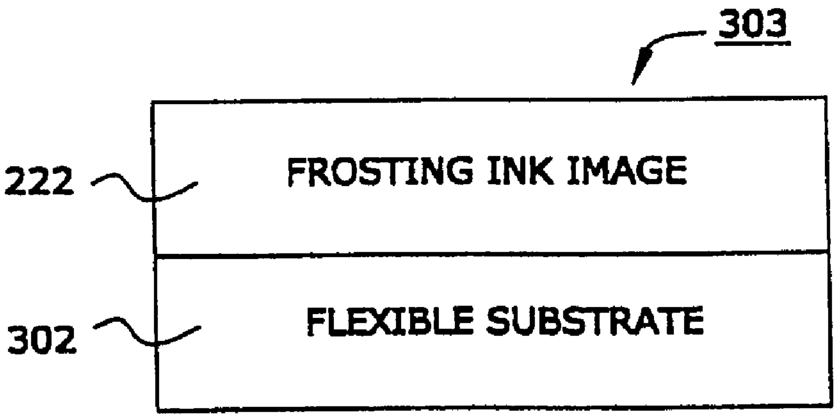
Figure 21:
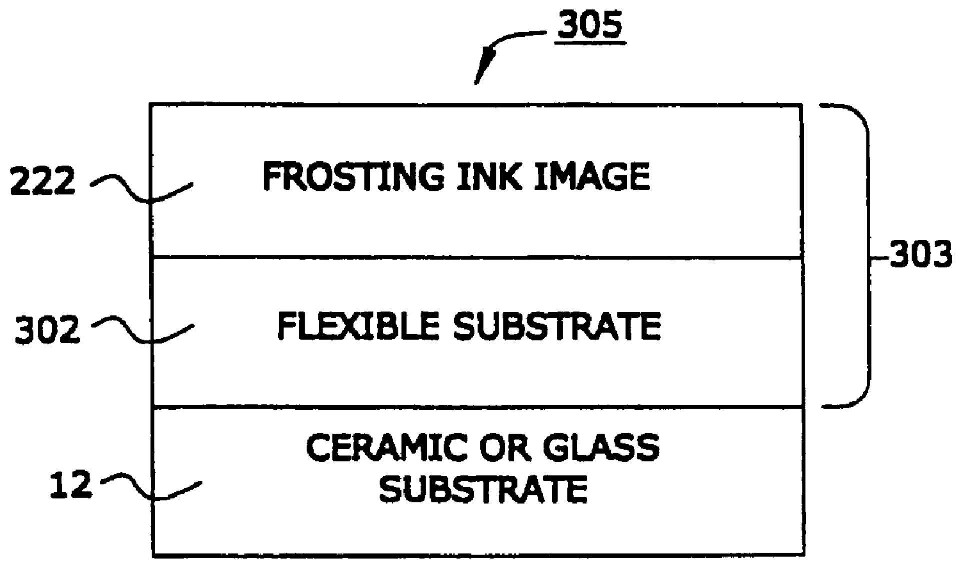
Figure 22:
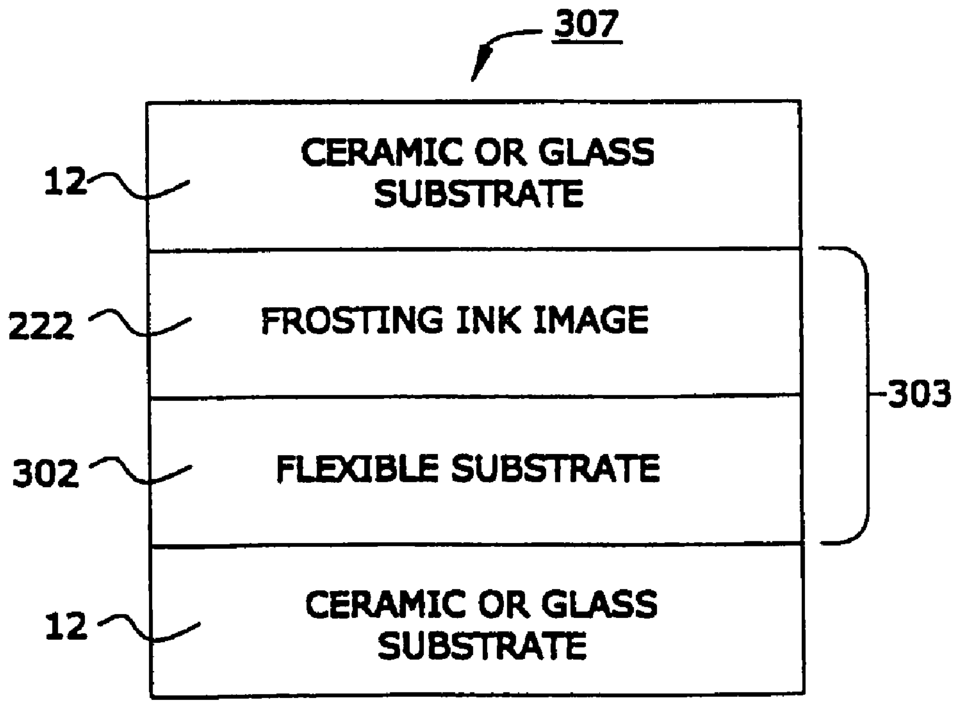
Figure 23:
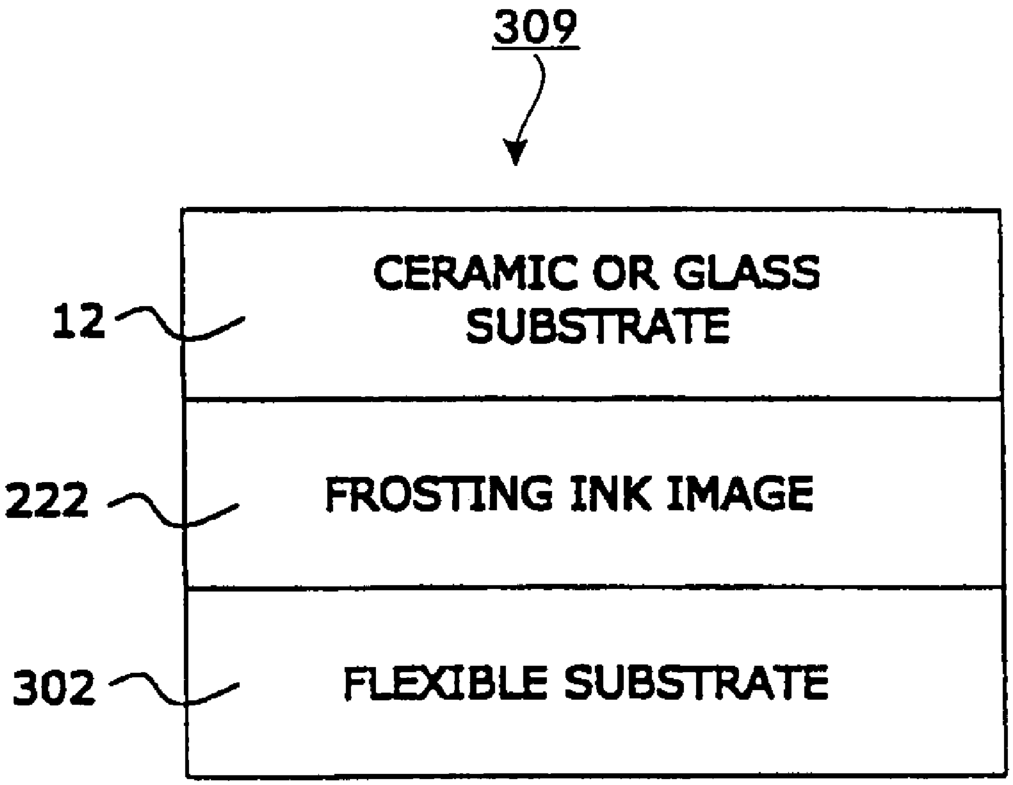
Figure 24:
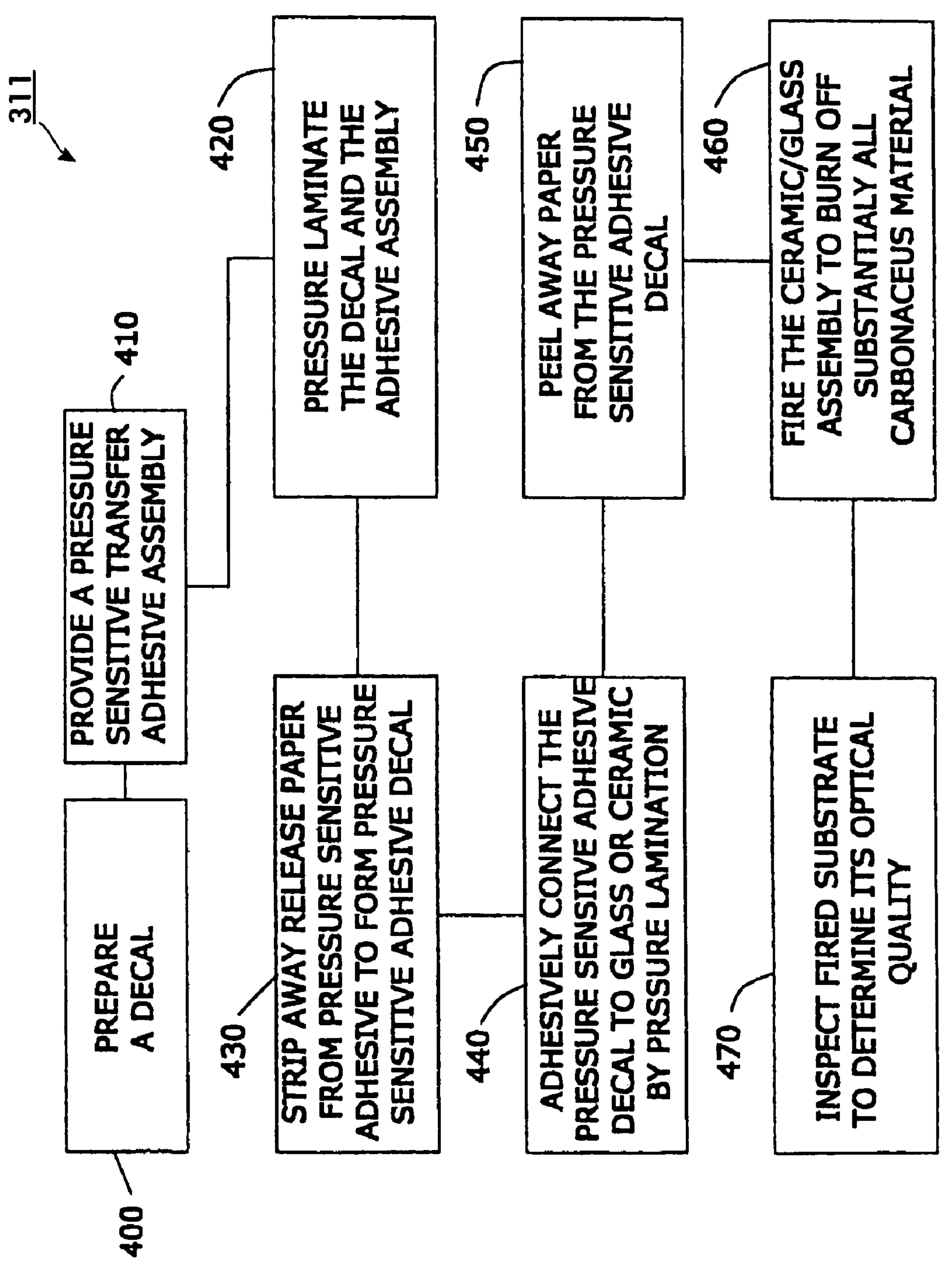
Figure 25A:
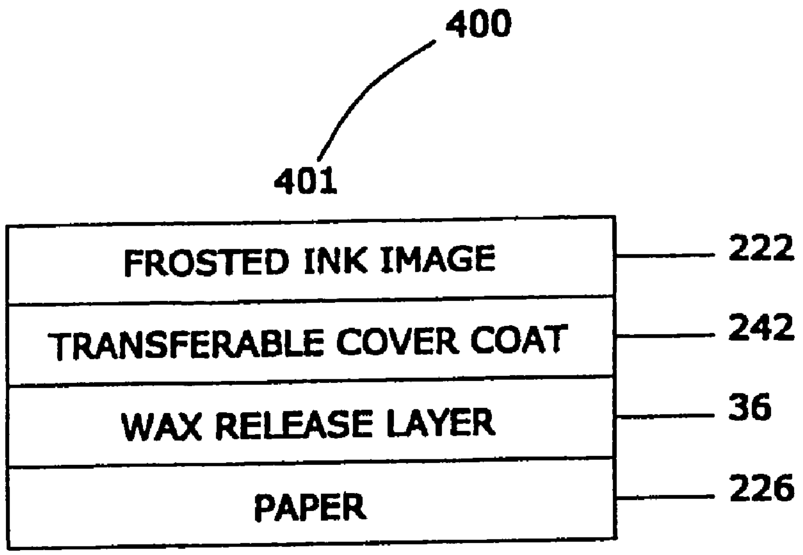
Figure 25B:
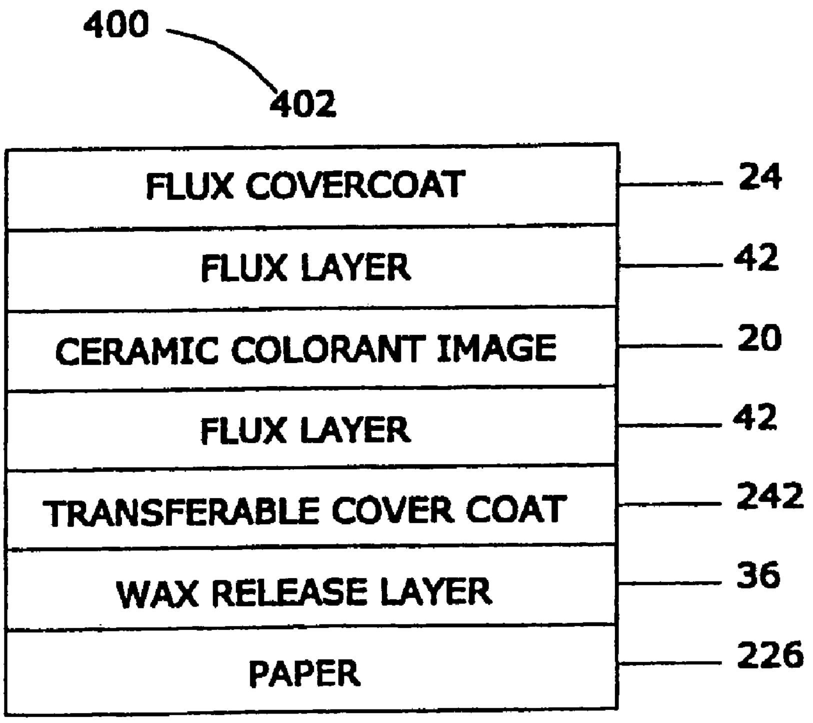
Figure 26:
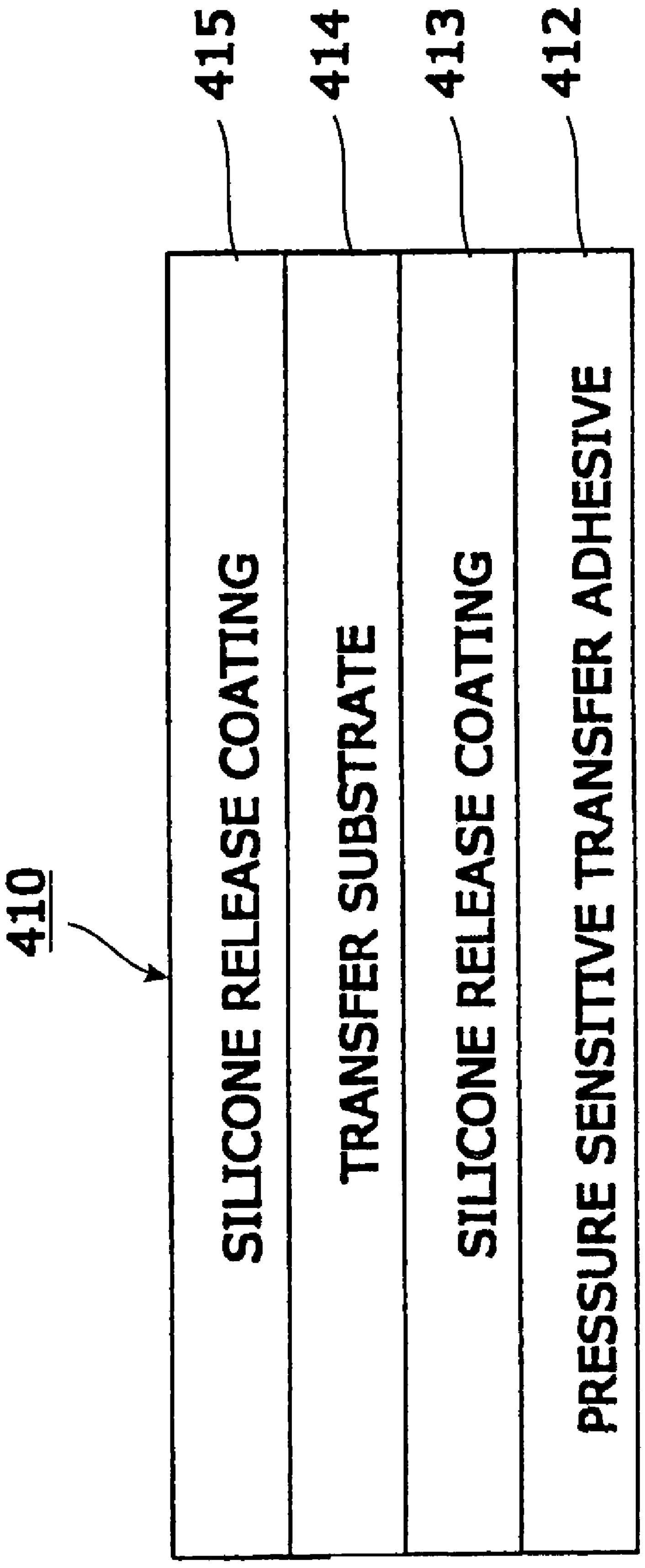
Figure 27:
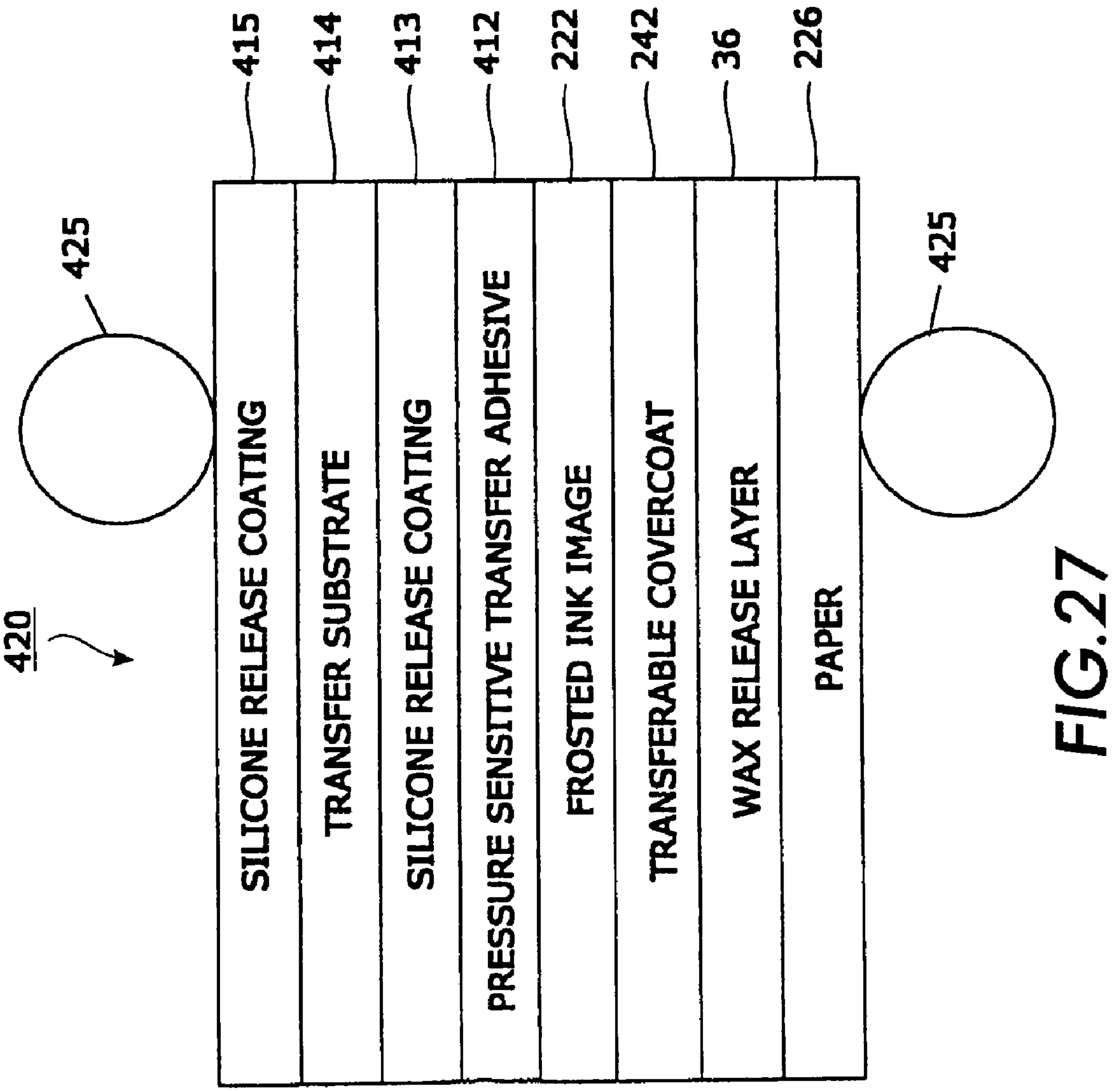
Figure 28:
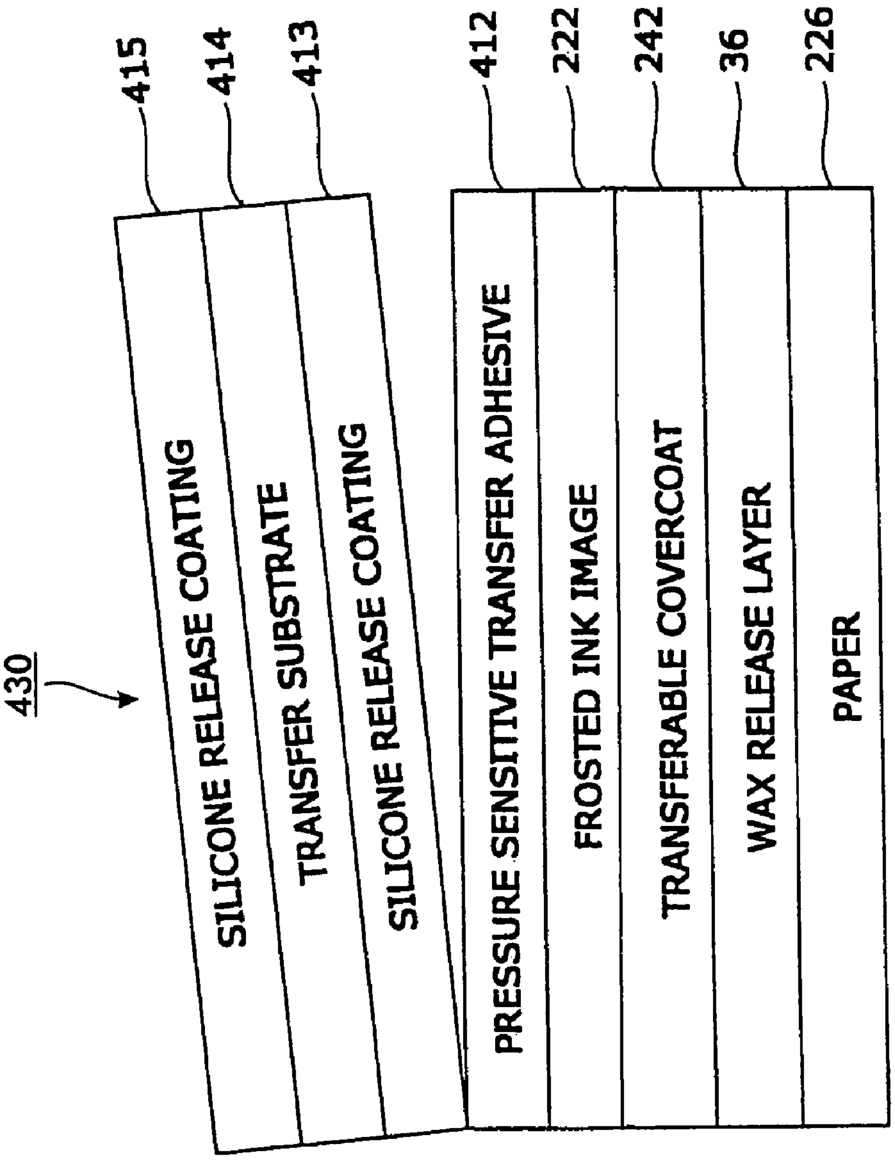
Figure 29:
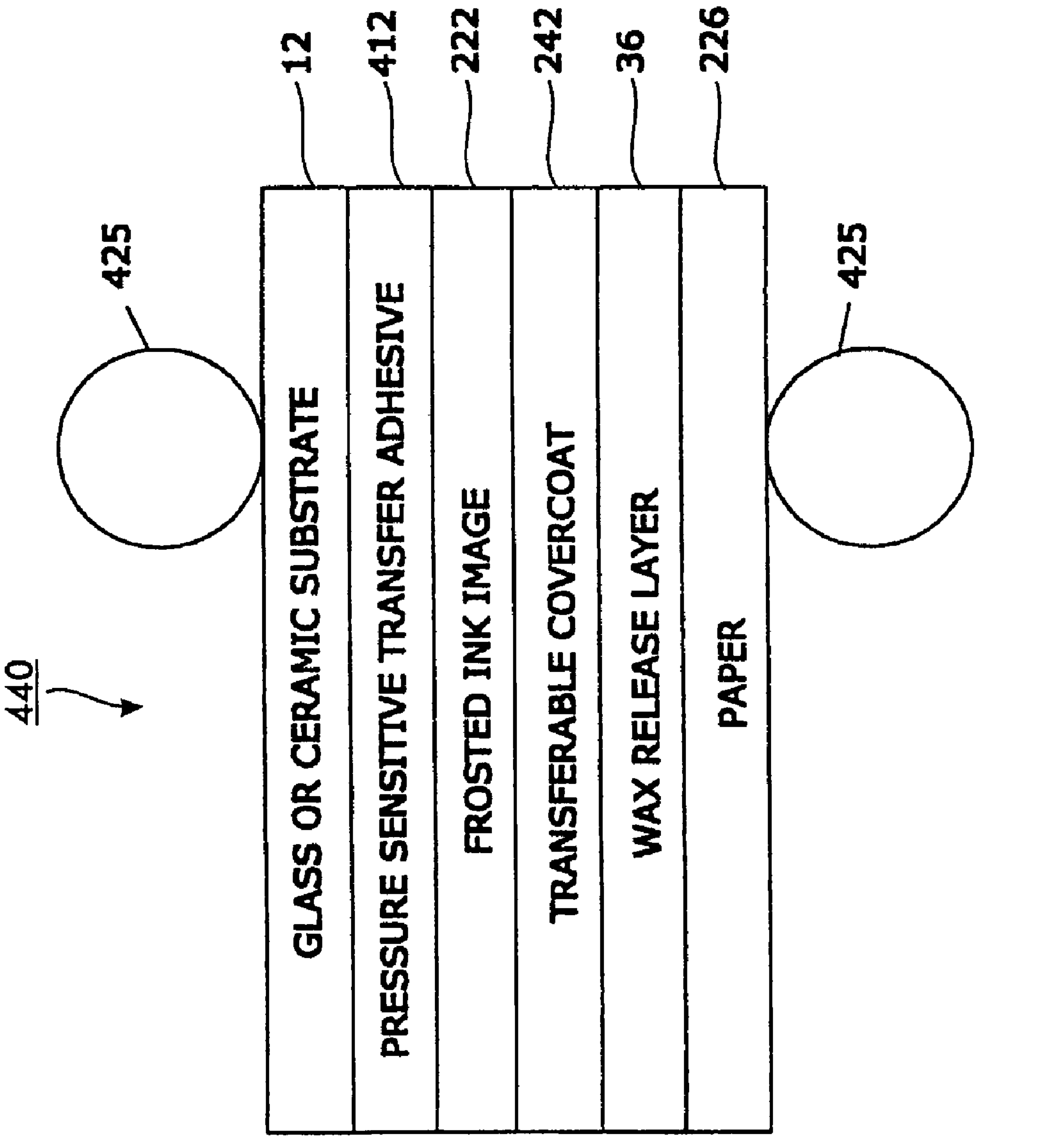
Figure 30:
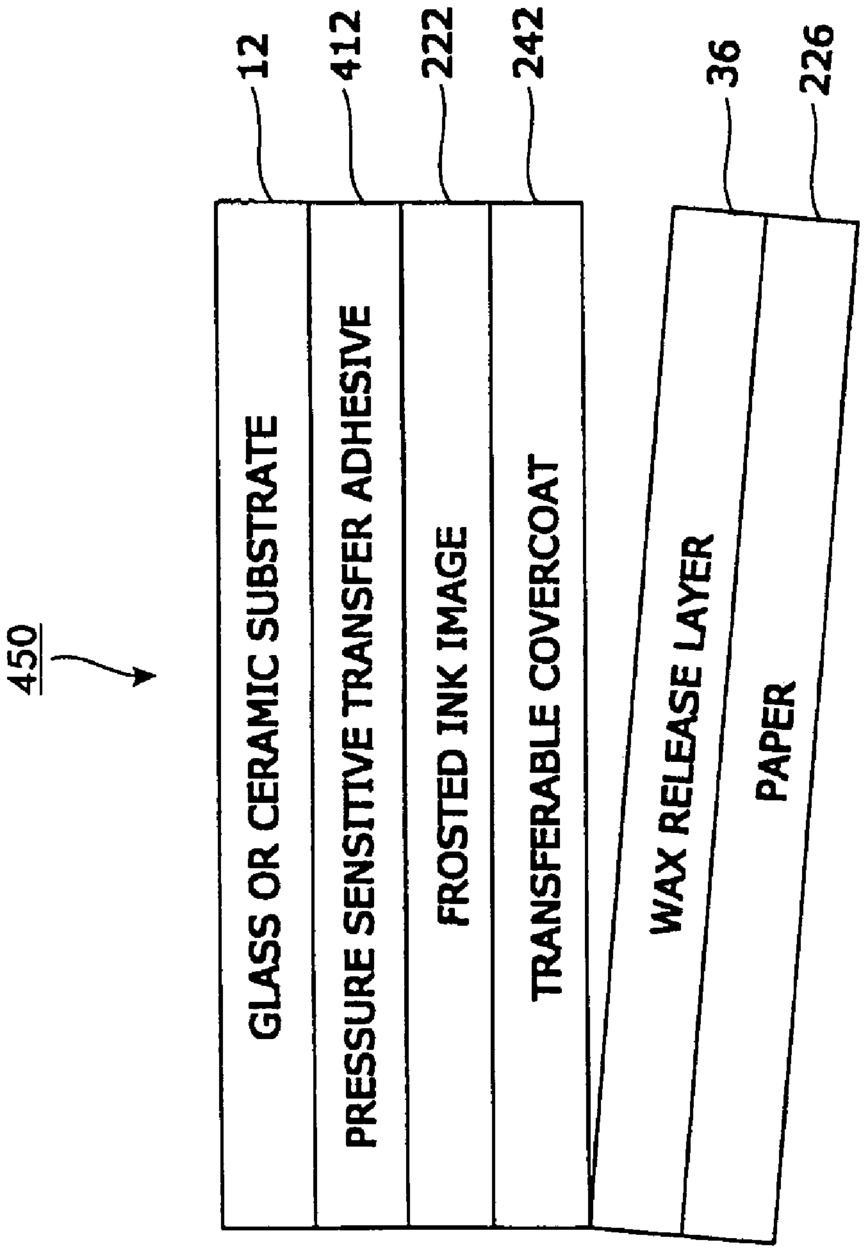
Figure 31:
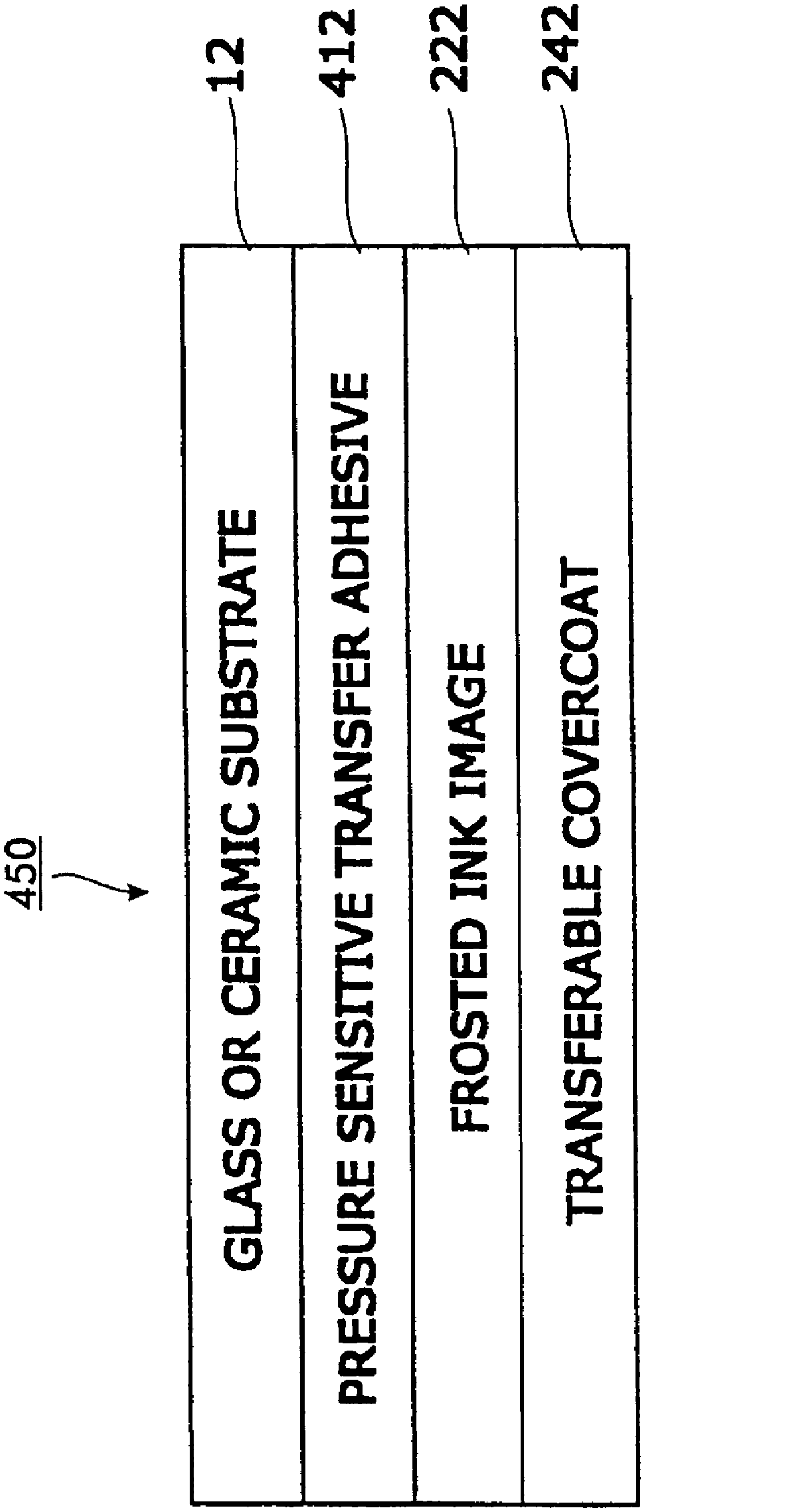
Figure 32:
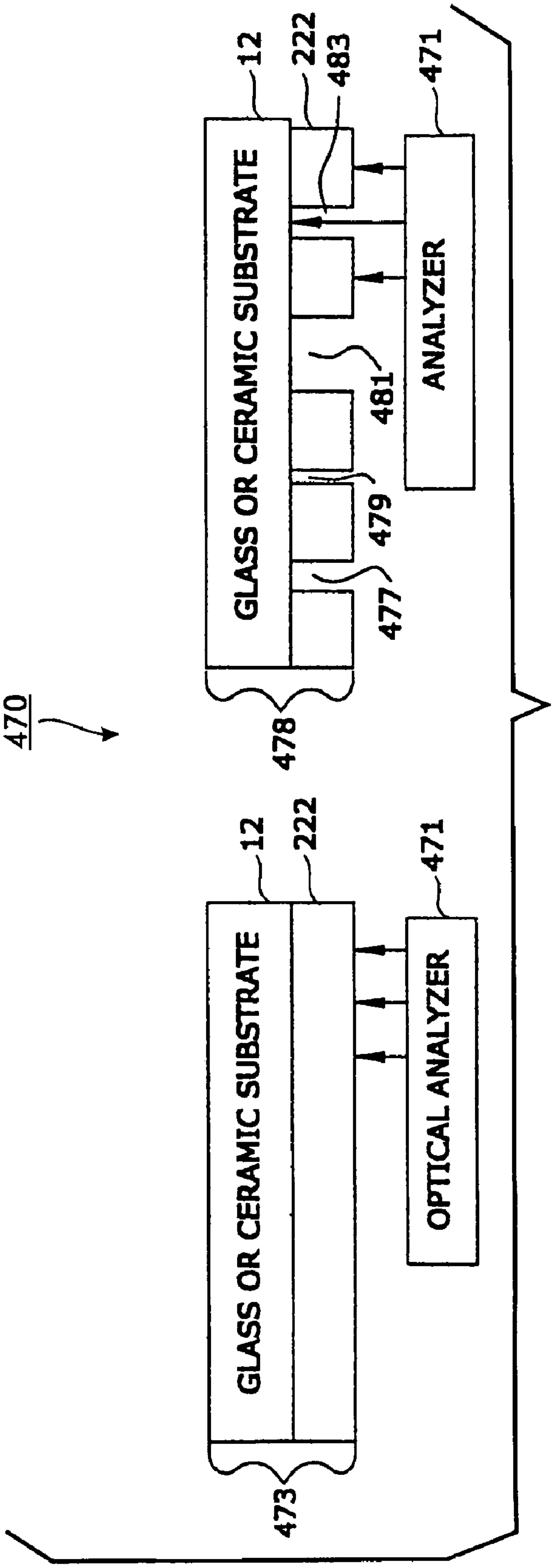
Figure 33:
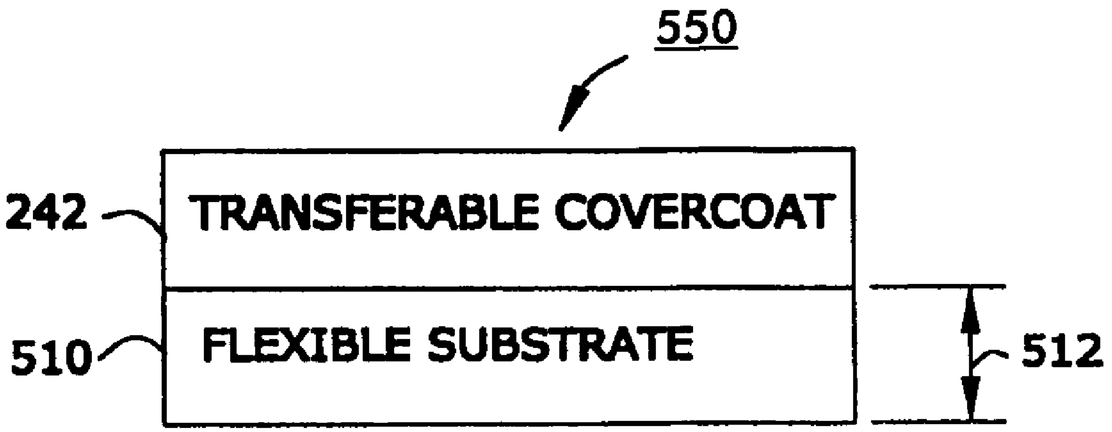
Figure 34:
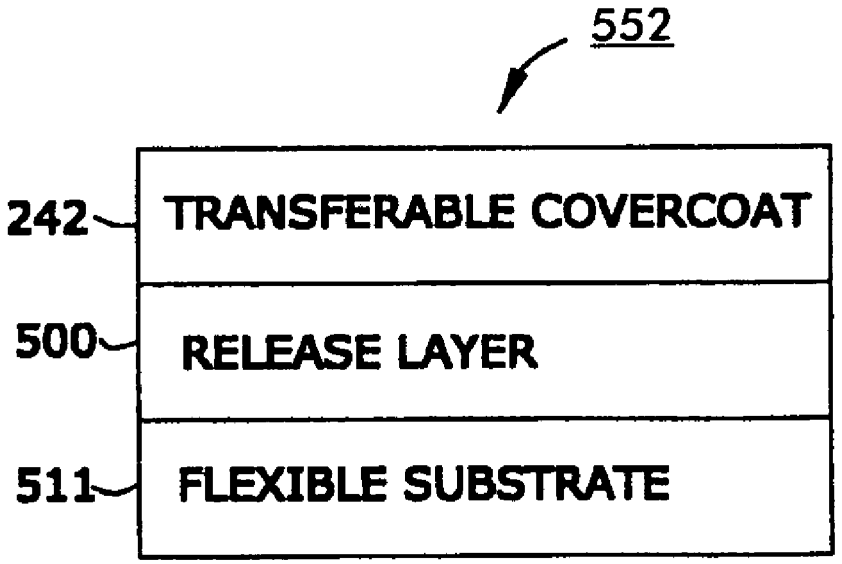
Figure 35:
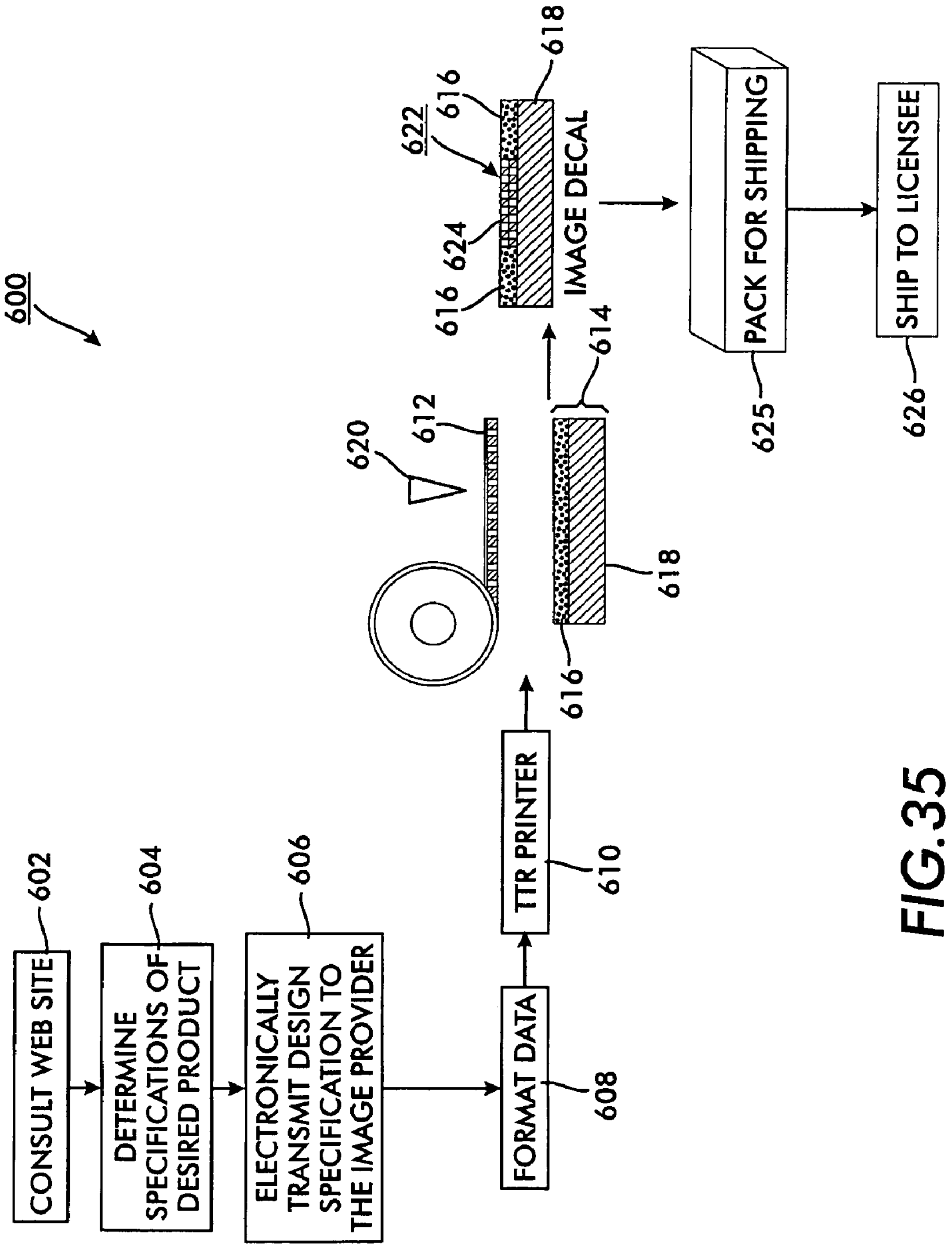
Figure 40:
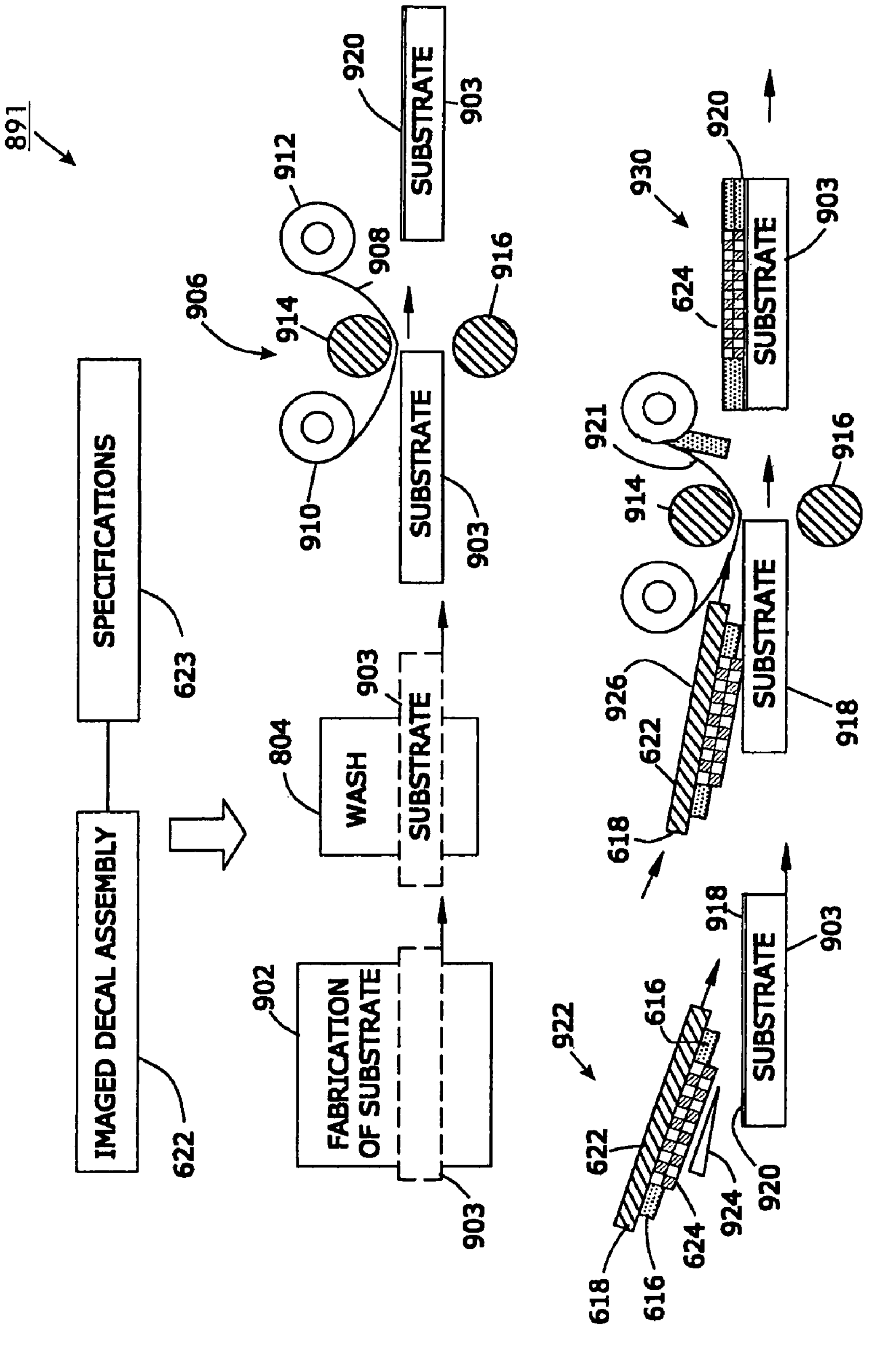
Figure 41:
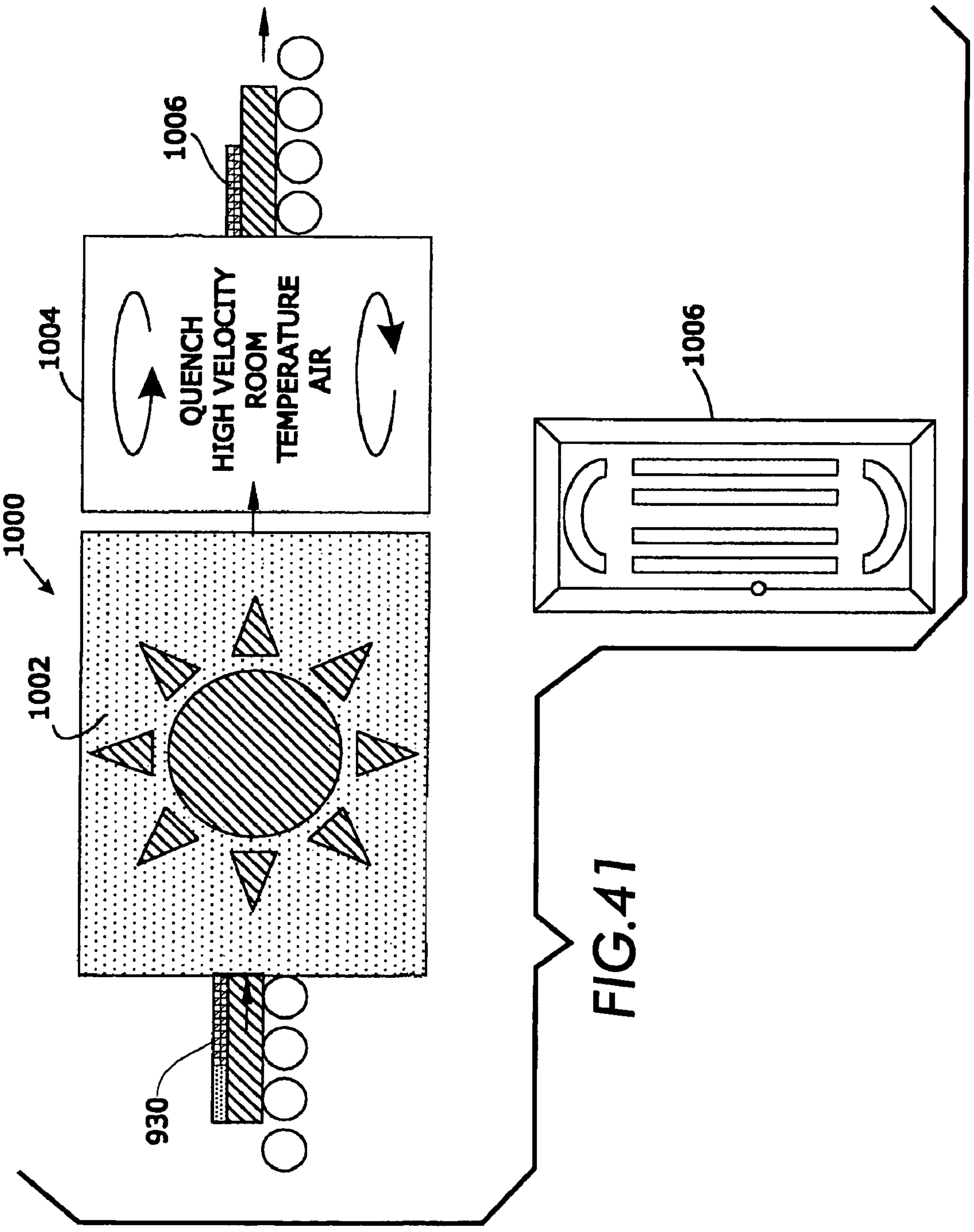

Each of FIGS. 2, 3, 4, 5, and 6 is a schematic of a preferred ribbon which may be used to prepare the ceramic substrate of FIG. 1;

FIG. 6A is a schematic representation of another preferred ribbon which may be used to prepare the ceramic substrate of FIG. 1;

Each of FIGS. 7 and 8 is a schematic of a preferred decal which may be used to prepare the ceramic substrate of FIG. 1;

Each of FIGS. 9, 10, 10A, and 11 is a flow diagram illustrating how the ribbon, a first decal, a second decal, and the printed ceramic substrate of the invention, respectively, is made;

FIG. 12 is a schematic representation of a thermal ribbon comprised of a frosting ink layer;

FIGS. 13, 13A, and 13B are schematic representations of other thermal ribbons comprised of a frosting ink layer;

FIG. 14 is a schematic representation of a heat transfer paper made with the thermal ribbon of FIG. 12 or FIG. 13;

FIG. 15 is a schematic representation of a Waterslide paper assembly made with the thermal ribbon of FIG. 12 or FIGS. 13, 13A, or 13B;

FIG. 16 is a schematic representation of a transferable covercoat paper assembly;

FIG. 17 is a flow diagram illustrating a process for making a frosting ink image decal with either the heat transfer paper of FIG. 14, the Waterslide paper assembly of FIG. 15, or the transferable covercoat assembly of FIG. 16;

FIG. 18 is a flow diagram/logic diagram describing how one may transfer the frosting ink image decal of FIG. 17 to a ceramic substrate;

FIG. 19 is a schematic representation of a ceramic substrate on which is disposed a frosting ink image and two covercoat layers;

FIG. 20 is a schematic representation of a flexible substrate on which is disposed a frosting ink image;

FIG. 21 is a schematic representation of a ceramic substrate on which is disposed the flexible substrate of FIG. 20;

FIG. 22 is a schematic representation of a laminated structure in which the flexible substrate assembly of FIG. 20 is disposed between two ceramic layers;

FIG. 23 is a schematic representation of a ceramic substrate beneath which is disposed a frosting ink image;

FIG. 24 is a flow diagram of one preferred process of the invention;

FIGS. 25A and 25B are schematics of two preferred decals which may be used in the process depicted in FIG. 24;

FIG. 26 is a schematic of a preferred adhesive assembly that may be used in the process depicted in FIG. 24;

FIG. 27 is a schematic of one preferred lamination step of the process depicted in FIG. 24;

FIG. 28 is a schematic of one preferred stripping step of the process depicted in FIG. 24 in which release paper is stripped away from pressure sensitive adhesive;

FIG. 29 is a schematic of one preferred lamination step of the process depicted in FIG. 24 in which the decal is laminated to a glass substrate with pressure;

FIG. 30 is a schematic of one preferred stripping step of the process depicted in FIG. 24 in which a paper/wax resin release layer is stripped away to leave a covercoated image on the ceramic substrate;

FIG. 31 is a schematic of the assembly containing the covercoated image on the ceramic substrate;

FIG. 32 is a schematic of a process of evaluating the optical properties of the ceramic substrate with an image fixed to it;

FIG. 33 is a schematic of a preferred embodiment of a transfer sheet assembly of the invention;

FIG. 34 is a schematic of another transfer sheet assembly of the invention;

FIG. 35 is a schematic of a preferred imaging process of the invention;

FIGS. 36, 37, 38A, 38B, and 39 are schematic diagrams of business processes for ordering a desired finished substrate product and thereafter fabricating such product;

FIG. 40 is a schematic diagram of a preferred process for transferring an image onto a ceramic substrate; and FIG. 41 is a schematic diagram for heat treating a ceramic substrate onto which a digital image has been transferred.

DESCRIPTION OF THE PREFERRED EMBODIMENTS

In the first part of this specification, a novel thermal ribbon for heat treated ceramic decals will be discussed.

FIG. 1 is a schematic representation of a printed ceramic substrate 10 made in accordance with one preferred process of this invention; this Figure, and the other Figures in this patent application, are not necessarily drawn to scale.

As used in this specification, the term “substrate” refers to a material to which a printed image is affixed; and it is often used with reference to a ceramic substrate that is heat treated after the image is affixed to it.

By comparison, and as used in this specification, the term “support” refers to a material that is coated with one or more layers of material and, after being so coated, may be used to prepare means for transferring the printed image to the substrate. Thus, e.g., the term “support” may be used with regard to, e.g., a thermal transfer ribbon, a decal assembly, a transferable covercoat assembly, etc.

The process of this invention is applicable to both ceramic substrates (such as, e.g., substrates comprised of glass, porcelain, ceramic whitewares, metal oxides, clays, porcelain enamel coated substrates and the like) and non-ceramic substrates (such as, e.g., substrates comprised of polymers, thermoplastics, elastomers, thermosets, organic coatings, films, composites, sheets and the like) Any substrate capable of receiving the decal of this invention may be used herein.

As used herein, the term "ceramic" includes both glass, conventional oxide ceramics, and non-oxide ceramics (such as carbides, nitrides, etc.). When the ceramic material is glass, and in one preferred embodiment, such glass is preferably float glass made by the float process. See, e.g., pages 43 to 51 of "Commercial Glasses," published by The American Ceramic Society, Inc. (of Columbus Ohio) in 1984 as "Advances in Ceramics, Volume 18." Other glass or glass-containing substrates are described elsewhere in this specification.

Referring again to FIG. 1, printed ceramic substrate 10 comprises a ceramic substrate 12 onto which one or more color images are fixed.

In one embodiment, the ceramic substrate 12 used in the process of this invention preferentially has a melting temperature of at least 550 degrees Celsius. As used in this specification, the term melting temperature refers to the temperature or range of temperatures at which heterogeneous mixtures, such as a glass batch, glazes, and porcelain enamels, become molten or softened. See, e.g., page 165 of Loran S. O'Bannon's "Dictionary of Ceramic Science and Engineering" (Plenum Press, New York, 1984). In one embodiment, it is preferred that the substrate have a melting temperature of at least about 580 degrees Celsius. In another embodiment, such melting temperature is from about 580 to about 1,200 degrees Celsius.

The ceramic substrate used in the process of this invention, in one embodiment, preferably is a material that is subjected to a temperature of at least about 550 degrees Celsius during processing and, in one aspect of this embodiment, comprises one or more metal oxides. Typical of such preferred ceramic substrates are, e.g., glass, ceramic whitewares, enamels, porcelains, etc. Thus, by way of illustration and not limitation, one may use the process of this invention to transfer and fix color images onto ceramic substrates such as dinnerware, outdoor signage, glassware, imaged giftware, architectural tiles, color filter arrays, floor tiles, wall tiles, perfume bottles, wine bottles, beverage containers, and the like.

Referring again to FIG. 1, and in the preferred embodiment depicted therein, it will be seen that a frit underlayer 14 is disposed on top of and bonded to the top surface of the ceramic substrate 12. Frit underlayer 14 is preferably transferred to the ceramic substrate surface at a coating weight (coverage) of at least about 1 gram per square meter. It is preferred to use a coating weight (coverage) for frit layer 14 of at least 7 grams per square meter; and it is more preferred to use a coating weight (coverage) for layer 14 of at least about 14 grams per square meter. As will be apparent, the coating weight (coverage) referred to herein is a dry weight, by weight of components which contain less than 1 percent of solvent.

The coating composition used to apply frit underlayer 14 onto ceramic substrate 12 preferably contains frit with a melting temperature of at least about 300 degrees Celsius and, more preferably, about 550 degrees Celsius. As used in this specification, the term frit refers to a glass which has been melted and quenched in water or air to form small friable particles which then are processed for milling for use as the major constituent of porcelain enamels, fritted glazes, frit chinaware, and the like. See, e.g., page 111 of Loran S. O'Bannon's "Dictionary of Ceramic Science and Engineering," supra. As used herein, the terms frit and flux are used interchangeably.

As used herein, the terms frit and flux are not included within the term "metal oxide containing ceramic colorant." The latter term, as used in this specification, refers only to metal-oxide containing opacifying agents, metal-oxide containing pigments, and mixtures thereof.

In one embodiment, and referring again to FIG. 1, the frit used in the process of this invention has a melting temperature of at least about 750 degrees Celsius. In another embodiment, the frit used in the process of this invention has a melting temperature of at least about 950 degrees Celsius.

One may use commercially available frits. Thus, by way of illustration and not limitation, one may use a frit sold by the Johnson Matthey Ceramics Inc. (498 Acorn Lane, Downington, Pa. 19335) as product number 94C1001 ("Onglaze Unleaded Flux"), 23901 ("Unleaded Glass Enamel Flux,"), and the like. One may use a flux sold by the Cerdec Corporation of P.O. Box 519, Washington, Pa. 15301 as product number 9630.

In one embodiment, the melting temperature of the frit used is either substantially the same as or no more than 50 degrees Celsius lower than the melting point of the substrate to which the colored image is to be affixed.

In another embodiment, the melting point of the frit used is at least 50 degrees Celsius lower than the melting point of the opacifying agent used in the thermal transfer ribbon. In one aspect of this embodiment, the melting point of the frit used is at least about 100 degrees Centigrade lower than the melting point of the opacifying agent used in the thermal transfer ribbon. As indicated hereinabove, the opacifying agent(s) is one embodiment of the metal oxide containing ceramic colorant.

The frit used in the coating composition, before it is melted onto the substrate by the heat treatment process described elsewhere in this specification, preferably has a particle size distribution such that substantially all of the particles are smaller than about 10 microns. In one embodiment, at least about 80 weight percent of the particles are smaller than 5.0 microns.

One may use many of the frits known to those skilled in the art such as, e.g., those described in U.S. Pat. Nos. 5,562,748; 5,476,894; 5,132,165; 3,956,558; 3,898,362; and the like. Similarly, one may use some of the frits disclosed on pages 70-79 of Richard R. Eppler et al.'s "Glazes and Glass Coatings" (The American Ceramic Society, Westerville, Ohio, 2000).

Referring again to FIG. 1, the frit underlayer 14 preferably comprises at least about 25 weight percent of one or more frits, by total dry weight of all components in frit underlayer 14. In one embodiment, from about 35 to about 85 weight percent of frit material is used in frit underlayer 14. In another embodiment, from about 65 to about 75 percent of such frit material is used.

It is preferred that the frit material used in frit underlayer 14 comprise at least about 5 weight percent, by dry weight, of silica. As used herein, the term silica is included within the meaning of the term metal oxide; and the preferred frits used in the process of this invention comprise at least about 98 weight percent of one or more metal oxides selected from the group consisting of lithium, sodium, potassium, calcium, magnesium, strontium, barium, zinc, boron, aluminum, silicon, zirconium, lead, cadmium, titanium, and the like.

Referring again to FIG. 1, in addition to the frit, frit underlayer 14 also comprises one or more thermoplastic binder materials in a concentration of from about 0 to about 75 percent, based upon the dry weight of frit and binder in such frit underlayer 14. In one embodiment, the binder is present in a concentration of from about 15 to about 35 percent. In another embodiment, the frit underlayer 14 comprises from about 15 to about 75 weight percent of binder.

One may use any of the thermal transfer binders known to those skilled in the art. Thus, e.g., one may use one or more of the thermal transfer binders disclosed in U.S. Pat. Nos. 6,127,316; 6,124,239; 6,114,088; 6,113,725; 6,083,610; 6,031,556; 6,031,021; 6,013,409; 6,008,157; 5,985,076; and the like. The entire disclosure of each of these United States patents is hereby incorporated by reference into this specification.

By way of further illustration, one may use a binder which preferably has a softening point from about 45 to about 150 degrees Celsius and a multiplicity of polar moieties such as, e.g., carboxyl groups, hydroxyl groups, chloride groups, carboxylic acid groups, urethane groups, amide groups, amine groups, urea, epoxy resins, and the like. Some suitable binders within this class include polyester resins, bisphenol-A polyesters, polyvinyl chloride, copolymers made from terephthalic acid, polymethyl methacrylate, vinylchloride/vinylacetate resins, epoxy resins, nylon resins, urethane-formaldehyde resins, polyurethane, mixtures thereof, and the like.

In one embodiment a mixture of two synthetic resins is used. Thus, e.g., one may use a mixture comprising from about 40 to about 60 weight percent of polymethyl methacrylate and from about 40 to about 60 weight percent of vinylchloride/vinylacetate resin. In this embodiment, these materials collectively comprise the binder.

In one embodiment, the binder comprises polybutylmethacrylate and polymethylmethacrylate, comprising from 10 to 30 percent of polybutylmethacrylate and from 50 to 80 percent of the polymethyl methacrylate. In one embodiment, this binder comprises cellulose acetate propionate, ethylenevinylacetate, vinyl chloride/vinyl acetate, urethanes, etc.

One may obtain these binders from many different commercial sources. Thus, e.g., some of them may be purchased from Dianal America Company of 9675 Bayport Blvd., Pasadena, Tex. 77507; suitable binders available from this source include "Dianal BR 113" and "Dianal BR 106." Similarly, suitable binders may also be obtained from the Eastman Chemicals Company (Tennessee Eastman Division, Box 511, Kingsport, Tenn.).

Referring again to FIG. 1, in addition to the frit and the binder, the frit underlayer 14 may optionally contain from about 0 to about 75 weight percent of wax and, preferably, from about 5 to about 20 weight percent of such wax. In one embodiment, frit underlayer 14 comprises from about 5 to about 10 weight percent of such wax. Suitable waxes which may be used include, e.g., carnuaba wax, rice wax, beeswax, candelilla wax, montan wax, paraffin wax, microcrystalline waxes, synthetic waxes such as oxidized wax, ester wax, low molecular weight polyethylene wax, Fischer-Tropsch wax, and the like. These and other waxes are well known to those skilled in the art and are described, e.g., in U.S. Pat. No. 5,776,280. One may also use ethoxylated high molecular weight alcohols, long chain high molecular weight linear alcohols, copolymers of alpha olefin and maleic anhydride, polyethylene, polypropylene, and the like.

These and other suitable waxes are commercially available from, e.g., the Baker-Hughes Baker Petrolite Company of 12645 West Airport Blvd., Sugarland, Tex.

In one preferred embodiment, carnauba wax is used as the wax. As is known to those skilled in the art, carnauba wax is a hard, high-melting lustrous wax which is composed largely of ceryl palmitate; see, e.g., pages 151-152 of George S. Brady et al.'s "Material's Handbook," Thirteenth Edition (McGraw-Hill Inc., New York, N.Y., 1991). Reference also may be had, e.g., to U.S. Pat. Nos. 6,024,950; 5,891,476; 5,665,462; 5,569,347; 5,536,627; 5,389,129; 4,873,078; 4,536,218; 4,497,851; 4,4610,490; and the like. The entire disclosure of each of these United States Patents is hereby incorporated by reference into this specification.

Frit underlayer 14 may also be comprised of from about 0 to 16 weight percent of one or more plasticizers adapted to plasticize the resin used. Those skilled in the art are aware of which plasticizers are suitable for softening any particular resin. In one embodiment, there is used from about 1 to about 15 weight percent, by dry weight, of a plasticizing agent. Thus, by way of illustration and not limitation, one may use one or more of the plasticizers disclosed in U.S. Pat. No. 5,776,280 including, e.g., adipic acid esters, phthalic acid esters, chlorinated biphenyls, citrates, epoxides, glycerols, glycol, hydrocarbons, chlorinated hydrocarbons, phosphates, esters of phthalic acid such as, e.g., di-2-ethylhexylphthalate, phthalic acid esters, polyethylene glycols, esters of citric acid, epoxides, adipic acid esters, and the like.

In one embodiment, frit underlayer 14 comprises from about 6 to about 12 weight percent of the plasticizer that, in one embodiment, is dioctyl phthalate. The use of this plasticizing agent is well known and is described, e.g., in U.S. Pat. Nos. 6,121,356; 6,117,572; 6,086,700; 6,060,214; 6,051,171; 6,051,097; 6,045,646; and the like. The entire disclosure of each of these United States patents is hereby incorporated by reference into this specification.

Other suitable plasticizers may be obtained from, e.g., the Eastman Chemical Company.

Referring again to FIG. 1, and in the preferred embodiment depicted therein, it will be seen that, disposed over frit underlayer 14, is opacification layer 16. Opacification layer 16 is optional; but, when it is used, it preferably is used at a coating weight (coverage) of from about 0.5 to about 10 grams per square meter and, more preferably, from about 1 to about 5 grams per square meter.

As is known to those skilled in the art, the opacification layer functions to introduce whiteness or opacity into the substrate by utilizing a substance that disperses in the coating as discrete particles which scatter and reflect some of the incident light. In one embodiment, the opacifying agent is used on a transparent ceramic substrate (such as glass) to improve image contrast properties.

One may use opacifying agents that are known to work with ceramic substrates. Thus, e.g., one may use one or more of the agents disclosed in U.S. Pat. Nos. 6,022,819; 4,977,013 (titanium dioxide); U.S. Pat. No. 4,895,516 (zirconium, tin oxide, and titanium dioxide); U.S. Pat. No. 3,899,346; and the like. The disclosure of each of these United States patents is hereby incorporated by reference into this specification.

One may obtain opacifying agents obtained from, e.g., Johnson Matthey Ceramic Inc., supra, as, e.g., "Superpax Zirconium Opacifier."

The opacification agent used, in one embodiment, preferably has a melting temperature at least about 50 degrees Celsius higher than the melting point of the frit(s) used in layer 14. Generally, the opacification agent(s) has a melting temperature of at least about 350 degrees Celsius.

The opacification agent, in one embodiment, preferably has a refractive index of greater than 2.0 and, preferably, greater than 2.4.

The opacification agent, in one embodiment, preferably has a particle size distribution such that substantially all of the particles are smaller than about 20 microns and, more preferably, about 10 microns. In one embodiment, at least about 80 weight percent of the particles are smaller than 5.0 microns.

Referring again to FIG. 1, in addition to the opacification agent, opacification layer 16 also is preferably comprised of one or more thermoplastic binder materials in a concentration of from about 0 to about 75 weight percent, based upon the dry weight of opacification agent and binder in such layer 14. In one embodiment, the binder is present in a concentration of from about 15 to about 35 weight percent. One may use one or more of the binders described with reference to layer 14. Alternatively, one may use one or more other suitable binders.

In addition to the opacifying agent and the optional binder, one may also utilize the types and amounts of wax that are described with reference to layer 14, and/or different amounts of different waxes. Alternatively, or additionally, one may also use the types and amounts of plasticizer described with reference to layer 14. In general, the only substantive differences between layers 14 and 16 preferably are that the calculations are made with respect to the amount of opacifying agent (in layer 16) and not the amount of frit (as is done in layer 14).

Referring again to FIG. 1, one may optionally use a second frit layer 18 similar in composition and/or concentrations to layer 14. When such a second frit layer is used, it will be disposed over and printed over the opacification layer 16.

Disposed over the frit layer 14 is one or more color images 20. These ceramic colorant image(s) 20 will be disposed over either the ceramic substrate 12 or the frit layer 14, and/or the optional opacification layer 16 when used, and/or the optional second frit layer 18 when used.

In another embodiment, the image 20 is a bi-tonal image. In yet another embodiment, the image 20 is a black and white image.

In one embodiment, it is preferred to apply these image(s) with a digital thermal transfer printer. Such printers are well known to those skilled in the art and are described in International Publication No. WO97/00781, published on Jan. 7, 1997, the entire disclosure of which is hereby incorporated by reference into this specification. As is disclosed in this publication, a thermal transfer printer is a machine that creates an image by melting ink from a film ribbon and transferring it at selective locations onto a receiving material. Such a printer normally comprises a print head including a plurality of heating elements that may be arranged in a line. The heating elements can be operated selectively.

Alternatively, or additionally, the image(s) may be printed by means of xerography, ink jet printing, silk screen printing, lithographic printing, and the like.

Alternatively, one may use one or more of the thermal transfer printers disclosed in U.S. Pat. Nos. 6,124,944; 6,118,467; 6,116,709; 6,103,389; 6,102,534; 6,084,623; 6,083,872; 6,082,912; 6,078,346; and the like. The disclosure of each of these United States patents is hereby incorporated by reference into this specification.

Digital thermal transfer printers are readily commercially available. Thus, e.g., one may use a printer identified as Gerber Scientific's Edge 2 sold by the Gerber Scientific Corporation of Connecticut. With such a printer, the digital color image(s) may be applied by one or more appropriate ribbon(s) in the manner discussed elsewhere in this specification.

Referring again to FIG. 1, and in the preferred embodiment depicted therein, the pigment or pigments that form image 20 are mixed with one or more of the ingredients listed for the opacification layer, with the exception that the pigment(s) is substituted for the opacifying agent(s). Thus, a mixture of the pigment and/or binder and/or wax and/or plasticizer may be used. As will be apparent to those skilled in the art, no glass frit is used in colorant image 20.

As used herein, the term pigment is one of the two embodiments included within the term metal oxide containing ceramic colorant; the other such embodiment is the aforementioned opacifying agent(s).

Referring again to FIG. 1, it is this element 20 that is selectively applied by the color printer. One such mixture, comprised of one color, may first be digitally printed, optionally followed by one or more differently colored mixtures. The number of colors one wishes to obtain in element 20 will dictate how many different colors are printed.

Although not willing to be bound to any particular theory, applicants believe that the pigment mixtures applied as element 20 tend to admix to some degree.

The amount of pigment used in the composite 11 should not exceed a certain percentage of the total amount of frit used in such composite, generally being 33.33 percent or less. Put another way, the ratio of the total amount of frit in the composite 11 (which includes layers 14, 18, and 24) to the amount of pigment in element 20, in grams/grams, dry weight, should be at least about 2 and, preferably, should be at least about 3. In one embodiment, such ratio is at least 4.0. In another such embodiment, such ratio of frit/pigment is from about 5 to 6. It is noteworthy that, in the process described in U.S. Pat. No. 5,665,472, such ratio was 0.66 (Example 1 at Column 5), or 0.89 (Example 2 at Columns 5-6), or 1.1 (Example 3 at Column 6). At Column 4 of U.S. Pat. No. 5,665,472 (see lines 44 to 49), the patentee teaches that "The proportion of the weight of the bismuth oxide/borosilicate glass frit to the weight of the colorant is preferably 50 to 200%. . . . " Thus, substantially more colorant as a function of the frit concentration is used in the process of such patent than is used in this embodiment of applicants' process.

In another embodiment of the invention, the ratio of frit used in the process to pigment used in the process is at least 1.25.

The unexpected results that are obtained when the frit/pigment ratios of this embodiment of the invention are substituted for the frit/pigment ratios of the prior art, and when the frit and pigment layers are separated, are dramatic. A substantially more durable product is produced by this embodiment of the instant invention.

Furthermore, applicants have discovered that, despite the use of substantial amounts of pigment, the process described in U.S. Pat. No. 5,665,472 does not produce transferred images with good color density. Without wishing to be bound to any particular theory, applicants believe that there is a certain optimal amount of encapsulation and immobilization of colorant and/or dissolution of colorant within the frit which is impeded by high concentrations of colorant.

It is disclosed in U.S. Pat. No. 5,665,472 that "The thermal transfer sheet of the present invention can, of course, cope with color treatment," and this statement is technically true. However, such process does not cope very well and must be modified in accordance with applicants' unexpected discoveries to produce a suitable digitally printed backing sheet with adequate durability and color intensity.

The only pigment disclosed in U.S. Pat. No. 5,665,472 is a heat treated pigment comprised of ferric oxide, cobalt oxide, and chromium trioxide in what appears to be a spinel structure. It is not disclosed where this pigment is obtained from, or what properties it has.

The pigments that work well in this embodiment of applicants' process preferably each contain at least one metal-oxide. Thus, a blue colorant can contain the oxides of a cobalt, chromium, aluminum, copper, manganese, zinc, etc. Thus, e.g., a yellow colorant can contain the oxides of one or more of lead, antimony, zinc, titanium, vanadium, gold, and the like. Thus, e.g., a red colorant can contain the oxides of one or more of chromium, iron (two valence state), zinc, gold, cadmium, selenium, or copper. Thus, e.g., a black colorant can contain the oxides of the metals of copper, chromium, cobalt, iron (plus two valence), nickel, manganese, and the like. Furthermore, in general, one may use colorants comprised of the oxides of calcium, cadmium, zinc, aluminum, silicon, etc.

Suitable pigments and colorants are well known to those skilled in the art. See, e.g., U.S. Pat. Nos. 6,120,637; 6,108,456; 6,106,910; 6,103,389; 6,083,872; 6,077,594; 6,075,927; 6,057,028; 6,040,269; 6,040,267; 6,031,021; 6,004,718; 5,977,263; and the like. The disclosure of each of these United States patents is hereby incorporated by reference into this specification.

By way of further illustration, some of the pigments which can be used in this embodiment of the process of this invention include those described in U.S. Pat. Nos. 6,086,846; 6,077,797 (a mixture of chromium oxide and blue cobalt spinel); U.S. Pat. No. 6,075,223 (oxides of transition elements or compounds of oxides of transition elements); U.S. Pat. No. 6,045,859 (pink coloring element); U.S. Pat. No. 5,988,968 (chromium oxide, ferric oxide); U.S. Pat. No. 5,968,856 (glass coloring oxides such as titania, cesium oxide, ferric oxide, and mixtures thereof); U.S. Pat. No. 5,962,152 (green chromium oxides); U.S. Pat. Nos. 5,912,064; 5,897,885; 5,895,511; 5,820,991 (coloring agents for ceramic paint); U.S. Pat. No. 5,702,520 (a mixture of metal oxides adjusted to achieve a particular color); and the like. The entire disclosure of each of these United States patents is hereby incorporated by reference into this specification.

The ribbons produced by one embodiment of the process of this invention are preferably leach-proof and will not leach toxic metal oxide. This is unlike the prior art ribbons described by Tanaka at Column 1 of U.S. Pat. No. 5,665,472, wherein he states that: "In the case of the thermal transfer sheet containing a glass frit in the binder of the hot-melt ink layer, lead glass has been used as the glass frit, posing a problem that lead becomes a toxic, water-soluble compound." Without wishing to be bound to any particular theory, applicants believe that this undesirable leaching effect occurs because the prior art combined the frit and colorant into a single layer, thereby not leaving enough room in the formulation for sufficient binder to protect the layer from leaching.

The particle size distribution of the pigment used in layer 20 should preferably be within a relatively narrow range. It is preferred that the colorant have a particle size distribution such that at least about 90 weight percent of its particles are within the range of 0.2 to 20 microns.

The pigment used preferably has a refractive index greater than 1.4 and, more preferably, greater than 1.6; and, furthermore, the pigment preferably should not decompose and/or react with the molten frit when subjected to a temperature in range of from about 550 to about 1200 degrees Celsius.

Referring again to FIG. 1, and the preferred embodiment depicted therein, a frit layer 22 optionally may be disposed over the ceramic pigment image element 20. This frit layer, when used, will be comparable to the frit layer 18 but need not necessarily utilize the same reagents and/or concentrations and/or coating weight.

Disposed over the pigment image element 20, and coated either onto such element 20 or the optional frit layer 22, is a frit covercoat 24. The properties of this frit covercoat 24 are often similar to the properties of covercoat 242 (see FIG. 34).

Covercoats are described in the patent art. See, e.g., U.S. Pat. No. 6,123,794 (covercoat used in decal); U.S. Pat. Nos. 6,110,632; 5,912,064; 5,779,784 (Johnson Matthey OPL 164 covercoat composition); U.S. Pat. Nos. 5,779,784; 5,601,675 (screen printed organic covercoat); U.S. Pat. No. 5,328,535 (covercoat for decal); U.S. Pat. No. 5,229,201; and the like. The disclosure of each of these United States patents is hereby incorporated by reference into this specification.

In one embodiment, the covercoat 24, in combination with the other frit-containing layers, provides sufficient frit so that the ratio of frit to pigment is within the specified range. Furthermore, in this embodiment, it should apply structural integrity to the ceramic pigment image element 20 so that, as described elsewhere in this specification, when composite 10 is removed from its backing material, it will retain its structural integrity until it is applied to the ceramic substrate.

The covercoat 24 should preferably be substantially water-insoluble so that, after it is contacted with water at 40 degrees Celsius for 1 minute, less than 0.5 percent will dissolve.

The covercoat 24 should preferably have an elongation at break, as measured at 20 degrees Celsius by A.S.T.M. Test D638-58T, of more than 1 percent. As used herein, the term elongation at break refers to the difference between the length of the elongated covercoat and the length of the non-elongated covercoat, divided by the length of the non-elongated covercoated, expressed as a percentage.

In one embodiment, the elongation to break of the covercoat 24 is greater than about 5 percent.

It is has been found that certain acrylates, such as polymethylmethacrylate, have ambient temperature elongations to break that are too low to be useful in applicants' process. By comparison, these acrylates may be used in prior art processes at the elevated temperatures required thereby, such as, e.g., the process of U.S. Pat. No. 5,069,954 (see, e.g., the paragraph beginning at line 59 of column 4 of such patent).

In one embodiment, the covercoat 24 comprises from about 0 to about 10 weight percent of tackifying agent, by total weight of tackifying agent and covercoat binder. As used herein, the term tackifying agent includes both plasticizing agents and tackifiers. See, e.g., U.S. Pat. No. 5,069,954 (at column 6) wherein the use of sucrose acetate iso-butyrate is described. It is preferred not to use more than about 10 weight percent of such tackifying agent in that it has been found that over tackifying of the covercoat 24 often limits the use of the covercoat in thermal transfer printing processes. The excess tackifying agent creates such adhesion between the covercoated substrate and the thermal transfer ribbon that undesired pressure transfer of the ink occurs.

The covercoat 24 should be applied at a sufficient coating weight to result in a coating weight of at least 1 gram per square meter and, more preferably, at least 5 grams per square meter. In one embodiment, the covercoat 24 is applied at a coating weight of at least 10 grams per square meter.

In one embodiment, the covercoat 24 preferably comprises the aforementioned frit and carbonaceous material(s) such that, in one preferred embodiment, when subjected to a temperature of 500 degrees Celsius for at least 6 minutes, the covercoat will be substantially completely converted to gaseous material. The aforementioned binders, and/or waxes, and/or plasticizers described, e.g., with relation to layers 14, 16, 18, 20, 22, and 24, are suitable carbonaceous materials, and one or more of them may be used in the proportions described with regard to layer 14 to constitute the covercoat.

One may use a covercoat 24 that is similar in composition and structure to the layer 14. In one embodiment, it is preferred that the covercoat 24 be comprised of a binder selected from the group consisting of polyacrylate binders, polymethacrylate binders, polyacetal binders, mixtures thereof, and the like.

Some suitable polyacrylate binders include polybutylacrylate, polyethyl-co-butylacrylate, poly-2-ethylhexylacrylate, and the like.

Some suitable polymethacrylate binders include, e.g., polymethylmethacrylate, polymethylmethacrylate-co-butylacrylate, polybutylmethacrylate, and the like.

Some suitable polyacetal binders include, e.g., polyvinylacetal, polyvinylbutyral, polyvinylformal, polyvinylacetal-co-butyral, and the like.

In one embodiment, covercoat 24 preferably has a softening point in the range of from about 50 to about 150 degrees Celsius.

In one embodiment, covercoat 24 comprises from 0 to 75 weight percent of frit and from 25 to about 100 weight percent of a material selected from the group consisting of binder, wax, plasticizer and mixtures thereof.

Figure 2:
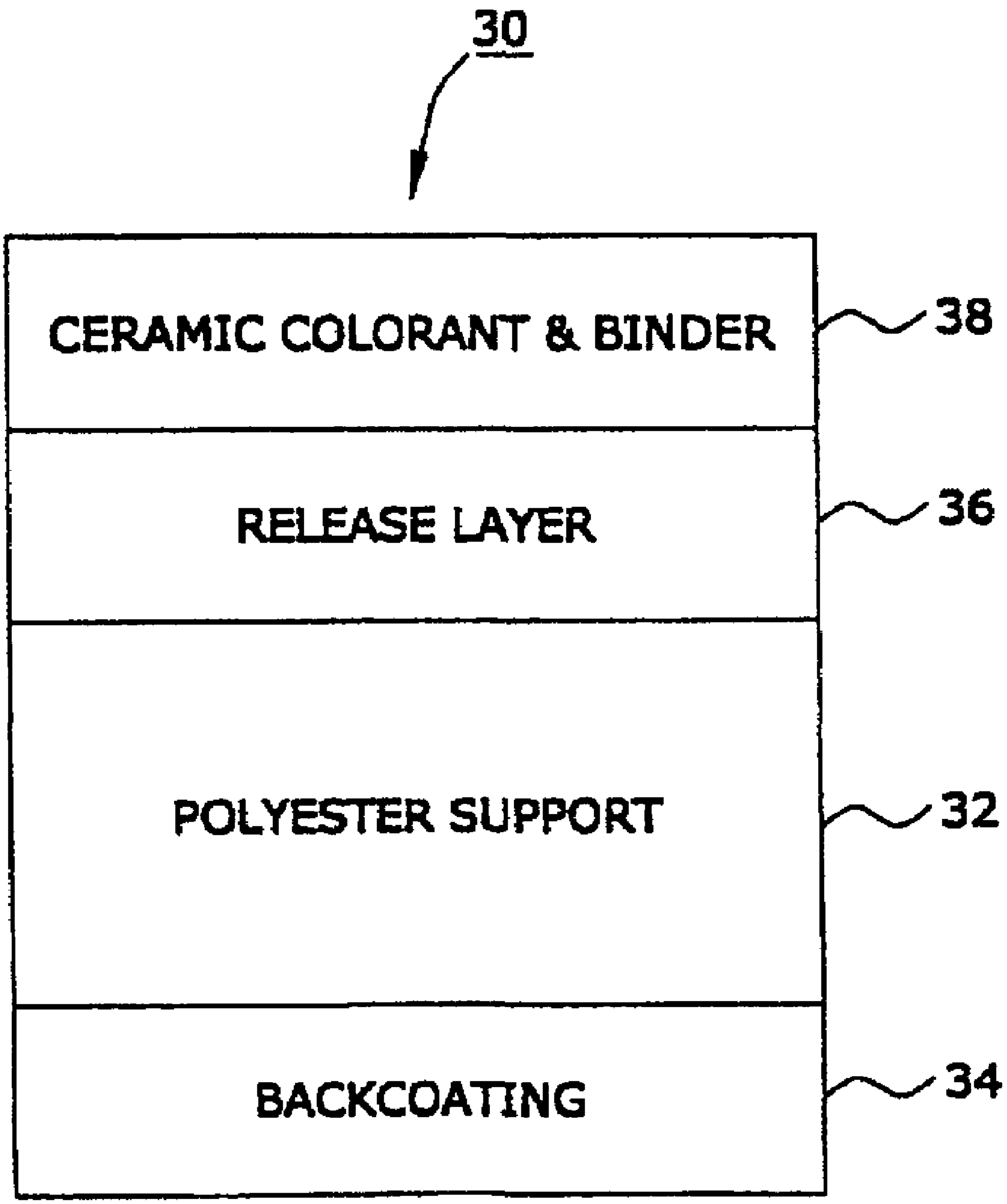

FIG. 2 is a schematic representation of a preferred ribbon 30 which may be used in the process of this invention. Referring to FIG. 2, it will be seen that ribbon 30 comprises a flexible support 32 that, in the embodiment depicted, is a polyester support.

Flexible support 32 may be any flexible support typically used in thermal transfer ribbons such as, e.g., the flexible supports described in U.S. Pat. No. 5,776,280, the entire disclosure of this patent is hereby incorporated by reference into this specification.

In one embodiment, flexible support 32 is a flexible material that comprises a smooth, tissue-type paper such as, e.g., 30-40 gauge capacitor tissue. In another embodiment, flexible support 32 is a flexible material consisting essentially of synthetic polymeric material, such as poly(ethylene terephthalate) polyester with a thickness of from about 1.5 to about 15 microns which, preferably, is biaxially oriented. Thus, by way of illustration and not limitation, one may use poly (ethylene terephthalate) film supplied by the Toray Plastics of America (of 50 Belvere Avenue, North Kingstown, R.I.) as catalog number F53.

By way of further illustration, flexible support 32 may be any of the flexible substrate films disclosed in U.S. Pat. No. 5,665,472, the entire disclosure of which is hereby incorporated by reference into this specification. Thus, e.g., one may use films of plastic such as polyester, polypropylene, cellophane, polycarbonate, cellulose acetate, polyethylene, polyvinyl chloride, polystyrene, nylon, polyimide, polyvinylidene chloride, polyvinyl alcohol, fluororesin, chlorinated resin, ionomer, paper such as condenser paper and paraffin paper, nonwoven fabric, and laminates of these materials.

Affixed to the bottom surface of support 32 is backcoating layer 34, which is similar in function to the "backside layer" described at columns 2-3 of U.S. Pat. No. 5,665,472, the entire disclosure of which is hereby incorporated by reference into this specification. The function of this backcoating layer 34 is to prevent blocking between a thermal backing sheet and a thermal head and, simultaneously, to improve the slip property of the thermal backing sheet.

Backcoating layer 34, and the other layers which form the ribbons of this invention, may be applied by conventional coating means. Thus, by way of illustration and not limitation, one may use one or more of the coating processes described in U.S. Pat. No. 6,071,585 (spray coating, roller coating, gravure, or application with a kiss roll, air knife, or doctor blade, such as a Meyer rod); U.S. Pat. No. 5,981,058 (myer rod coating); U.S. Pat. Nos. 5,997,227; 5,965,244; 5,891,294; 5,716,717; 5,672,428; 5,573,693; 4,304,700; and the like. The entire disclosure of each of these United States patents is hereby incorporated by reference into this specification.

Thus, e.g., backcoating layer 34 may be formed by dissolving or dispersing the above binder resin containing additive (such as a slip agent, surfactant, inorganic particles, organic particles, etc.) in a suitable solvent to prepare a coating liquid. Coating the coating liquid by means of conventional coating devices (such as Gravure coater or a wire bar) may then occur, after which the coating may be dried.

One may form a backcoating layer 34 of a binder resin with additives such as, e.g., a slip agent, a surfactant, inorganic particles, organic particles, etc.

Binder resins usable in the layer 34 include, e.g., cellulosic resins such as ethyl cellulose, hydroxyethylcellulose, hydroxypropylcellulose, methylcellulose, cellulose acetate, cellulose acetate buytryate, and nitrocellulose. Vinyl resins, such as polyvinylalcohol, polyvinylacetate, polyvinylbutyral, polyvinylacetal, and polyvinylpyrrolidone, also may be used. One also may use acrylic resins such as polyacrylamide, polyacrylonitrile-co-styrene, polymethylmethacrylate, and the like. One may also use polyester resins, silicone-modified or fluorine-modified urethane resins, and the like.

In one embodiment, the binder comprises a cross-linked resin. In this case, a resin having several reactive groups, for example, hydroxyl groups, is used in combination with a crosslinking agent, such as a polyisocyanate.

In one embodiment, a backcoating layer 34 is prepared and applied at a coat weight of 0.05 grams per square meter. This backcoating 34 preferably is polydimethylsiloxane-urethane copolymer sold as ASP-2200 by the Advanced Polymer Company of New Jersey.

One may apply backcoating layer 34 at a coating weight of from about 0.01 to about 2 grams per square meter, with a range of from about 0.02 to about 0.4 grams per square meter being preferred in one embodiment and a range of from about 0.5 to about 1.5 grams per square meter being preferred in another embodiment.

Referring again to FIG. 2, and in the preferred embodiment depicted therein, it will be seen that support 32 contains an optional release layer 36 coated onto the top surface of the support. The release layer 36, when used, facilitates the release of the ceramic pigment/binder layer 38 from substrate 32 when a thermal ribbon 30 is used to print at high temperatures.

Release layer 36 preferably has a thickness of from about 0.2 to about 2.0 microns and typically comprises at least about 50 weight percent of wax. Suitable waxes which may be used include, e.g., carnauba wax, rice wax, beeswax, candelilla wax, montan wax, paraffin wax, microcrystalline waxes, synthetic waxes such as oxidized wax, ester wax, low molecular weight polyethylene wax, Fischer-Tropsch wax, and the like. These and other waxes are well known to those skilled in the art and are described, e.g., in U.S. Pat. No. 5,776,280.

In one embodiment, at least about 75 weight percent of layer 36 comprises wax. In this embodiment, the wax used is preferably carnauba wax.

Minor amounts of other materials may be present in layer 36. Thus, one may include from about 5 to about 20 weight percent of heat-softening resin that softens at a temperature of from about 60 to about 150 degrees Celsius. Some suitable heat-softening resins include, e.g., the heat-meltable resins described in U.S. Pat. No. 5,525,403, the entire disclosure of which is hereby incorporated by reference into this specification. In one embodiment, the heat-meltable resin used is polyethylene-co-vinylacetate with a melt index of from about 40 to about 2500 decigrams per minute.

Referring again to FIG. 2, and in the preferred embodiment depicted therein, the release layer 36 may be omitted and the ceramic pigment/binder layer 38 may be directly contiguous with substrate 32.

Ceramic pigment/binder layer 38 is one of the layers preferably used to produce the ceramic pigment image 20. In the process of the invention, a multiplicity of thermal ribbons 30, each one of which preferably contains a ceramic pigment/ binder layer 38 with different pigment(s), are digitally printed to produce said ceramic pigment image 20. What these thermal ribbons preferably have in common is that they all contain both binder and pigment material of the general type and in the general ratios described for ceramic pigment image 20. In one preferred embodiment, there is substantially no glass frit in ceramic pigment image 20 (i.e., less than about 5 weight percent). The concentrations of pigment and binder, and the types of pigment and binder, need not be the same for each ribbon. What is preferably the same, however, are the types of components in general and their ratios.

Figure 3:
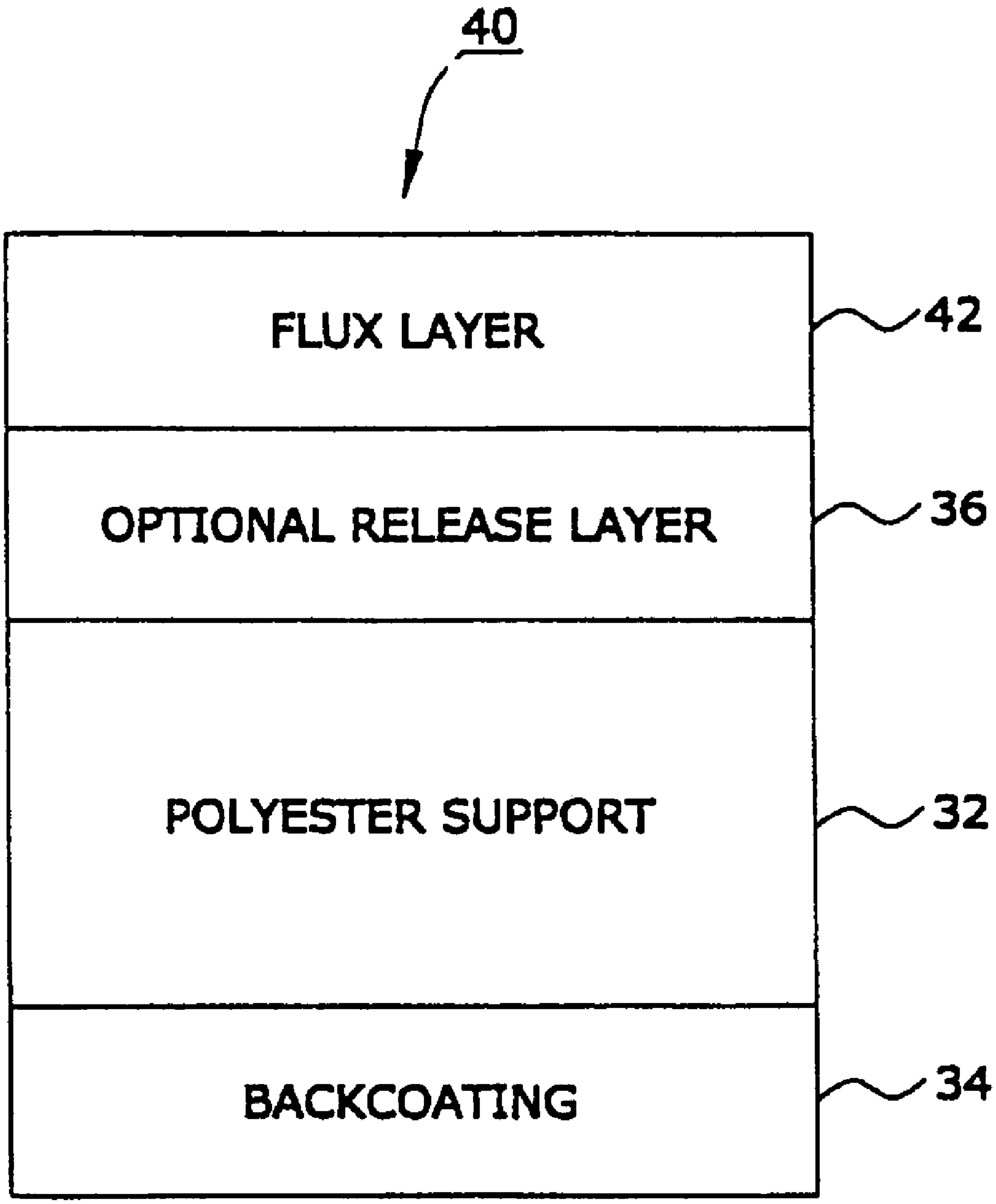

FIG. 3 is a schematic representation of a preferred ribbon 40 which is similar to the ribbon 30 depicted in FIG. 2 but differs therefrom in that it utilizes a flux layer 42 instead of the ceramic pigment and binder element 38. The frit layer 42, in general, has similar components, and ratios, as the composition of frit layer 18 (see FIG. 1) and is used to deposit layer frit underlayer 14 and/or second frit layer 18 and/or frit layer 22 onto the ceramic substrate 12. As will be apparent to those skilled in the art, the precise composition and coating weight of frit layer 42 will depend upon the precise composition and coating weight of the frit underlayer 14 and/or second frit layer 18 and/or frit layer 22 desired.

In the embodiment depicted in FIG. 1, at least 4 separate frit-containing layers are depicted. In general, it is preferred to utilize at least two such layers. In general, the number of layers of frit required will depend upon how much total frit must be used to keep the total frit/colorant ratio in composite 11 at least 2.0.

In one embodiment, it is preferred not to dispose all of the frit required in one layer. Furthermore, in this embodiment, it is preferred that at least some of the frit be disposed below the ceramic pigment image, and at least some of the frit be disposed above the ceramic pigment image.

In one embodiment, at least 10 weight percent of the total amount of frit used should be disposed on top of ceramic pigment image 20 in one or more frit layers (such as frit layer 22 and frit overcoat 24). In this embodiment, at least about 50 percent of the total amount of frit should be disposed below ceramic pigment image 20 in one or more of second frit layer 18 and/or frit underlayer 14.

In another embodiment, from about 30 to about 70 weight percent of the entire amount of frit used in the process of this invention is disposed below the ceramic image 20, and from about 70 to about 30 weight percent of the entire amount of frit used in the process of the invention should be disposed above the ceramic image 20. As will be apparent to those skilled in the art, a layer of material that contains frit need not necessarily be contiguous with the ceramic pigment image 20 to be disposed either below or above it. Thus, by way of illustration and not limitation, and referring to FIG. 1, the frit underlayer 14 is not contiguous with the ceramic pigment image 20 but is still disposed below such image.

In one embodiment, from about 40 to about 60 weight percent of the entire amount of frit used in the process of this invention is disposed below the ceramic image 20, and from about 60 to about 40 weight percent of the entire amount of frit used in the process of the invention should be disposed above the ceramic image 20. In yet another embodiment, from about 75 to about 90 weight percent of the entire amount of frit used in the process of this invention is disposed below the ceramic image 20, and from about 25 to about 10 weight percent of the entire amount of frit used in the process of the invention should be disposed above the ceramic image 20.

Applicants have discovered that, if the required amount of frit is not disposed above the ceramic image 20, poor color development occurs when cadmium pigments and other pigments are used. Inasmuch as the ceramic substrate 12 (see FIG. 1) is substantially as impervious as a sintered frit layer, applicants do not know precisely why this phenomenon occurs.

For non-cadmium-containing ceramic colorant images, applicants have discovered that acceptable results utilizing a single layer of frit may be obtained so long as the single layer of frit is positioned both above the ceramic colorant image 20 and the ceramic substrate 12 and provides a ratio of total frit to ceramic pigment in excess of about 1.25, weight/weight.

Figure 4:
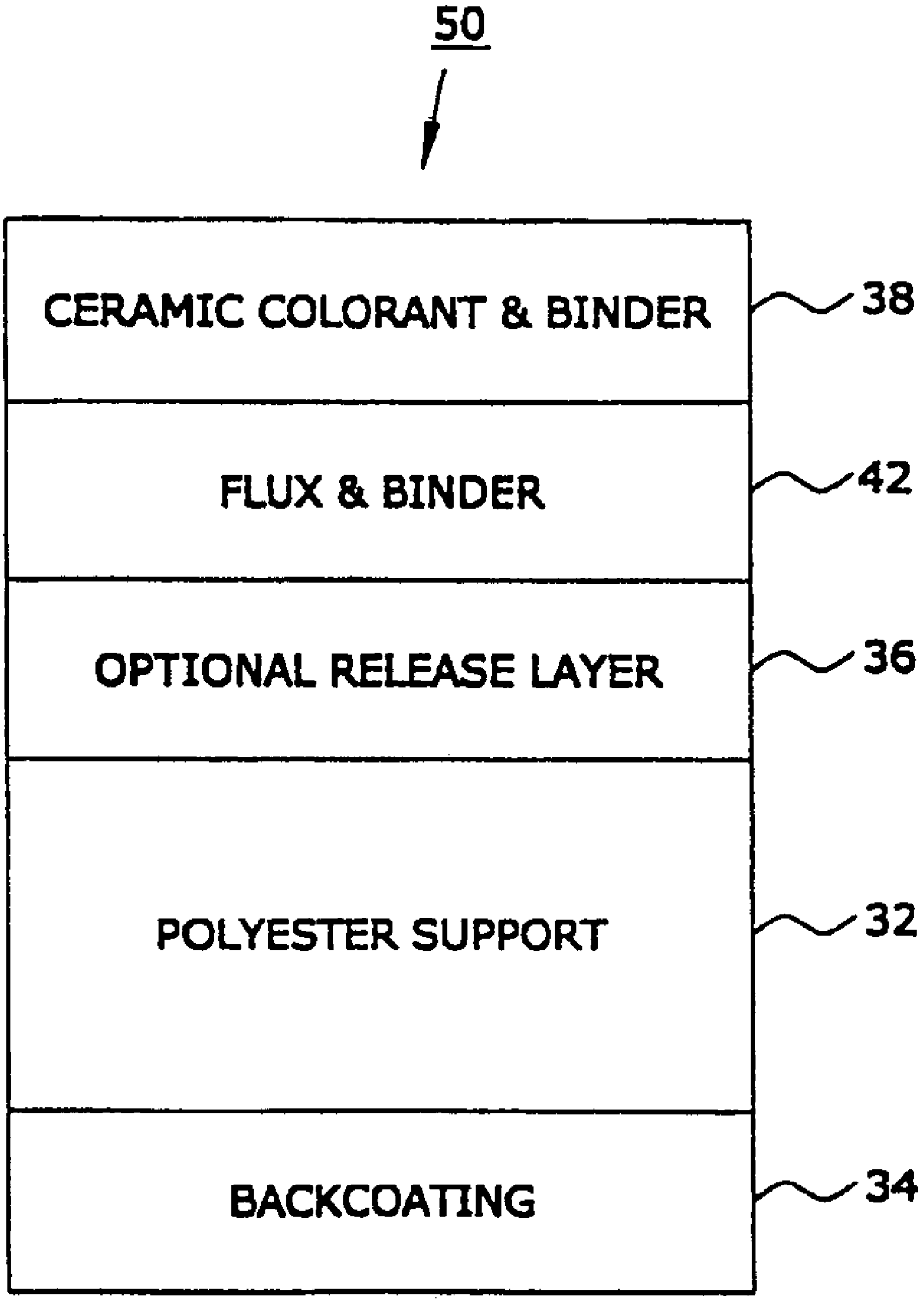

FIG. 4 is a schematic of yet another preferred ribbon 50 which is similar in construction to the ribbons depicted in FIGS. 2 and 3 but differs therefrom in containing a different arrangement of layers.

Figure 5:
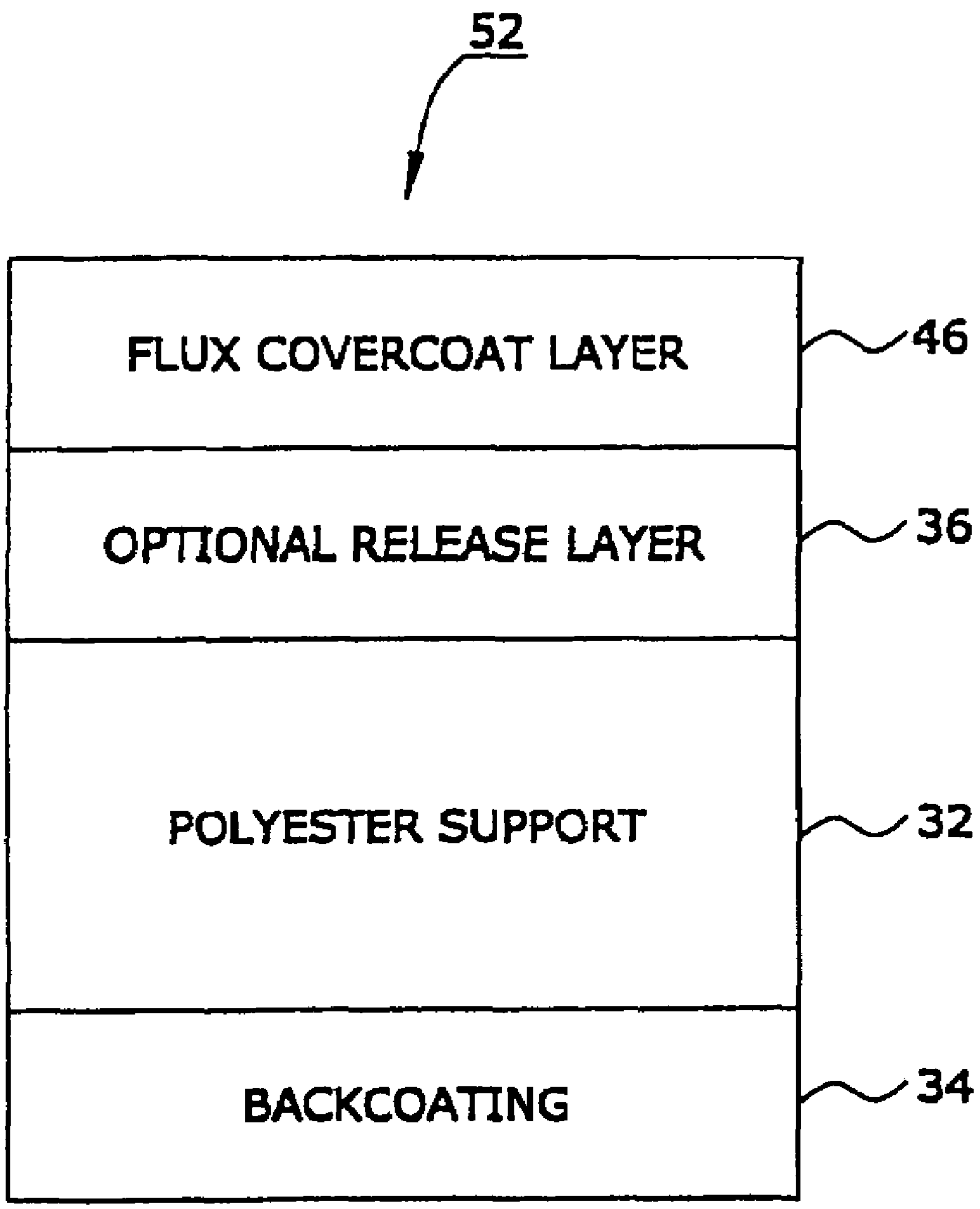

FIG. 5 is a schematic of yet another preferred ribbon 52 which is similar to the ribbons depicted in FIGS. 2, 3, and 4 but differs therefrom in containing a frit covercoat layer 46. As will be apparent to those skilled in the art, the frit covercoat layer 46 may be used to deposit the frit overcoat 24 (see FIG. 1) and, thus, preferably should have a composition similar to the desired overcoat 24.

FIG. 6 is a schematic of yet another preferred ribbon 54 which is similar to the other ribbons depicted but which, additionally, comprises opacification layer 48. The opacification layer 48 may be used to print opacification layer 16 (see FIG. 1) and, thus, should contain substantially the same components and ratios as described for layer 16.

FIG. 6A is a schematic representation of another preferred ribbon 60 of the invention which comprises backcoating layer 34, flexible support 32, and release layer 36. Disposed on top of release layer 36 are a multiplicity of panels which are disposed at selected locations on top of release layer 36. Using conventional printing techniques, one of such panels (such as panel 43) is first coated onto release layer 36 at the desired location, followed by selective coating of the second panel 45, the third panel 47 etc. Although the panels 43, 45, 47, 49, 51, 53, and 55 have been shown in a certain configuration in FIG. 6A, it will be apparent that other panels and/or other configurations may be used.

To obtain such selective location(s) of the panels, one may use a gravure coating press. What is obtained with this process is a ribbon with repeating sequences of various panels, which thus can be utilized in a single head thermal transfer printer to obtain a print image with multiple colors and or compositions and/or properties.

FIG. 7 is a schematic representation of a ceramic decal 70, which can be produced using one or more of the ribbons depicted in FIGS. 2 through 6A. The various panels 43, etc. shown in FIG. 6A represent one or more ceramic colorant panels used to produce a ceramic colorant image 20.

In one embodiment, each of the ceramic colorant panels contains metal-oxide ceramic colorant. As used herein, the term metal-oxide ceramic colorant includes metal oxide containing pigment, metal oxide containing opacifying agent, and mixtures thereof.

Referring to FIG. 7, and in the preferred embodiment depicted therein, the ceramic decal 70 is preferably comprised of flexible support 72.

Flexible support 72 is often referred to as a "backing sheet" in the prior art; see, e.g., U.S. Pat. No. 5,132,165 of Blanco, the entire disclosure of which is hereby incorporated by reference into this specification. Thus, e.g., flexible support 72 can include a dry strippable backing or a solvent mount or a water mount slide-off decal. The backing may be of paper or other suitable material such as, e.g., plastic, fabric, and the like. In one embodiment, the backing comprises paper that is coated with a release material, such as dextrine-coated paper.

Other possible backing layers include those coated with polyethylene glycol and primary aliphatic oxyethylated alcohols.

By way of further illustration, one may use "Waterslide" paper, which is commercially available paper with a soluble gel coat; such paper may be obtained from Brittians Papers Company of England. This paper is also described in U.S. Pat. Nos. 6,110,632; 5,830,529; 5,779,784; and the like; the entire disclosure of each of these United States patents is hereby incorporated by reference into this specification.

Additionally, one may use heat transfer paper, i.e., commercially available paper with a wax coating possessing a melt point in the range of from about 65 to about 85 degrees Celsius. Such heat transfer paper is discussed, e.g., in U.S. Pat. Nos. 6,126,669; 6,123,794; 6,025,860; 5,944,931; 5,916,399; 5,824,395; 5,032,449; and the like. The disclosure of each of these United States patents is hereby incorporated by reference into this patent application.

Regardless of what paper is used, and in one embodiment, it is optionally preferred that a frit layer 74 be either coated to or printed on such flexible support 72. The thickness of such frit layer 74 should be at least about 5 microns after such frit layer has dried, and even more preferably at least about 7 microns. Applicants have discovered that when a coating weight is used which produces a thinner frit layer 74, poor color development results when cadmium-based ceramic colorants are used. It should be noted that, in the process described in U.S. Pat. No. 5,132,165, a thickness of the "prefused glass frit layer" of only from about 3 to about 4 microns is disclosed.

In one embodiment, the flexible support 72 is adapted to separate from a release layer upon the application of minimal force. Thus, e.g., and referring to FIG. 14, the paper 226 (which acts as a flexible support 72) is preferably adapted to release from covercoat 224 upon the application of a linear stress of less than about 30 grams per centimeter at a temperature of 20 degrees Celsius. It is preferred that the peel strength required to separate the covercoat 224 be less than about 15 grams per centimeter at 20 degrees Celsius.

One may determine the force required to separate a covercoat from a flexible support by a test in which 1.27 centimeter×20.32 centimeter strips of covercoated support are prepared. The covercoat is then manually separated at 20 degrees Celsius from the support backing for 2.54 centimeters at the top of each strip. Each half of the strip is then mounted in the grips of a tensile device manufactured by the Sintech Division of MTS Systems company (P.O. Box 14226, Research Triangle Park, Raleigh, N.C. 22709) and identified as Sintech model 200/S. 200/S). Such use of the Sintech 200/S machine is well known. Reference may be had to, e.g., international patent publications WO0160607A1, WO0211978A, WO0077115A1, and the like; the entire disclosure of each of these patent publications is hereby incorporated by reference into this specification. The peel adhesion is measured at 25.4 centimeters per minute with a 5 pound load cell at a temperature of 20 degrees Celsius and ambient pressure.

Referring again to FIG. 7, ceramic colorant images 76 (yellow), and/or 78 (magenta) and/or 80 (cyan) and/or 82 (black) may be digitally printed by sequentially using one or more ribbons 30. Frit layers 42 may optionally be printed by utilizing ribbon 40, which can sequentially print frit layer 42 in between the various image colors. Alternatively, frit layer 42 may be printed simultaneously with the image colors by the use of ribbon 50.

The preferred ribbons depicted in FIGS. 2 through 6A afford one a substantial amount of flexibility, when using applicants' process, of preparing decals with many different configurations.

As will be apparent, one or more printers equipped with one or more of such ribbons can be controlled by a computer, which can produce a decal with substantially any desired combination of colors, colored patterns, images, and physical properties.

Referring again to FIG. 7, the frit covercoat 46 layer may be printed by means, e.g., of ribbon 52.

FIG. 8 is a schematic representation of a decal 81 which is similar in many respects to decal 70 (see FIG. 7) but differs therefrom in containing an opacification layer 48 which is similar in function and composition to the opacification layer 48 depicted for ribbon 54 (see FIG. 6); in another embodiment, not shown, the frit underlayer 14 is omitted. It should be noted that, in ceramic colorant image 20, a multiplicity of ceramic images may be digitally printed and superimposed on each other to form such image.

Figure 9:
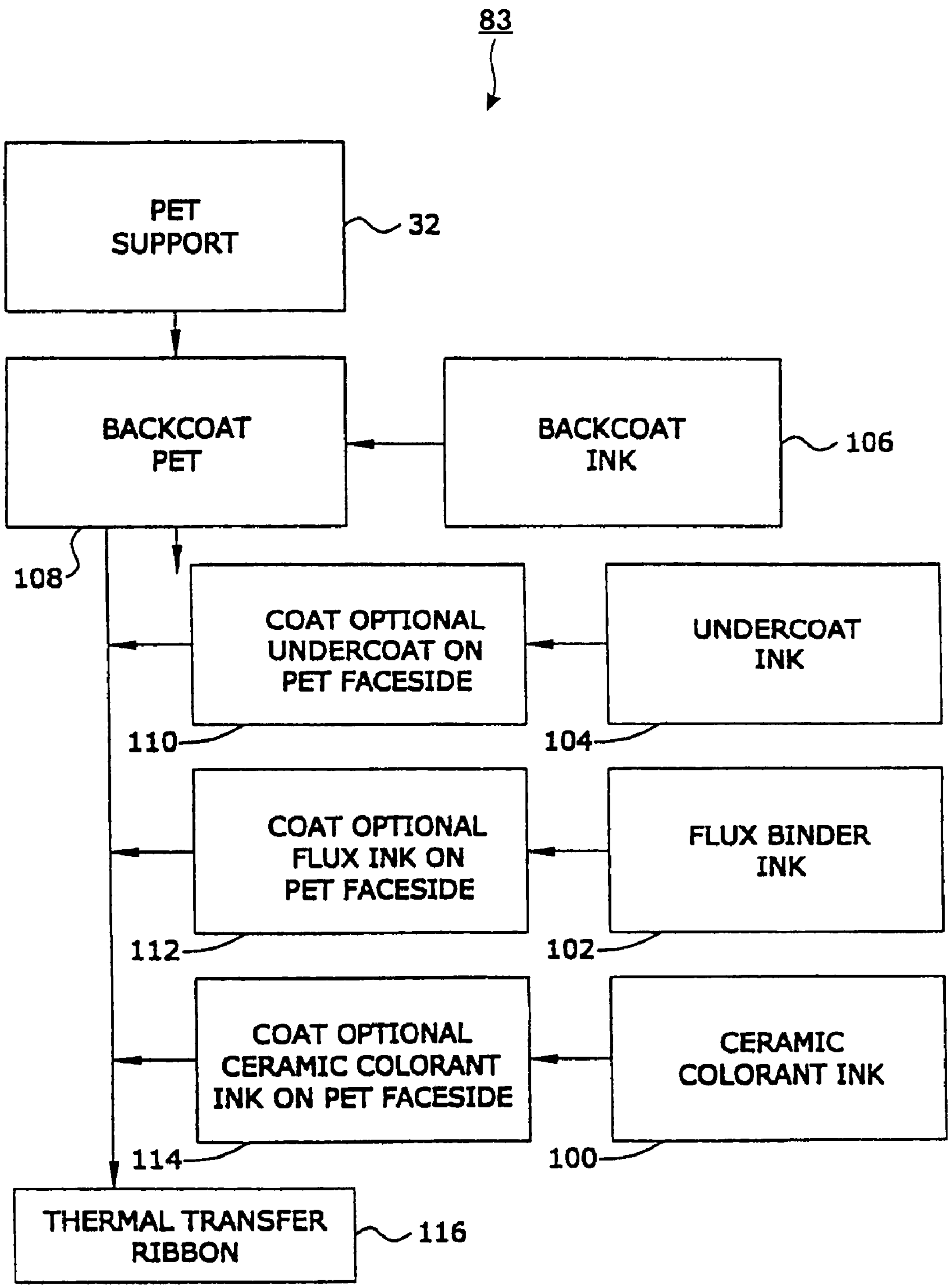

FIG. 9 is a flow diagram of one preferred process 83 for preparing a ribbon of this invention. As will be apparent to those skilled in the art, the process illustrated may be used to prepare ribbon 30, and/or ribbon 40, and/or ribbon 50, etc.

In step 100 of the process depicted in FIG. 9, one may prepare a ceramic colorant ink as described in this specification, in accordance with the description, e.g., of layer 38 of FIG. 2. This ink may be used to coat the faceside of polyester support 32 in step 114 (see FIG. 2).

In step 102, one may prepare a flux binder ink as described in this specification; see, e.g., layer 42 of FIG. 3 and its accompanying description. This flux binder ink may be used to either directly coat the faceside of the polyester support 32 in step 112, and/or coat over an optional release layer 36 in step 110.

In step 104, a release layer is prepared as described in this specification; see, e.g., release layer 36 of FIG. 2 and its accompanying description. This release layer 36 may optionally be used in step 110 to coat the face side of the polyester substrate 32.

In step 106, a backcoat ink may be prepared as described in this specification; see, e.g., backcoating layer 34 of FIG. 2 and its accompanying description. This backcoat layer 34 may be used to coat the backside of the polyester support in step 108.

In step 114, the faceside of the polyester support 32 may be coated with ceramic colorant ink.

As will be apparent to those skilled in the art, using the combination of steps illustrated in FIG. 9, one may readily prepare one or more of the ribbons illustrated in FIGS. 2 through 5. Furthermore, although not specifically depicted in FIG. 9, one may prepare an opacification layer in accordance with the description of opacification layer 48 (See FIG. 6 and its accompanying description) which may be used to prepare ribbons containing such opacification layer; also see FIG. 6A).

Figure 10:
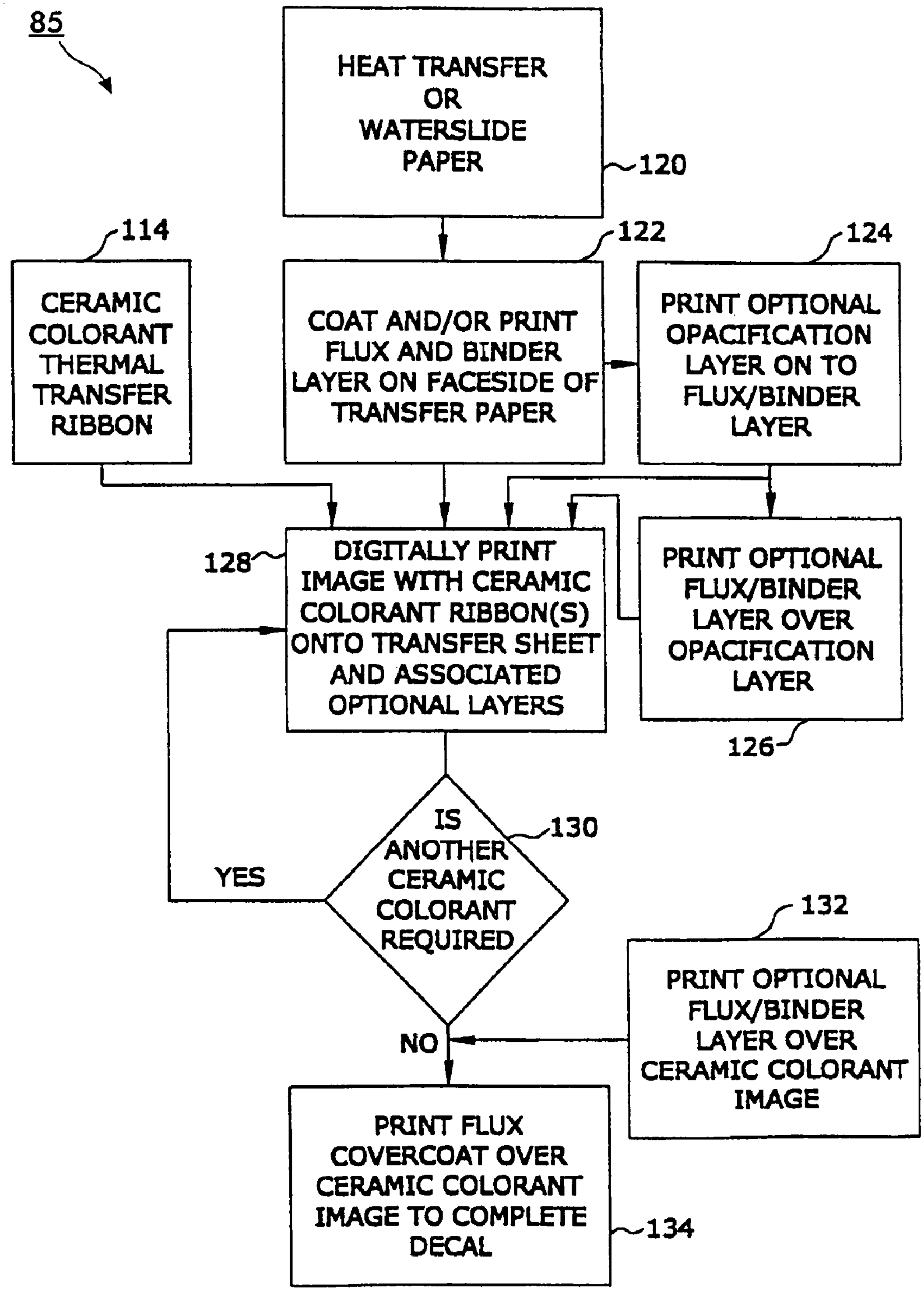

FIG. 10 is a schematic diagram of a preferred process 85 for producing a ceramic decal. In step 120, either heat transfer or Waterslide paper is provided; these papers are described in the specification (see element 72 of FIG. 7 and its accompanying description). A frit and binder layer is either coated or printed on the face of such transfer paper in optional step 122 (see element 74 of FIG. 7 and its accompanying description); and this frit and binder layer, when dried, is preferably at least about 7 microns thick.

In step 124, one may optionally print an opacification layer onto the frit binder layer described in step 122. This opacification layer corresponds to layer 48 of FIG. 8. It is preferred, when such opacification layer is used in step 122, to print an optional frit/binder layer over the opacification layer in step 126; this optional frit binder layer is described as element 42 of FIG. 8. However, as is illustrated in FIG. 10, the optional frit/binder layer may be omitted, and one may proceed directly from step 124 to step 128. Alternatively, one may omit both the opacification step and the optional frit binder layer step and proceed directly from step 122 to 128.

Whichever pathway one wishes to follow, it is preferred to use a ceramic colorant thermal transfer ribbon in step 128. The preparation of this ribbon is illustrated in FIG. 9.

In step 128, which may optionally be repeated one or more times with different ceramic colorant ribbons 114, a color image is digitally printed using such ribbon 116 and a digital thermal transfer printer. In one embodiment, prints were produced using a Zebra 140Xill thermal transfer printer run at 4 inches per second with energy level settings ranging from 18 to 24.

In one embodiment, the digital image to be printed is composed of one or more primary colors, and such image is evaluated to determine how many printings of one or more ceramic colorants are required to produce the desired image. Thus, in decision step 130, if another printing of the same or a different colored image is required, step 128 is repeated. If no such additional printing is required, one may then proceed to step 132 and/or step 134.

In optional step 132, an optional frit binder layer is printed over the ceramic colorant image produced in step(s) 128. This optional frit binder layer corresponds to element 42 of FIG. 8. Thereafter, either one goes from step 132 to 134, or one goes directly from decision step 130 to step 134. In printing step 134, a frit covercoat corresponding to element 24 of FIG. 8 is printed to complete the decal. As will be apparent to those skilled in the art, one may apply the covercoat over the entire decal (which includes both a printed image and an unprinted area[s]). Alternatively, one may apply the covercoat over the entire imaged areas.

Figure 11:
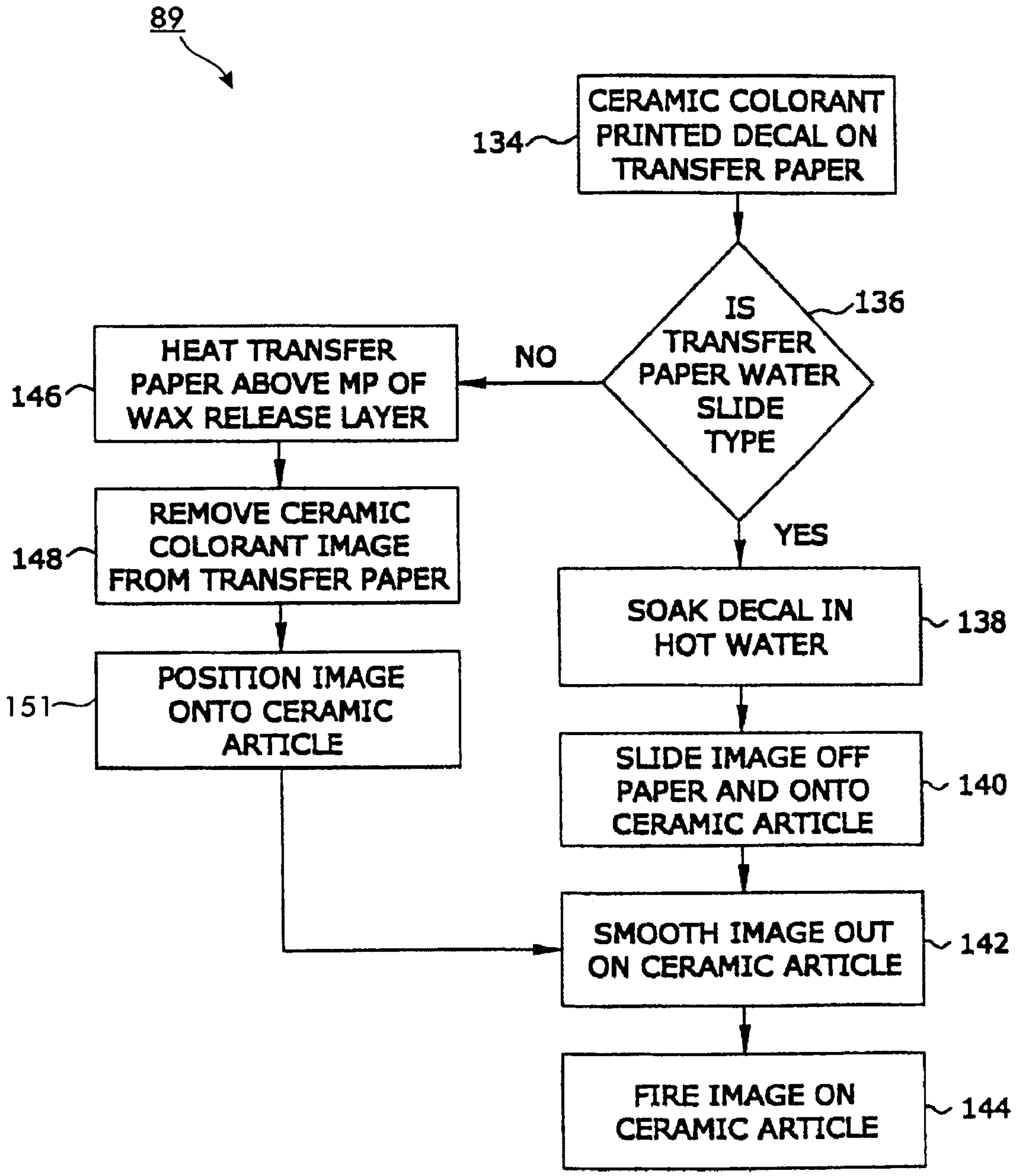

Thus, a complete decal is produced in FIG. 10 and now be may be used in FIG. 11 to produce the imaged ceramic article.

Figure 10A:
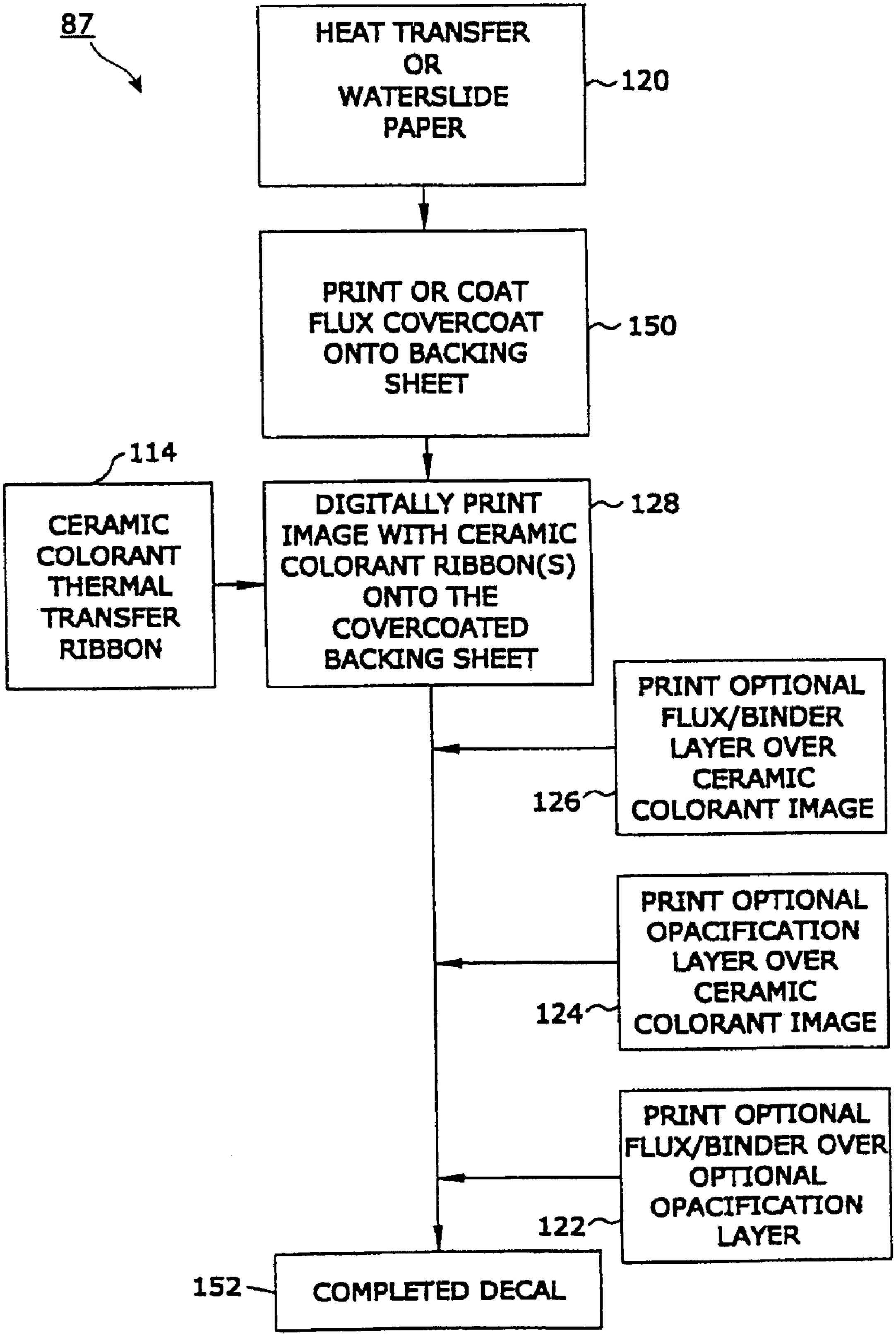

FIG. 10A illustrates an alternative process 87 for preparing a decal according to the invention. As will be apparent to those skilled in the art, the process illustrated in FIG. 10A is very similar to the process illustrated in FIG. 10 with several exceptions. In the first place, in the process of FIG. 10A, in step 150 the covercoat is applied or printed to the assembly prior to the time the ceramic colorant image 128 is applied. Thereafter, following the application of ceramic colorant image 128, optional frit binder (step 126), and/or opacifying agent (step 124), and/or frit/binder (step 122) may be applied to form the decal 152.

The process of FIG. 10A may be used, e.g., to print a decal which thereafter may be applied, e.g., to a wine bottle. Thus, e.g., in such an embodiment, the image is preferably removed from the decal with a hot silicone pad or a hot silicone roller. Thereafter, the image is retransferred directly onto the ceramic article (wine bottle) and processed as illustrated in FIG. 11.

In the process 89 depicted in FIG. 11, the decal produced in step 134 of FIG. 10 is treated in one of two ways, depending upon whether the substrate comprising the decal is Waterslide or heat transfer paper.

If the substrate comprising the image is Waterslide paper, then the decal is first soaked in hot water (at a temperature of greater than 40 degrees Celsius for preferably at least about 30 seconds) in step 138. The image on the Waterslide paper is then separated from the paper in step 140, this image is then placed onto a ceramic substrate and smoothed to remove wrinkles or air bubbles in step 142 and dried; and the image is then "heat treated" in step 144. The imaged ceramic substrate is preferably subjected to a temperature of from about 550 to about 1200 degrees Celsius in step 144.

If, alternatively, the substrate is heat transfer paper, then the decal is heated above the melting point of the wax release layer on the paper in step 146; such temperature is generally from about 50 to about 150 degrees Celsius. Thereafter, while said wax release layer is still in its molten state, one may remove the ceramic colorant image from the paper in step 148, position the image onto the ceramic article in step 151, and then follow steps 142 and 144 as described hereinabove.

When one wishes to image a non-planar substrate, such as a wine bottle referred to hereinabove, the step 148 may be accompanied with the use of the hot silicone pad and/or the hot silicone roller described hereinabove.

A Thermal Transfer Ribbon Comprised of Ceramic Ink

In one preferred embodiment, the thermal transfer ribbon of this invention is used to directly or indirectly prepare a digitally printed "frost" or "frosting" on a ceramic substrate; as used herein, the term "ceramic substrate" includes a glass substrate.

As is known to those skilled in the art, frosting is a process in which a roughened or speckled appearance is applied to metal or ceramic. Reference may be had, e.g., to U.S. Pat. Nos. 6,092,942; 5,844,682; 5,585,555; 5,536,595; 5,270,012; 5,209,903; 5,076,990; 4,402,704; 4,396,393; and the like. The entire disclosure of each of these United States patents is hereby incorporated by reference into this specification.

FIG. 12 is a schematic representation of one preferred thermal ribbon 200 comprised of a preferred ceramic ink layer 202 referred to as a "frosting ink layer." The ribbon 200 depicted in this Figure is prepared in substantial accordance with the procedure described elsewhere in this specification.

The frosting ink layer 202 is preferably comprised of from about 15 to about 94.5 weight percent of a solid, volatilizable carbonaceous binder; in one preferred embodiment, the frosting ink layer comprises from about 20 to about 40 weight percent of such solid, volatilizable carbonaceous binder.

As used herein, the term carbonaceous refers to a material that is composed of carbon. The term volatilizable, as used in this specification, refers to a material which, after having been heated to a temperature of greater than 500 degrees Celsius for at least 6 minutes in an atmosphere containing at least about 15 volume percent of oxygen, is transformed into gas and will leave less than about 5 weight percent (by weight of the original material) of a residue comprised of carbonaceous material.

The solid, volatilizable carbonaceous binder may be one or more of the resins, and/or waxes and/or plasticizers, for example, to the thermoplastic binders described elsewhere in this specification.

Referring again to FIG. 12, the frosting ink layer 202 is preferably comprised of from about 5 to about 75 weight percent of a film forming glass frit that melts at a temperature of greater than about 550 degrees Celsius. As is known to those skilled in the art, such a film forming material is able to form a continuous film when heat treated at a temperature of above 550 degrees Celsius. Reference may be had, e.g., to the frits used to form underlayer 14 (see FIG. 1) and or frit layer 18 (see FIG. 1) and/or frit layer 22 (see FIG. 1).

In one preferred embodiment, the frosting ink layer comprises from about 35 to about 75 weight percent of the film forming glass frit. In another embodiment, the frosting ink layer comprises from about 40 to about 75 weight percent of the film forming glass frit.

The film forming glass frit used in frosting ink layer 202 preferably has a refractive index less than about 1.6 and a melting temperature greater than 300 degrees Celsius.

By way of illustration and not limitation, and in one preferred embodiment, the film forming glass frit used in frosting ink layer 202 comprises 48.8 weight percent of unleaded glass flux 23901 and 9.04 weight percent of OnGlaze Unleaded Flux 94C1001, each of which is described elsewhere in this specification.

Referring again to FIG. 12, and in one embodiment, the frosting ink layer 202 is preferably comprised of at least about 0.5 weight percent of opacifying agent with a melting temperature of at least 50 degrees Celsius above the melting temperature of the film forming glass frit, a refractive index of greater than about 1.6 and a particle size distribution such that substantially all of its particles are smaller than about 20 microns. One may use one or more of the opacifying agents described elsewhere in this specification by reference to opacification layer 16 (see FIG. 1). One may use other opacifying agents such as, e.g., Superpax Zircon Opacifier. This and other suitable opacifying agents are described elsewhere in this specification.

This opacifying agent is one embodiment of the metal oxide containing ceramic colorant that is used in applicants' process; one other such embodiment is a metal oxide containing pigment.

In one embodiment, from about 2 to about 25 weight percent of the opacifying agent is used. In another embodiment, from about 5 to about 20 weight percent of the opacifying agent is used. Thus, e.g., one may 8.17 weight percent of such Superpax Zircon Opacifier opacifying agent.

In one preferred embodiment, it is preferred that the refractive index of the opacifying agent(s) used in the frosting ink layer 202 be greater than about 1.6 and, preferably, be greater than about 1.7.

The film forming glass frit(s) and the opacifying agent(s) used in the frosting ink layer 202 should be chosen so that the refractive index of the film forming glass frit material(s) and the refractive index of the opacifying agent material(s) preferably differ from each other by at least about 0.1 and, more preferably, by at least about 0.2. In another preferred embodiment, the difference in such refractive indices is at least 0.3, with the opacifying agent having the higher refractive index.

The film forming glass frit(s) and the opacifying agent(s) used in the frosting ink layer 202 should preferably be chosen such that melting point of the opacifying agent(s) is at least about 50 degrees Celsius higher than the melting point of the film forming glass frit(s) and, more preferably, at least about 100 degrees Celsius higher than the melting point of the film forming glass frit. In one embodiment, the melting point of the opacifying agent(s) is at least about 500 degrees Celsius greater than the melting point of the film forming glass frit(s). Thus, it is generally preferred that the opacifying agent(s) have a melting temperature of at least about 1,200 degrees Celsius.

It is preferred that the weight/weight ratio of opacifying agent/film forming glass frit used in the frosting ink layer 202 be no greater than about 1.25.

Referring again to FIG. 12, and in one embodiment, thereof, the frosting ink layer 202 is optionally comprised of from about 1 to about 25 weight percent of platy particles; in an even more preferred aspect of this embodiment, the concentration of the platy particles is from about 5 to about 15 weight percent. As is known to those skilled in the art, a platy particle is one whose length is more than three times its thickness. Reference may be had, e.g., to U.S. Pat. Nos. 6,277,903; 6,267,810; 6,153,709; 6,139,615; 6,124,031; 6,004,467; 5,830,364; 5,795,501; 5,780,154; 5,728,442; 5,693,397; 5,645,635; 5,601,916; 5,597,638; 5,560,983; 5,460,935; 5,457,628; 5,447,782; 5,437,720; 5,443,989; 5,364,828; 5,242,614; 5,231,127; 5,227,283; 5,196,131; 5,194,124; 5,153,250; 5,132,104; 4,548,801; 4,544,761; 4,465,797; 4,405,727; 4,154,899; 4,131,591; 4,125,411; 4,087,343; and the like. The entire disclosure of each of these United States Patents is hereby incorporated by reference into this specification.

The platy particles are preferably platy inorganic particles such as, e.g., platy talc. Thus, by way of illustration and not limitation, one may use "Cantal 290" micronized platy talc sold by the Canada Talc company of Marmora Mine Road, Marmora, Ontario, Canada. This platy talc has a particle size distribution such that substantially all of its particles are smaller than about 20 microns. Alternatively, or additionally, one may use, e.g., Cantal 45-85 platy particles, and/or Sierralite 603 platy particles; Sierralite 603 particles are sold by Luzenac America, Inc. of 9000 East Nicols Avenue, Englewood, Colo.

In one preferred embodiment, the frosting ink layer 202 optionally contains from 0.5 to about 25 weight percent of a pigment such as, e.g., the metal-oxide pigments referred to in reference to ceramic colorant layer 38 (see FIG. 2). It is preferred that such optional metal oxide pigment, when used in ink layer 202, have a refractive index of greater than 1.6.

The metal oxide containing pigments are one embodiment of the metal oxide containing ceramic colorants used in the process of this invention.

The thermal ribbon 202 depicted in FIG. 12 may be prepared by the means described elsewhere in this specification (see, e.g., the examples). The frosting ink layer 202 is preferably prepared by coating a frosting ink at a coating weight of from about 2.0 to about 15 grams per square meter onto the polyester support. In one embodiment, the coating weight of the frosting ink layer 202 is from about 4 to about 10 grams per square meter.

In the embodiment depicted in FIG. 12, the polyester support 32 preferably has a thickness of from about 2.5 to about 15 microns, and the backcoat 34 preferably has a coating weight of from about 0.02 to about 1.0 grams per square meter. A similar ribbon 210 is depicted in FIG. 13.

The ribbon 210 is substantially identical to the ribbon 200 with the exception that it contains an undercoating layer 212. This undercoat layer 212 is preferably comprised of at least about 75 weight percent of one or more of the waxes and thermoplastic binders described elsewhere in this specification, and it preferably has a coating weight of from about 0.1 to about 2.0 grams per square meter.

The ribbon 210 (see FIG. 13) may be prepared by means described elsewhere in this specification.

In FIG. 13A, a ribbon 211 is illustrated which may be constructed in a manner similar to that used for ribbons 200 and 210. The ribbon 211 additionally comprises one or more covercoats 213 which are substantially free of glass frit (containing less than about 5 weight percent of glass) and which preferably each has a coating weight of from about 1 to about 10 grams per square meter. These covercoats 213 preferably are comprised of at least 80 weight percent of one or more of the thermoplastic binders described elsewhere in this specification. The thermoplastic binder material(s) used in the covercoat(s) preferably have an elongation to break of more than about 1 percent, as determined by the standard A.S.T.M. test.

In the embodiment depicted in FIG. 13A, the frosting ink layer preferably has a coat weight of from about 2 to about 15 grams per square meter, the undercoat layer 212 preferably has a coat weight of from about 0.2 to about 1 grams per square meter, and the polyester substrate 32 preferably has a thickness of from about 3 to about 10 microns.

A similar ribbon 215 is depicted in FIG. 13B. This ribbon is substantially identical to the ribbon depicted in FIG. 13A with the exception that it omits a covercoat 213 disposed on top of the frosting ink layer 202.

The ribbons 200 and/or 210 and/or 211 and/or 215 may be used to prepare a frosting decal. Thus, e.g., one such process comprises the steps of applying to a backing sheet a covercoat comprised of a thermoplastic material with an elongation to break greater than 1 percent and a digitally printed frosting image. The digitally printed frosting image preferably comprises a solid carbonaceous binder (described elsewhere in this specification), and a mixture of a film forming glass frit and one or more opacity modifying particles, wherein the difference in the refractive index between the particles and the glass frit is at least 0.1 and the melting point of the particles is at least 50 degrees Celsius greater than that of the film forming glass frit.

The backing sheet used in this process may be typically polyester or paper. Alternatively, or additionally, the backing sheet may comprise or consist of cloth, flexible plastic substrates, and other substrates such as, e.g., substantially flat materials. When paper is used in this embodiment, it is preferred that it be similar in composition to the papers described elsewhere in this specification.

FIG. 14 is a schematic representation of one preferred heat transfer paper 220 made with the thermal ribbon of FIG. 12 or FIG. 13. Referring to FIG. 14, it will be seen that, in the preferred embodiment depicted, a wax release layer 36 (see FIG. 2) may be coated onto paper 226 by means described elsewhere in this specification. This wax release layer 36 preferably has a thickness of from about 0.2 to about 2.0 microns and typically comprises at least about 50 weight percent of wax.

Referring again to FIG. 14, a covercoat layer 224 is disposed above a paper substrate 226. The covercoat layer 224 preferably comprises at least 25 weight percent of one or more of the aforementioned thermoplastic materials with an elongation to break greater than about 2 percent. In one embodiment, the covercoat layer 224 comprises at least about 50 weight percent of such thermoplastic material.

In one embodiment, described elsewhere in this specification, the covercoat layer 224 is incorporated into a covercoated transfer sheet for transferring images to a ceramic substrate, wherein said covercoated transfer sheet comprises a flat, flexible support and a transferable covercoat releaseably bound to said flat, flexible support, wherein, when said transferable covercoat is printed with an image to form an imaged covercoat, said image has a higher adhesion to said covercoat than said covercoat has to said flexible substrate, said imaged covercoat has an elongation to break of at least about 1 percent, and said imaged covercoat can be separated from said flexible substrate with a peel force of less than about 30 grams per centimeter. Some of the properties of the desired covercoated layer 224 have been discussed, e.g., by reference to FIG. 7.

In the preferred embodiments depicted in FIGS. 13, 13A, 13B, 14, 15, and 16, the covercoat layers 213 and/or 224 preferably contain less than about 5 weight percent of glass frit. In another embodiment, such covercoat layers contain less than about 1 weight percent of glass frit.

In one preferred embodiment, the covercoat layer 224 comprises a thermoplastic material with an elongation to break of at least about 5 percent.

By way of illustration and not limitation, suitable thermoplastic materials which may be used in covercoat layer 224 include, e.g., polyvinylbutyral, ethyl cellulose, cellulose acetate propionate, polyvinylacetal, polymethylmethacrylate, polybutylmethacrylate, and mixtures thereof.

Referring again to FIG. 14, after the covercoat layer 224 has been applied, the frosting ink image 222 may be digitally applied with the use of either the ribbon 200 and/or the ribbon 210 and/or the ribbon 211 and/or the ribbon 215 by means of the printing process described elsewhere in this specification.

FIG. 15 is a schematic representation of a Waterslide assembly 230 that is similar to the heat transfer paper 220 but differs therefrom in several respects. In the first place, the wax release layer 36 is replaced by the water soluble gel layer 228; in the second place, the paper 226 is replaced by the Waterslide paper substrate 229. As is known to those skilled in the art, and as is taught elsewhere in this specification, Waterslide paper is commercially available with soluble gel coating 228.

The Waterslide paper assembly (elements 229 and 228), in the embodiment depicted in FIG. 15, is first preferably coated with covercoat layer 224 at a coat weight of from about 2 to about 20 grams per square meter and then digitally printed with frosting ink image 222 by the means described elsewhere in this specification.

FIG. 16 is a schematic representation of a transferable covercoat assembly 240, which comprises paper substrate 226, transferable covercoat paper 242, and frosting ink image 222.

The aforementioned description of the embodiments of FIGS. 1-16 is illustrative only and that changes can be made in the ingredients and their proportions, and in the sequence of combinations and process steps, as well as in other aspects of the inventions discussed herein.

Thus, for example, in one embodiment the imaged ceramic article 10 depicted in FIG. 1 comprises a ceramic substrate 12 on which a ceramic colorant image 20 is disposed. A similar ceramic or glass substrate 301 is depicted in FIG. 19. As will be apparent to those skilled in the art, in both cases the ceramic/glass substrate 12 is preferably heat treated to either sinter it or to cause the materials disposed on it to flow and adhere to it. When such heat treating occurs, the frit in layers 224 melts and reforms as glass. Thus, after such heat treating, the ceramic colorant image 20 of FIG. 1, and the frosting ink image 222 of FIG. 19, are disposed on a layer of glass.

Thus, e.g., FIG. 19 depicts a coated ceramic substrate 301 which is similar to the coated substrate assembly 10 (see FIG. 1) but differs therefrom in having a covercoat 213/frosting ink image 222/covercoat layer 213 disposed over the substrate 12.

Thus, e.g., other structures may be formed in which, e.g., the frosting ink image 222 is disposed between two glass layers. By way of illustration, and in the process depicted in FIG. 20, one may print a frosting ink image 222 onto a thermoplastic substrate 302 with the use of a ribbon 200, 210, 211, and/or 215. One may use a support such as, e.g., a sheet of biaxially oriented poly(ethylene terephthalate), a sheet of polyvinyl chloride, a sheet of polycarbonate, etc. The digitally printed thermoplastic substrate may then be attached to a first pane of ceramic or glass material and, thereafter, the assembly thus formed may be attached to a second pane of ceramic or glass material to form a ceramic(glass)/thermoplastic sheet/ceramic(glass) laminate structure.

FIG. 21 discloses a structure 305 in which the coated flexible support 303 is attached to a ceramic/glass substrate 12. It is preferred not to fire this structure, because the gases evolved from the flexible support layer 302 may degrade the frosting ink layer 305.

FIG. 22 depicts a laminated structure 307 in which the assembly 303 is sandwiched between two ceramic/glass substrates 12 to form a laminated structure.

FIG. 23 shows a structure 309 which is similar to that of FIG. 21 but, one that, unlike the structure of FIG. 1, can be heat treated without substantially degrading the structural integrity of frosting ink image 222.

A Process for Making a Ceramic Decal Assembly

FIG. 24 is a flow diagram of one preferred process 311 of the invention. Referring to the process depicted in FIG. 24, and in step 400 thereof, a decal is prepared which can thereafter be adhesively attached to a ceramic substrate.

The decal to be prepared is preferably a digitally printed decal whose preparation is described elsewhere in this specification. One may prepare any of the ceramic decals described elsewhere in this specification.

Thus, by way of illustration, and referring to FIGS. 25A and 25B, one may prepare ceramic decal 401 and/or ceramic decal 402. When these embodiments are used, it is preferred that they comprise, in one preferred aspect of this embodiment, an "ethocel coated heat transfer paper." This term as used herein refers to heat transfer paper, i.e., a commercially available paper with a wax coating possessing a melt point in the range of from about 65 to about 85 degrees Celsius which is coated with a layer of ethylcellulose that, in one embodiment, is about 10 grams/square meter thick. Such heat transfer paper is discussed, e.g., in U.S. Pat. Nos. 6,126,669; 6,123,794; 6,025,860; 5,944,931; 5,916,399; 5,824,395; 5,032,449; and the like. The entire disclosure of each of these United States patents is hereby incorporated by reference into this specification.

As will be apparent, what each of decals 401 and 402 preferably has in common is a polymer-containing support 226. This polymer-containing support 226, which is typically paper, is described elsewhere in the specification. However, this polymer-containing support 226 may be any type of flat, thin, flexible sheet, for example, polyester or polyolefin films, non-woven sheets and the like. The polymer-containing support 226 for the decal should first be coated with a wax/resin release layer and then a covercoat layer which has also been described elsewhere in this specification. The covercoated support should have the characteristics of being able to receive a thermally printed digital image from the various thermal transfer ribbons described elsewhere in this specification. After printing onto such coated supports, a ceramic decal is formed. A further characteristic of these decals is that, after the decal has been attached to the ceramic substrate 12, the polymer-containing support 226 on which the decal was formed preferably should be able to be cleanly separated from the image. This separation should occur between the wax/resin release layer and the covercoat such that the covercoat and the image remain entirely on the ceramic substrate 12.

As will also be apparent, each of the decals 401 and 402 preferably has a wax release layer 36 in common. This wax release layer 36 preferably has a thickness of from about 0.2 to about 2.0 microns and comprises at least about 50 weight percent of wax.

As will also be apparent, each of the decals 401 and 402 also preferably comprises a transferable covercoat layer 242. In one embodiment, the transferable covercoat layer 242 is comprised of ethylcellulose. Such a covercoat may be prepared, in one illustrative embodiment, by dissolving 12 grams of ethylcellulose with a mixture of 16.4 grams of isopropyl alcohol, 68.17 grams of toluene, and 3.42 grams of dioctyl phthalate that has been heated to 50 degrees Celsius. This solution thus formed is then applied to a wax/resin coated substrate with a Meyer rod to achieve a coating weight of about 10 grams per square meter. Thus, e.g., the transferable covercoat layer 242 may have the same composition as covercoat layer 224 (see FIG. 14) and/or covercoat layer 24. In this embodiment, covercoat layer 242 comprises at least about 25 weight percent of thermoplastic material with an elongation to break of greater than about 1 percent. In one embodiment, the covercoat layer 242 comprises at least about 50 weight percent of thermoplastic material with an elongation to break of greater than 1 percent. In another embodiment, the covercoat layer 242 comprises thermoplastic material with an elongation to break greater than 5 percent.

In each of the decals 401 and 402, preferably disposed above the transferable covercoat layer 242 is either a frosting ink image 222 (decal 401), or a ceramic colorant image 20. As will be apparent, what each of these image layers has in common with the other is the presence of either opacification particles or colorant particles that have a particle size distribution such that at least about 90 weight percent of such particles are within the range of from about 0.2 to about 20 microns. In addition, both of these images should preferably be comprised of film-forming glass frit. The aforementioned opacification particles or colorant particles preferably have a refractive index of at least about 0.1 and preferably 0.2 units different from the refractive index of the film forming glass frit used in the image. In addition, the aforementioned opacification particles or colorant particles as well as the glass frit preferably are non-carbonaceous in their combination and essentially inorganic such that they remain on the ceramic substrate after heat treating. Both of these images should also preferably have the capability to alter the visual appearance of the ceramic substrates, in an image-wise fashion, after the substrates have been heat treated to visually reveal the intended imaging of said substrates.

Referring again to FIG. 24, and in step 410 thereof, a pressure sensitive transfer adhesive assembly is prepared. As is indicated in FIG. 26, the pressure sensitive transfer adhesive assembly is preferably comprised of pressure sensitive transfer adhesive. These adhesives, and assemblies comprising them, are well known to those in the art. Reference may be had, e.g., to U.S. Pat. Nos. 5,319,475; 6,302,134; reissue 37,036; 6,063,589; 5,623,010; 5,059,964; 5,602,202; 6,284,338; 6,134,892; 5,931,000; and the like. Reference also may be had, e.g., to United States published patent applications 2001/0001060A1, 2002/0015836A1, and the like. Reference also may be had to international patent publications EP0530267B1, EP0833965B1, EP0833866B1, WO9700922A1, WO9700913A1, EP0576530B2, and the like. The entire disclosure of each of these patent publications is hereby incorporated by reference into this specification.

Pressure sensitive adhesives are also described at, e.g., pages 724-735 of Irving Skeist's "Handbook of Adhesives," Second Edition (Van Nostrand Reinhold Company, New York, N.Y., 1977). These adhesives are often composed of a rubbery type elastomeric material(s) combined with a liquid or solid resin tackifier component.

Pressure-sensitive acrylic adhesives are often used. The acrylate pressure-sensitive adhesives are often a copolymer of a higher alkyl acrylate, such as, e.g., 2-ethylehexyl acrylate copolymerized with a small amount of a polar comonomer. Suitable polar comonomers include, e.g., acrylic acid, acrylamide, maleic anhydride, diacetone acrylaminde, and long chain alkyl acrylamides.

In one preferred embodiment, the pressure sensitive transfer adhesive is an acrylic pressure sensitive transfer adhesive. These adhesives are also well known. Reference may be had, e.g., to U.S. Pat. No. 5,623,010 (acrylate-containing polymer blends and methods of using); U.S. Pat. Nos. 5,605,964; 5,602,202 (methods of using acrylate-containing polymer blends); U.S. Pat. Nos. 6,134,892; 5,931,000; 5,677,376

(acrylate-containing polymer blends); U.S. Pat. No. 5,657,516; and the like. The entire disclosure of each of these United States patents is hereby incorporated by reference into this specification.

One suitable pressure sensitive transfer adhesive assembly is sold as "Arclad 7418" by Adhesives Research, Inc. of 400 Seaks Run Road, Glen Rock, Pa. This assembly comprises an acrylic adhesive and a densified kraft liner.

Other laminating adhesive assemblies also may be used in the process of this invention. Reference may be had, e.g., to U.S. Pat. No. 5,928,783 (pressure sensitive adhesive compositions); U.S. Pat. Nos. 5,487,338; 5,339,737; and the like. Reference may also be had to European patent publications EP0942003A1, EP0684133B1, EP0576128A1, and the like. The disclosure of each of these patent documents is hereby incorporated by reference in to this specification.

Referring again to FIG. 26, and in the preferred embodiment depicted therein, the pressure sensitive adhesive assembly 410 is preferably comprised of pressure sensitive adhesive 412, silicone release coating 413, transfer substrate 414, and silicone release coating 415. The adhesive assembly 410 preferably has a thickness 416 of less than about 100 microns, preferably being from about 1 to about 20 microns thick. More preferably, the adhesive assembly 410 has a thickness 416 from about 0.1 to about 2 microns thick.

In one embodiment, the pressure sensitive transfer adhesive comprises at least 95 weight percent of carbonaceous material and less than about 5 weight percent of inorganic material.

Referring again to FIG. 24, and in step 420 of the process, the decal provided in step 400 and the pressure-sensitive transfer adhesive assembly provided in step 410 are pressure laminated to form a composite laminated structure (see FIG. 27). This pressure lamination process is well known to those skilled in the art. Reference may be had, e.g., to U.S. Pat. Nos. 6,120,882; 5,866,236; 5,656,360; 5,100,181; 5,124,187; 6,270,871; 5,397,634; and the like. The entire disclosure of each of these United States patents is hereby incorporated by reference into this specification.

In the preferred embodiment depicted in FIG. 27, the composite assembly 420 is preferably pressure laminated with pressure rollers 425, preferably using a light pressure of less than about 1 pound per square inch. It is preferred to remove substantially all air and/or other gases between adjacent contiguous surfaces in this process.

Referring again to FIG. 24, and in step 430 thereof, the release paper (comprised of the transfer substrate 414, with silicone release coatings 413/415 on its opposed surfaces) is stripped away from the pressure sensitive adhesive 412 to form a pressure-sensitive adhesive decal. This process step 430 is schematically illustrated in FIG. 28.

Referring again to FIG. 24, and in step 440 thereof, the pressure sensitive adhesive decal is laminated to a ceramic substrate with light pressure (less than about 1 pound per square inch) by pressure lamination; reference may be had to FIG. 29, wherein this step 440 is schematically illustrated. This step 440 will leave the paper 226 and the wax release layer 36 indirectly attached to the ceramic substrate 12. Alternatively, the ceramic article may be directly coated or laminated with a pressure sensitive adhesive. Such an article may then be directly laminated to the decal as in Step 440, eliminating Steps 420 and 430.

Thereafter, and referring again to FIG. 24, in step 450 the wax/resin coated paper or substrate 226 is peeled away from the covercoat 242 of the ceramic decal assembly. The imaged assembly 460 that remains after this step is illustrated in FIG. 31.

The imaged assembly 460 depicted in FIG. 31 comprises a frosting ink image 222. As will be apparent, this will be obtained when imaged decal 401 is used (see FIG. 25A). When imaged decal 402 is used (see FIG. 25B), a ceramic colorant image 20 will be obtained.

As will be apparent to those skilled in the art, the pressure sensitive adhesive 412 may also be first applied to the ceramic substrate 12 then followed by application of either imaged decal (401 or 402) to the pressure sensitive adhesive treated ceramic substrate. The imaged ceramic decal substrate 226 may then be removed leaving an imaged ceramic assembly equivalent to the one depicted in FIG. 31.

A similarly imaged assembly to the one depicted in FIG. 31 may be prepared by using the imaged ceramic decal depicted in FIG. 16. In this process, the transferable covercoat 242 is releasably attached to the support 226. Covercoated transfer sheets 550 (FIG. 33) and 552 (FIG. 34 are preferably used in this process. By means of heat and pressure in a process similar to the lamination process depicted in FIG. 29, the imaged ceramic decal 240 may be laminated directly to ceramic substrate 31. In this process, roller 425 depicted in FIG. 29 is heating to a temperature above the soften point of the transferable covercoat 242 and frosting ink image 222. Heat and pressure from roller 425 cause the imaged ceramic decal 240 to adhere to the ceramic substrate 12. The imaged ceramic decal substrate 226 may then be removed leaving an imaged ceramic assembly similar to the one depicted in FIG. 31 with the exception that the pressure sensitive adhesive 412 is not present and frosting ink (or ceramic) image is directly adhered to the ceramic substrate 12.

Referring again to FIG. 24, and in step 460 of the process depicted, the various imaged ceramic assemblies described herein above are then preferably heat treated to burn off substantially all of the carbonaceous material in the assembly. In general, the assembly is subjected to a temperature of from at least about 350 degrees Celsius for at least about 5 minutes.

Thereafter, in step 470 of the process (see FIG. 24), the heat treated substrate is measured to determine its optical quality. The optical quality of a heat treated substrate may be determined, e.g., by comparing the optical density of the image on the heat treated substrate with the optical density of the image on the un heat treated substrate.

Applicants' process unexpectedly produces a heat treated product whose optical properties are substantially as good as, if not identical to, the optical properties of the un-heat treated product.

As is illustrated in FIG. 32, the un-heat treated substrate assembly 473 is preferably analyzed by optical analyzer 471. Thereafter, the heat treated substrate assembly 475 is analyzed by optical analyzer 471. The optical properties of the heat treated substrate 475 are preferably at least about 80 percent as good as the optical properties of the un-heat treated substrate 473.

In one embodiment, a pattern recognition algorithm (not shown) is used to compare the un-heat treated image on assembly 473 to the heat treated image on assembly 475. The use of pattern recognition algorithms for the purpose is well known. Reference may be had, e.g., to U.S. Pat. No. 6,278,798 (image object recognition); U.S. Pat. Nos. 6,275,559; 6,195,475; 6,128,561; 5,024,705; 6,017,440; 5,838,758; 5,264,933; 5,047,952; 5,040,232; 5,012,522 (automated face recognition); and the like. The entire disclosure of each of these United States patents is hereby incorporated by reference into this specification.

One or more matching algorithms may be used to compare these optical qualities. These algorithms, and their uses, are well known. See, e.g., U.S. Pat. No. 6,041,137 (handwriting definition); U.S. Pat. Nos. 5,561,475; 5,961,454; 6,130,912; 6,128,047; 5,412,449; 4,955,056 (pattern recognition system), U.S. Pat. Nos. 6,031,980; 5,471,252; 5,875,108; 5,774,357; and the like. The entire disclosure of each of these United States patents is hereby incorporated by reference into this specification.

In one embodiment, illustrated in FIG. 32, when the substrate 12 is a clear substrate (such as, e.g., glass), one may measure and compare the transmission density of the un-heat treated and heat treated optical images by means of, e.g., a densitometer. In another embodiment, illustrated in FIG. 32, when the substrate 12 is an opaque substrate, one may measure and compare the reflection density of the un-heat treated and heat treated optical images by means of, e.g., a densitometer. Such uses of a densitometer are well known. Reference may be had, e.g., to U.S. Pat. No. 3,614,241 (automatic recording densitometer which simultaneously determines and records the optical density of a strip of photographic film); U.S. Pat. Nos. 5,525,571; 5,118,183; 5,062,714; and the like. The entire disclosure of each of these United States patents is hereby incorporated by reference into this specification.

Referring again to FIG. 32, and in particular to heat treated assembly 475, it will be seen that, in the embodiment depicted, in areas 477, 479, 481, and 483 some or all of the image has been eroded during the heat treating. Without wishing to be bound by any particular theory, applicants believe that this erosion can occur when gases are formed during the heat treating and disrupt the layer 22 as they escape from the heat treated assembly.

Regardless of the cause of such erosion, its existence damages the optical properties of the heat treated substrate. The process of the instant invention produces a product in which such erosion is substantially absent.

One may determine the difference in opacity between the un-heat treated frosting ink image 222 and the heat treated frosting ink image with standard TAPPI test T519. This difference in opacity is often referred to as the "delta opacity," and it preferably is less than about 15 percent. In one embodiment, such delta opacity is less than about 8 percent. In yet another embodiment, such delta opacity is less than about 2 percent.

A Covercoated Transfer Sheet

In this portion of the specification, applicants discuss a covercoated transfer sheet suitable for transferring images to a ceramic substrate. This covercoated transfer sheet comprises a flat, flexible support and a transferable covercoat releaseably bound to said flat, flexible support, wherein, when said transferable covercoat is printed with an image to form an imaged covercoat, said image has a higher adhesion to said covercoat than said covercoat has to said flexible support, said imaged covercoat has an elongation to break of at least about 1 percent, and said imaged covercoat can be separated from said flexible support with a peel force of less than about 30 grams per centimeter.

FIG. 33 is a schematic illustration of one preferred embodiment of a covercoat transfer assembly 550 that comprises a transferable covercoat 242 (see FIG. 16) coated onto a flexible support 510.

The transferable covercoat 242 used in assembly 550 may comprise ethyl cellulose. Alternatively or additionally, the covercoat 242 may comprised of styrenated acrylic resin, polyvinyl butyral, polyester, polyvinyl chloride, polyethylene-co-vinylaceate, polybutylmethacrylate, polymethylmethacrylate, polystyrene-co-butadiene, polyvinylacetate, and the like. In general, the covercoat is preferably comprised of at least about 70 weight percent of one or more of these polymeric entities.

In one embodiment, the covercoat 242 is similar in many respects to, and/or identical to, covercoat 24 (see FIG. 1).

The transferable covercoat 242, after being subjected to a temperature of 500 degrees Celsius for at least 6 minutes, preferably produces less than about 1 weight percent of ash, based upon the weight of the uncombusted covercoat.

The transferable covercoat 242 may optionally contain from about 2 to about 80 weight percent (by total weight of the covercoat) of one or more of the frits described elsewhere in this specification. In one preferred embodiment, the covercoat 242 comprises from about 50 to about 60 weight percent of such frit.

The transferable covercoat 242 may also optionally contain from about 1 to about 40 weight percent of opacifying agent, by total weight of covercoat. In one embodiment, both such frit and such opacifying agent are present in the covercoat 242, the amount of frit and the amount of opacifying agent, in combination, exceeds the amount of binder in the covercoat 242, and the amount of frit in the covercoat 242 exceeds the amount of opacifying agent.

The covercoat 242 preferably contains from 20 to about 100 weight percent of one or more of the binders described elsewhere in this specification. When the covercoat 242 also contains frit and/or opacifying agent, then the covercoat 242 comprises less than about 50 weight percent of such binder.

The transferable covercoat 242 may also optionally contain from about 1 to about 40 weight percent of inorganic pigment, by total weight of covercoat. In one embodiment, both such frit and such pigment are present in the covercoat 242, the amount of frit and the amount of pigment, in combination, exceeds the amount of binder in the covercoat 242, and the amount of frit in the covercoat 242 exceeds the amount of pigment.

The covercoat 242 contains from 20 to about 100 weight percent of one or more of the binders described elsewhere in this specification. When the covercoat 242 also contains frit and/or pigment, then the covercoat 242 comprises less than about 50 weight percent of such binder.

Referring again to FIG. 33, it will be seen that the flexible support 510 is similar to the support 226 (see FIG. 14). It is preferred that flexible support 510 be smooth, uniform in thickness, and flexible.

In one embodiment, the flexible support 510 has a surface energy of less than about 50 dynes per centimeter. Surface energy, and means for measuring it, are well known to those skilled in the art. Reference may be had, e.g., to U.S. Pat. No. 5,121,636 (surface energy meter); U.S. Pat. Nos. 6,225,409; 6,221,444; 6,075,965; 6,007,918; 5,777,014; and the like. The entire disclosure of each of these United States Patents is hereby incorporated by reference into this specification.

In one embodiment, the flexible support 510 has a surface energy of less than about 40 dynes per centimeters.

In one preferred embodiment, the flexible support 510 either consists essentially of or comprises at least 80 weight percent of a synthetic polymeric material such as, e.g., polyethylene, polyester, nylon, polypropylene, polycarbonate, poly(tetrafluoroethylene), fluorinated polyethylene-co-propylene, polychlorotrifluoroethylene, and the like.

In one preferred embodiment, the flexible support 510 comprises at least about 90 weight percent of polyethylene or polypropylene or polybutylene, or mixtures thereof.

The flexible support 510 preferably has a thickness 512 of from about 50 microns to about 250 microns. It is preferred that the thickness 512 of support 510 not vary across the support 510 by more than about 15 percent.

In one embodiment, the support 510 does soften when exposed to organic solvent(s) or water.

In one embodiment, the flexible support 510 is adapted to separate from a transferable covercoat 242 upon the application of minimal force. Thus, e.g., and referring to FIG. 33, the flexible support 510 is preferably adapted to release from covercoat 242 upon the application of a linear stress of less than about 100 grams per centimeter and, more preferably, less than about 30 grams per centimeter at a temperature of 20 degrees Celsius. It is preferred that the peel strength required to separate the covercoat 242 be less than about 15 grams per centimeter at 20 degrees Celsius.

One may determine the force required to separate a covercoat from a flexible support by a test in which 1.27 centimeter×20.32 centimeter strips of covercoated support are prepared. For each such sample, the covercoat is then manually separated at 20 degrees Celsius from the substrate backing for 2.54 centimeters at the top of each strip. Each half of the strip is then mounted in the grips of a tensile device manufactured by the Sintech Division of MTS Systems company (P.O. Box 14226, Research Triangle Park, Raleigh, N.C. 22709) and identified as Sintech model 200/S. 200/S. Such use of the Sintech 200/S machine is well known. Reference may be had to, e.g., international patent publications WO0160607A1, WO0211978A, WO0077115A1, and the like; the entire disclosure of each of these patent publications is hereby incorporated by reference into this specification. The peel adhesion is measured at 25.4 centimeters per minute with a 5 pound load cell at a temperature of 20 degrees Celsius and ambient pressure.

FIG. 34 is a schematic illustration of an assembly 552 that is similar to the assembly 550 (see FIG. 33) but also incorporates a release layer 500 and a flexible support 511.

The flexible support 511 is similar to the flexible support 510 but does not necessarily have the same surface energy. In one embodiment, the surface energy of flexible support 511 is less than 60 dynes per centimeter. In this embodiment, the flexible support 511 preferably comprises at least about 80 weight percent of, or consists essentially of, a cellulosic material such as, e.g., paper.

When paper is used as the flexible support 511, it preferably has a basis weight of at least about 50 to about 200 grams per square meter. In one embodiment, the basis weight of the paper 511 is from about 45 to about 65 grams per square meter.

In one embodiment, the support 511 is a 90 gram per square meter basis paper made from bleached softwood and hardwood fibers. The surface of this paper is sized with starch.

In the embodiment depicted in FIG. 34, the flexible support/paper 511 is preferably coated with and contiguous with a release layer 500. Thus, e.g., the paper 511 may be coated with a release layer by extrusion coating a polyethylene and wax mixture to a coat weight of 20 grams per square meter.

The release layer 500 is similar to wax release layer 36, but it need not necessarily comprise wax. The release layer 500 does preferably comprise a material that, when coated upon the flexible support 511, provides a smooth surface with a surface energy of less than about 50 dynes per centimeter.

In one embodiment, the release layer 500 comprises a polyolefin, such as, e.g., polyethylene, polypropylene, polybutylene, and mixtures thereof, to a coatweight on the faceside of 24 grams per square meter and on the backside of 27 grams per square meter.

In one embodiment, it is preferred to coat the release layer 500 onto the support 511 by means of extrusion, at a temperature of from about 200 to about 300 degrees Celsius. Extrusion coating of a resin is well known. Reference may be had, e.g., to U.S. Pat. Nos. 5,104,722; 4,481,352; 4,389,445; 5,093,306; 5,895,542; and the like. The entire disclosure of each of these United States patents is hereby incorporated by reference into this specification.

It is preferred that the release layer coating 500 be substantially smooth. In one embodiment, the coated support has a Sheffield smoothness of from about 1 to about 150 Sheffield Units and, more preferably, from about 1 to about 50 Sheffield Units. Means for determining Sheffield smoothness are well known. Reference may be had, e.g., to U.S. Pat. Nos. 5,451,559; 5,271,990 (image receptor heat transfer paper), U.S. Pat. Nos. 5,716,900; 6,332,953; 5,985,424; and the like. The entire disclosure of each of these United States patents is hereby incorporated by reference into this specification.

Similarly, the uncoated substrate 510 (see FIG. 33) also has a surface energy of less than 40 dynes per centimeter and smoothness of from about 10 to about 150 Sheffield Units.

Referring again to FIG. 34, and in the preferred embodiment depicted therein, the release layer may be of any composition that will produce the desired surface energy and smoothness upon coating the support 511. Thus, by way of illustration and not limitation, one may utilize a cured silicone release layer. Release layers comprised of silicone are well known. Reference may be had, e.g., to U.S. Pat. No. 5,415,935 (polymeric release film); U.S. Pat. No. 5,139,815 (acid catalyzed silicone release layer); U.S. Pat. Nos. 5,654,093; 5,761,595; 5,543,231 (radiation curable silicone release layer); and the like. The entire disclosure of each of these United States patents is hereby incorporated by reference into this specification.

By way of further illustration, one may use fluoropolymer release agents. See, e.g., U.S. Pat. No. 5,882,753 (extrudable release coating); U.S. Pat. Nos. 5,807,632; 6,248,435; and the like. The entire disclosure of each of these United States patents is hereby incorporated by reference into this specification.

The Use of the Ceramic Decal of U.S. Pat. No. 6,481,353

In one embodiment of this invention, a ceramic decal prepared in accordance with U.S. Pat. No. 6,481,353 is prepared and used. The entire disclosure of this United States patent is hereby incorporated by reference into this specification.

U.S. Pat. No. 6,481,353 discloses and claims a process for preparing a ceramic decal, comprising the steps of sequentially: (a) applying to a backing sheet a frit covercoat with a first surface comprised of a first mixture comprised of a first frit and a second solid carbonaceous binder, wherein said first frit has a melting temperature of at least about 550 degrees Celsius, (b) applying to said first surface of said frit covercoat a digitally printed ceramic colorant image comprised of a colorant composition comprising a second surface, wherein: (1) said colorant composition comprises metal oxide pigment with a refractive index greater than about 1.4, (2) said colorant composition comprises a multiplicity of metal oxide pigment particles, at least about 90 weight percent of which are within the range of about 0.2 to about 20 microns, (3) said colorant composition comprises a first solid carbonaceous binder, (4) said second surface of said colorant composition is contiguous with at least a portion of said first surface of said frit covercoat, and (5) the total amount of frit applied to said backing sheet is at least 2 times as great as the total amount of colorant applied to said backing sheet.

In one embodiment of the process of U.S. Pat. No. 6,481,353, the digital printing is thermal transfer printing.

In another embodiment of the process of U.S. Pat. No. 6,481,353, the colorant composition comprises less than about 5 weight percent of frit.

In another embodiment of the process of U.S. Pat. No. 6,481,353, the process includes the step of overprinting the second surface of said ceramic colorant image by a process comprising the steps of applying to said ceramic colorant image a second mixture comprised of a second frit and a third solid carbonaceous binder, wherein said second frit has a melting temperature of at least about 550 degrees Celsius.

In another embodiment of the process of U.S. Pat. No. 6,481,353, (a) said second mixture is applied to said ceramic colorant image at a coverage of at least about 10 grams per square meter, (b) said second frit comprises at least about 25 weight percent of said second mixture of said second frit and said third solid carbonaceous binder, (c) said frit covercoat is applied to said backing sheet at a at a coverage of at least 2 grams per square meter, (d) said frit covercoat comprises at least about 25 weight percent of said first frit, provided that the total amount of frit applied to said backing sheet is at least about 4 times as great as the total amount of colorant applied to said backing sheet.

In another embodiment of the process of U.S. Pat. No. 6,481,353, each of said first carbonaceous binder, said second carbonaceous binder, and said third carbonaceous binder comprises less than about 15 weight percent of liquid.

In another embodiment of the process of U.S. Pat. No. 6,481,353, at least about 50 weight percent of said total amount of frit applied to said backing sheet is applied as said second frit.

In another embodiment of the process of U.S. Pat. No. 6,481,353, each of said first frit and said second frit has a particle size distribution such that at least about 90 percent of the particles in such frit are smaller than about 5 microns.

In another embodiment of the process of U.S. Pat. No. 6,481,353, each of said first frit and said second frit comprises at least about 5 weight percent of silica.

In another embodiment of the process of U.S. Pat. No. 6,481,353, the second mixture comprises from about 35 to about 85 weight percent of said second frit.

In another embodiment of the process of U.S. Pat. No. 6,481,353, the second mixture comprises from about 15 to about 35 weight percent of said third solid carbonaceous binder.

In another embodiment of the process of U.S. Pat. No. 6,481,353, the second mixture comprises from about 5 to about 20 weight percent of wax.

In another embodiment of the process of U.S. Pat. No. 6,481,353, the second mixture comprises from about 1 to about 15 weight percent of plasticizing agent.

In another embodiment of the process of U.S. Pat. No. 6,481,353, the process includes the step of printing an opacifying agent over said ceramic colorant image.

In another embodiment of the process of U.S. Pat. No. 6,481,353, the opacifying agent has a melting temperature of at least about 1200 degrees Celsius and a refractive index greater than 2.0.

In another embodiment of the process of U.S. Pat. No. 6,481,353, the process includes the step of printing a third mixture comprised of a third frit and a fourth solid carbonaceous binder over said opacifying agent.

A Process for Providing Imaged Ceramic Products

FIG. 35 is a schematic illustration of a process 600 in which a customer (not shown) can order an imaged product from a web site and have the product manufactured and delivered.

Referring to FIG. 35, in step 602 of the process, a customer who wants an imaged-substrate 903 (see FIG. 40, in which the imaged substrate 903 may be, e.g., an imaged ceramic tile or a decorated glass window), will utilize a computer (not shown) to access the world wide web and, in particular, a web site created to describe the types of imaged substrates products that the customer could order and have manufactured.

The web site preferably will contain illustrations of some typical imaged substrates 903; and it will afford the user several imaging choices. The customer will make these choices in step 604 of the process (see FIG. 35).

Assuming that the customer, e.g., wishes to purchase a decorated glass window, he will be able to specify, e.g., the size and thickness of the glass for the window.

Once the customer determines the type of substrate 903 he desires, he then can chose the shape and dimensions of the substrate so chosen, i.e., he may specify the shape and dimensions of, e.g., shower doors, round glass table tops, ceramic tile, etc.

In addition to specifying the dimensions of the substrate, the customer may also specify how the substrate is to be "finished." He can choose, e.g., to have one or more holes drilled in the substrate, to have one or more surfaces beveled, etc.

The customer may also choose from a series of standard images present on the web site. For example, the web site might have a series of images of trees; and the customer may choose to use the design, e.g., of an oak tree, and/or an elm tree, and/or a walnut tree, etc. He can look up applications such as, e.g., shower doors, entry doors, etc.; and he can sort by designs such as, e.g., traditional designs, contemporary designs, country designs, nature designs, seascape designs, etc.

Once the customer chooses one or more of the standard images, he may then choose the size desired for each of these images.

Once the customer had chosen the size(s) of the image(s), he may then specify the location(s) of these image(s) on the substrate.

He then can choose color options if, e.g., he wants a one color etched design or a full color image using process or spot colors.

Figure 36:
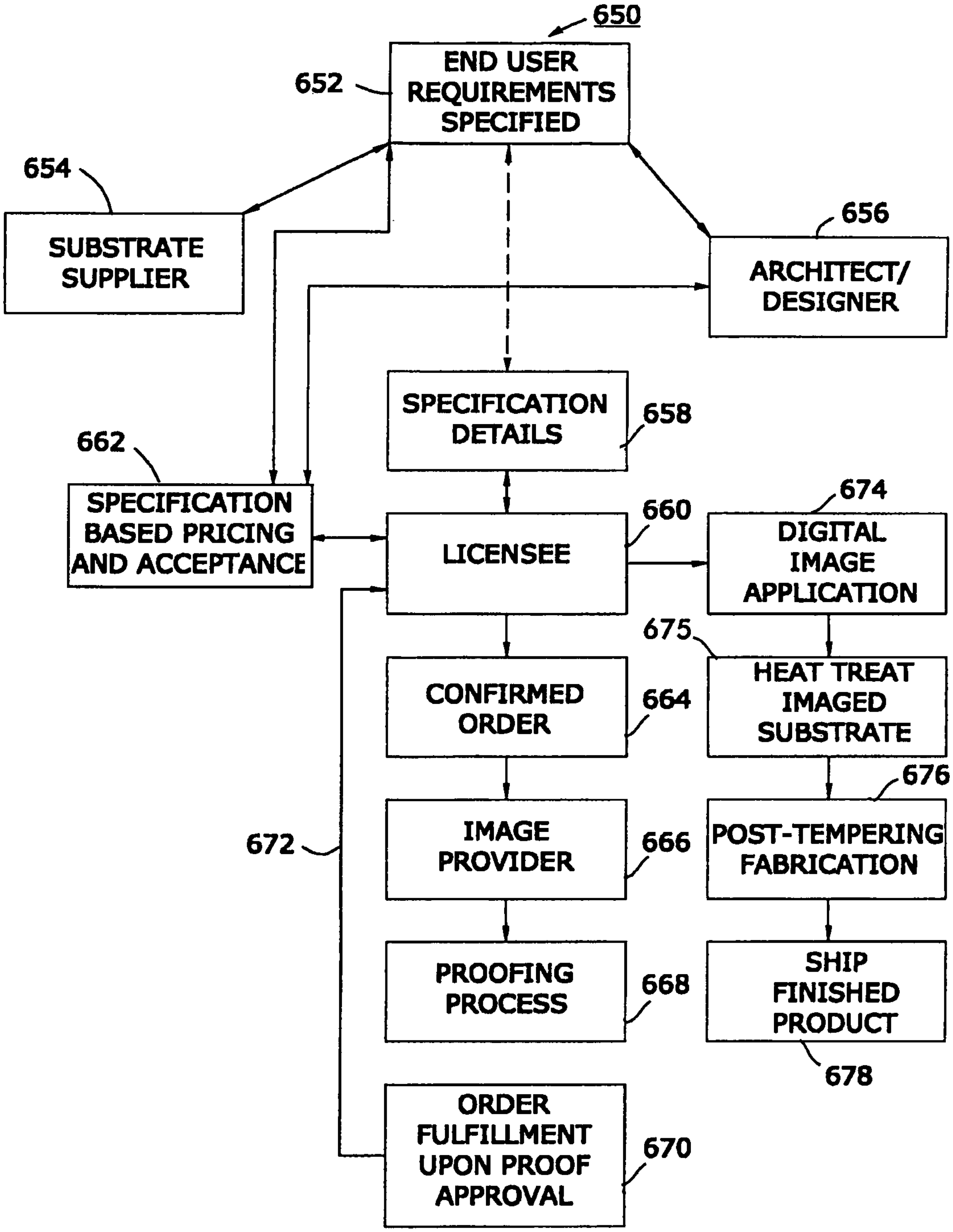

Once the customer has made all of his design choices in step 604 of the process, in step 606 he will communicate them (preferably by electronically transmitting all of his choices and placing an order for the desired product) to an image provider 666 (see FIG. 36).

In one embodiment, the customer will transmit his choices to the image provider/processor 666 by either conventional mail, fax and the like, and/or courier.

The image provider 666 will preferably be staffed by a graphic artist and by operation personnel; and it will preferably contain digital primary devices, cutting equipment, graphic design software and hardware, production supplies, and shipping supplies.

One of the functions of the image provider 666 is to create an imaged decal assembly 622. (see FIG. 35).

In one embodiment, image provider 666 creates an imaged decal assembly 622 preferably comprised of a flexible substrate 618 and, disposed on said substrate, a ceramic ink image 624, wherein said ceramic ink image comprises from about 15 to about 75 weight percent of a solid, volatilizable carbonaceous binder, from about 23 to about 75 weight percent of a film-forming glass frit, and at least about 2 weight percent of opacifying agent.

In this imaged decal assembly 622, the solid, volatilizable carbonaceous binder, after it has been heated at a temperature greater than 500 degrees Celsius for at least 6 minutes in an atmosphere containing at least about 15 volume percent of oxygen, is substantially volatilized such that less than about 5 weight percent of said solid volatilizable carbonaceous binder remains as a solid phase.

In this imaged decal assembly 622, the film-forming glass frit preferably has a melting temperature of greater than about 550 degrees Celsius. Furthermore, the opacifying agent preferably has a particle size distribution such that substantially all of its particles are smaller than 20 microns. Additionally, the opacifying agent has a first refractive index, and such film-forming glass frit has a second refractive index, such that the difference between said first refractive index and said second refractive index preferably is at least plus or minus 0.1. Furthermore, the opacifying agent has a first melting point, and said film-forming glass frit has a second melting point, such that said first melting point preferably exceeds said second melting point by at least about 50 degrees Celsius.

In this imaged decal assembly 622, the opacifying agent has a first concentration in said ceramic ink image and film-forming glass frit has a second concentration in said ceramic ink image, and the ratio of said first concentration to said second concentration is preferably no greater than about 1.25.

Referring again to FIG. 35, and in step 608 of the process, the image provider 666 formats the data received from the customer so that, in the manufacturing process, the desired product will be produced. The image design can be received by the image provider 666 in several forms from the customer.

In one embodiment, the image is a hand drawing. Alternatively, or additionally, the image can be selected from a website and/or a catalogue such as, e.g., the "DECOTHERM" website or the "DECOTHERM" catalogue. "DECOTHERM" is a trademark for an imaging process developed by the International Imaging Materials, Inc. of Amherst, N.Y. 14228.

In one embodiment, the image can be a computer EPS file EPS (an "encapsulated postscript" file), a TIF file (a tagged image format file), and the like.

If the image is a hand-drawing, the image provider 666 graphic artist may take the image; scan it into design software, and/or redraw or clean up the image so that it can be digitally printed. In proofing process 668 (see FIG. 37), the proof is then sent electronically or via courier or a computer disc or hard copy format to the customer for approval before it is printed and shipped.

Once the image has been approved, if the image is from the website/catalogue, or is an EPS file received from the customer, it is sized and placed into the queue for printing. In one embodiment, the data is formatted in step 608 (see FIG. 35) so that the appropriate design is produced on the image transfer decal 622.

Referring again to FIG. 35, and in step 610 depicted therein, the formatted data prepared by the image provider 666 is conveyed to a thermal transfer ribbon printer adapted to print onto the thermal transfer ribbon 612 whose preparation has been described elsewhere in this specification.

The thermal transfer ribbon 612 is preferably contiguous with a covercoated transfer decal 614. As is illustrated in FIG. 35, and in the preferred embodiment depicted therein, the decal 614 is preferably comprised of a cover coating 616 and support 618. In one embodiment, this covercoated transfer decal 614 comprises a flat, flexible support and a transferable covercoat releasably bound to the flat, flexible support. When the transferable covercoat is printed with an image to form an imaged decal assembly 622, the image preferably has a higher adhesion to the covercoat than the covercoat has to the flexible support. The imaged covercoat preferably has an elongation to break of at least about 1 percent. The imaged covercoat can be separated from the flexible support at a temperature of 20 degrees Celsius with a peel force of less than about 100 grams per centimeter. The flexible support preferably has a surface energy of less than about 50 dynes per centimeter.

Referring again to FIG. 35, the thermal transfer ribbon printer 610, by means of a thermal print head 620, produces an imaged decal assembly 622 comprised of an image 624, printed onto a cover coating 616, that in turn is bounded to a flat, flexible substrate 618. After printing, the imaged decal 622 it will go to a cutting station and be cut to the proper size to match the specifications for the customer and to match the specifications required for the decal applicator system. In step 625, this imaged decal assembly 622 is packed for shipping. In step 626, the decal assembly is preferably shipped to a licensee.

FIG. 36 is a schematic illustration of one process 650 by which a customer may order, e.g., an imaged object. For the sake of simplicity of illustration and description, the process will be described by reference to a finished ceramic product (such as, e.g., a glass window).

Referring to FIG. 36, and in step 652 thereof, the customer ("end user") determines with specificity what he requires in the finished product. The end user may, e.g., be a consumer, a corporate client, an original equipment manufacturer ("OEM"), and the like.

After the end user determines his design requirements, he can transmit these requirements to the substrate supplier 654. The substrate supplier may for example be a glass shop, a glazier, a ceramic tile supplier, a supplier of porcelain coated steel, a plastic film supplier and the like. Alternatively, or additionally, information may be furnished by the substrate supplier 654 to the end user to assist the end user in his design choices and selection.

The substrate supplier 654 preferably has expertise in the type of ceramic substrate to be used, the finishing choices, etc. In one embodiment of the process, the substrate supplier also provides fabrication and/or installation services.

The information flow to and from substrate supplier 654 may be by electronic means, and/or by other means.

In one embodiment, the substrate supplier 654 is a retail store.

Referring again to FIG. 36, and in the preferred embodiment depicted therein, the end user alternatively may furnish information to an architect/designer 656; and, in the manner discussed with regard to the substrate supplier 654, the end user may also receive information from the architect/designer 656 to assist him in making his design choices.

Alternatively, or additionally, the end user may choose not to consult with either the substrate supplier 654 and/or the architect/designer 656 but may choose to make his choices 658 directly with the licensee 660. The "design and ceramic substrate specification details" are described in more detail elsewhere in this specification (see, e.g., FIG. 35 and the discussion thereof).

Referring again to FIG. 36, the design and ceramic substrate specification details 658 are conveyed (either electronically or by other means) to the licensee 660. The licensee 660 may be an entity that heat treats (or tempers) ceramic substrates and, preferably, is such a temperer (see, e.g., FIG. 41). One preferred heat treating process is described in more detail elsewhere in this specification.

The licensee 660, in the preferred process depicted, often conveys information relating to its pricing and/or its acceptance of the order 662 from and/or to either the substrate supplier 654 and/or the end user 652 and/or the architect/designer 656. Ultimately, this transfer of information preferably leads to confirmation of the final order to the licensee 660. The order so confirmed 664 is indicated as step 664.

The confirmed order 664 is then conveyed to the image provider in step 666, preferably electronically or by either conventional mail, fax and the like, and/or courier. The image provider may be any entity capable of providing the imaged decal such as the licensee, a service bureau, a print shop, an architect/designer and the like. In step 668 (also see FIG. 37), the image provider 666, in a proofing process, creates a customer proof to be used in preparing the final product. The production of such a customer proof is described elsewhere in this specification. The customer proof may, e.g., be in an electronic format, and/or in another format.

Referring again to FIG. 36, and in step 670 thereof, the customer proof, as well as the order that gave rise to it, are finally approved; and the required digital image(s) is created.

Thereafter, the digital image so created is conveyed via line 672 back to the licensee 660. Thereafter, the licensee, in step 674, applies the digital image to the substrate that, preferably, is either ceramic, glass, or glass-ceramic.

In step 675 of the preferred process depicted in FIG. 36, the imaged substrate is subjected to heat treatment (such as, e.g., tempering). This heat treatment is described in greater detail elsewhere in this specification.

In optional step 676, the licensee 660 performs one or more "post-tempering fabrication" steps. As will be apparent, some finishing steps preferably are conducted only after tempering. These steps include, e.g., framing, attachment of hardware (such as handles, hinges, etc.), and the like.

Thereafter, in step 678, the finished, imaged, ceramic product is packed and shipped to the end user. Alternatively, the desired product may be shipped to the substrate supplier 654 and/or the architect/designer 656.

Figure 37:
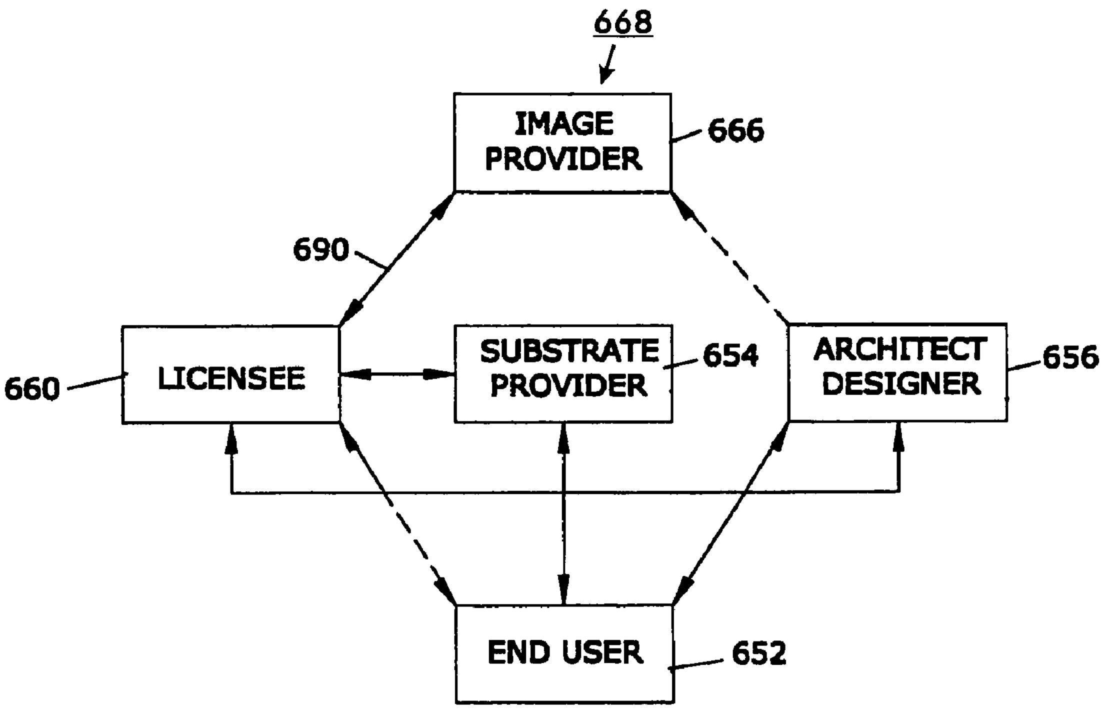
Figure 38A:
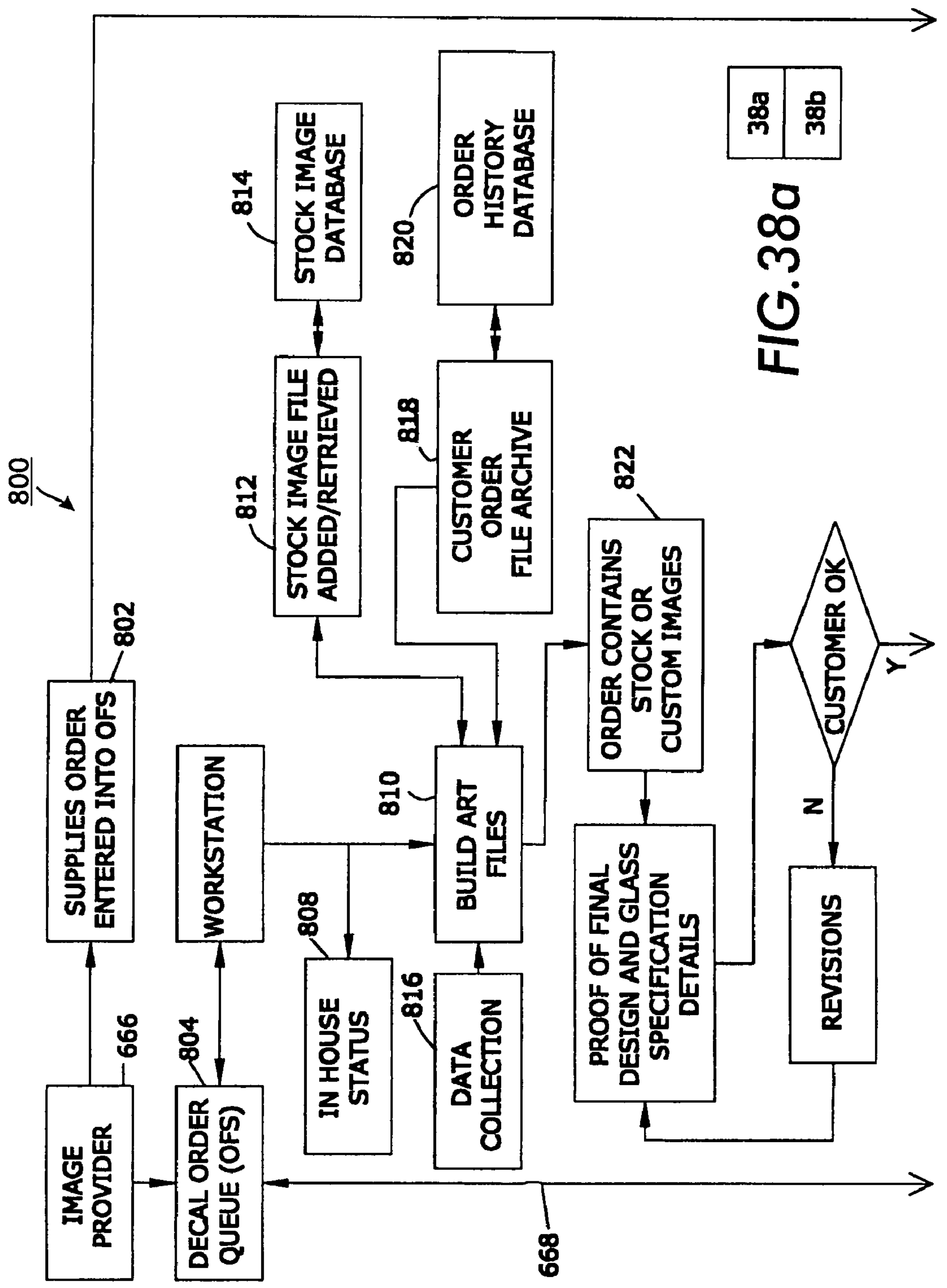
Figure 38B:
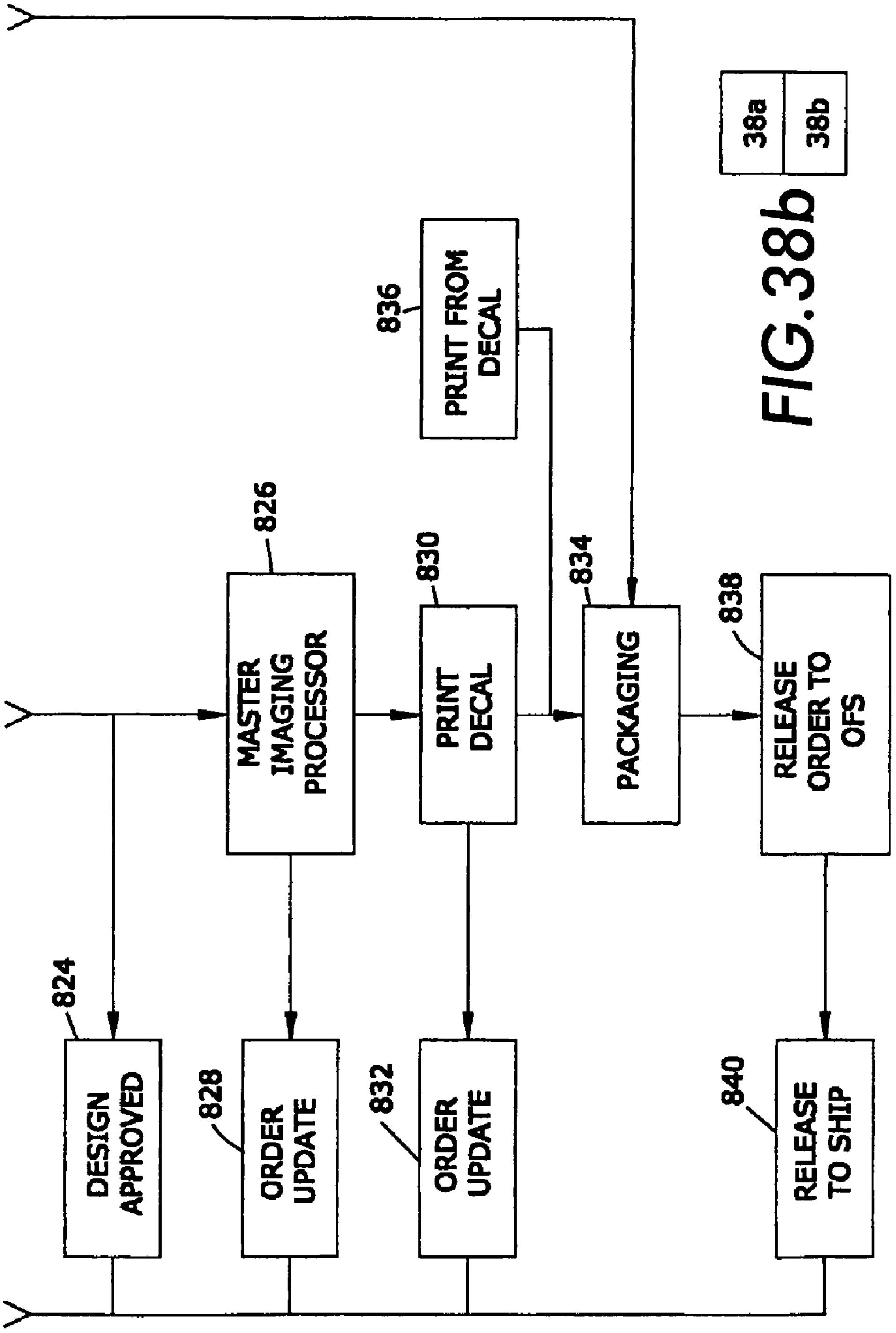

FIG. 37 is a schematic of one embodiment of the proofing process 668 depicted in FIG. 36. In the preferred embodiment illustrated in FIG. 37, and in one aspect thereof, information is conveyed to and from the image provider 666 and the licensee 660 via line 690. In this embodiment, the details of the end user's order are approved by the licensee 660 prior to printing of the decal by the image provider 666.

Referring again to FIG. 37, and in another embodiment thereof, the information relating to the proof confirmation is conveyed to and from the licensee and the substrate supplier 654 and/or the architect/designer 656, and thence to the image provider 666. Alternatively, or additionally, the information relating to the proof confirmation may be conveyed to and/or form the end user 652 to the substrate supplier 654 and/or the architect/designer 656 and/or the licensee 660, and thence to the image provider 666. In this embodiment, the details of the end user's order are approved by the licensee 660, and/or the substrate supplier 654, and/or the architect/designer 656, prior to printing of the decal.

FIG. 38 is a schematic illustration of one preferred process 800 for acceptance and processing of an order by the image provider 666. In the preferred embodiment depicted, the image provider 666 receives various types of orders from one or more external sources (not shown). By way of illustration and not limitation, the orders received by the image provider may comprise orders for supplies, orders for decal fabrication, orders for processing, and the like.

In one embodiment, the various types of orders are processed from the image provider 666 using the order fulfillment database ("OFS") database.

Referring again to FIG. 38, an order for supplies may be processed by the image provider 666. In the embodiment illustrated in FIG. 38, the order for supplies is preferably processed in step 802 using the OFS. The supplies order is packaged in step 834; once such order is packaged, the order information is provided to the OFS in step 838 for processing of information such as, e.g., shipping and billing details. Once the order has been released to the order fulfillment database in step 838, the order/item status is now indicated as "released to ship" in step 840.

Referring again to FIG. 38, the second type of order that can be processed by the image provider 666 is an order for imaged decal assembly (see FIG. 36 and steps 668, 670, and 672 thereof). In step 816 of the process depicted in FIG. 38, data is collected by the image provider 666 that indicates a possible layout request for artwork such as, for example, utilizing a design file(s) from an external source.

Utilizing the data collected in step 816, a customer art file is preferably built in step 810. The art used in step 816 may be a stock image file from stock image file database 814.

In step 812 of the process, specific stock image file(s) may be added or retrieved. Thus, e.g., the stock image file(s) may be selected and retrieved from stock image database 814.

In one embodiment, the customer art file built in step 810 may be a reorder, in which case the art, design, and associated customer output files that are to be used in the manufacture of the imaged decal assembly are preexisting. In this embodiment, the method that is used for the retrieval of the preexisting electronic customer output files are contained in the customer-order file archive of step 818.

The customer-order file archive 818 is preferably linked electronically to the order history database (or customer relationship management) system of 820. Once the electronic customer files are determined in steps 812 and 814, or retrieved in steps 818 and 820, the customer art files are built (as previously described in step 810). The customer art files so built will preferably contain stock and/or custom images that are ordered.

Referring again to FIG. 38, and in the preferred embodiment depicted therein, the customer art files that contain the images from step 822 are preferably sent by electronic and/or manual means to a proofing process 668 (see FIG. 37).

Once proofing process 668 has been completed, in step 824 the status of the order and/or item is updated to "design approved" in the order fulfillment system; and an update is provided (by electronic and/or manual means) to the decal order queue fulfillment system.

Once the proofing process 668 has been completed, customer output data files are sent to the raster imaging processor (RIP) of step 826. As is known to those skilled in the art, a raster image processor is a device that handles computer output as a grid of dots; dot matrix, inkjet and laser printers are all raster image processors. Reference may be had, e.g. to U.S. Pat. No. 4,891,768 (raster image processor); U.S. Pat. No. 6,295,133 (method and apparatus for modifying raster data); U.S. Pat. No. 5,802,589 (data buffering apparatus for buffering data between a raster image processor [RIP] and an output device; U.S. Pat. No. 5,282,269 (raster image memory); U.S. Pat. No. 5,237,655 (raster image processor for all points addressable); and the like. The entire disclosure of each of these United States patents is hereby incorporated by reference into this specification.

In one embodiment, the raster image processor is a device that prepares the customer output file data into a format that can be read by the thermal transfer ribbon printer 610 that is used to manufacture the imaged decal assembly 622 that is to be thermally applied to a ceramic substrate by the Licensee 660.

Referring again to FIG. 38, and upon the completion of step 826, in step 828 an update of the order status is sent to the decal order queue fulfillment system. Thereafter, in step 830 the customer decal is printed using the process described elsewhere in this specification.

In step 832, and after the imaged decal assembly 622 has been manufactured, an update is sent to the decal order queue fulfillment system. After the imaged decal assembly has been manufactured (in step 830), a print of the final layout and design that was used to manufacture the decal is generated on a paper-based medium in step 836. This paper-based version of the decal may be used by the licensee for visual orientation and for quality assurance purposes in the manufacturing process of steps 674 and/or 676 and/or 678.

Upon completion of the manufacture of the imaged decal assembly 622 (in step 830), (that preferably will be accomplished in a clean room environment), the imaged decal assembly, and the reference document of step 836 (hard copy or electronic format) are packaged in step 834 using conventional techniques (which may include clean packaging methods and using clean packaging materials that are preferably dust and fiber free). Thereafter, and once the final product is ready for shipment, in step 838 the order is released for shipment, and the product is flagged as "released to ship" in the order fulfillment system, in step 840. An update is preferably provided through electronic or manual means to the decal order queue order fulfillment system.

In step 808, after receipt of the various types of orders by the image processor 666 and the subsequent entry into the decal queue order fulfillment system 804, the status of the order and/or item is updated to "in house."

Figure 39:
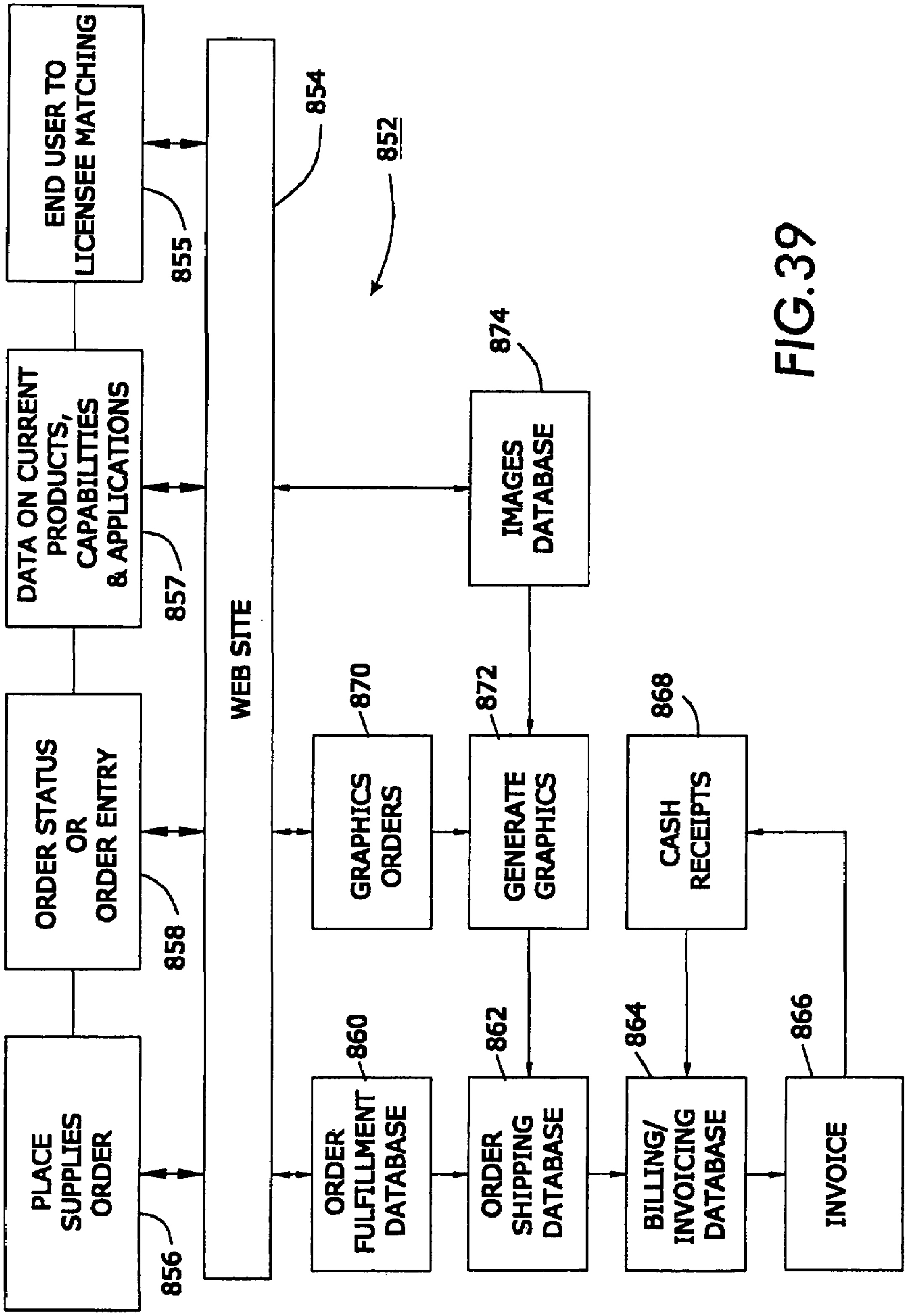

FIG. 39 is a system level diagram of a system 852 that comprises a web site 854. Access to the web may be restricted, or open to the public.

A licensee 660, e.g., may place an order for supplies in step 856. Thus, e.g., the licensee 660 might order, e.g., adhesives and/or materials necessary to process the decal received from the image provider 666.

In step 858, the licensee 660, e.g., may check the status of its order for decals and/or supplies; and/or it may place an order for such decals and/or supplies.

In one embodiment, the steps 856 and/or 858 are done using secure website access methods well known to those skilled in the art.

By comparison, in a non-secure manner an end user (not shown) may obtain data on current products, capabilities and applications from web site 854 in step 857. In step 859, after an end user enters some information into the web site 854, his information is matched with the available licensee(s), and he is informed of the identity of the appropriate licensee; and he is also furnished appropriate contact information. Thereafter, he may contact (in person, by phone or by a web link) the licensee and request further product information, as desired.

Once a licensee has entered order information into web site 854, such information is fed to an order fulfillment database 860. This database 860, which is updated periodically, receives information from supply orders from the web site 854 (see steps 856 and 858), and it also updates information on the status of orders through step 858.

Referring again to FIG. 39, an order shipping database 862 receives information from the order fulfillment database in step 860. The order shipping database 862 processes information from the order fulfillment database (860), and is used in the normal course of business operations.

A billing/invoicing database 864 receives information from the order shipping database 862. This billing/invoicing database 864 performs various accounting functions, and generates invoices in step 866.

Cash receipts are received in step 868 and/subsequently entered into the billing/invoicing database 864. Cash receipts 868 result from the invoices that are generated in step 866.

Once a licensee has entered ordering information into web site 854, such ordering information is retained as graphics orders in step 870. These graphics orders are provided as information back to web site 854 for subsequent customer updates (see step 858). Additionally, graphics orders 870 provide data to generate graphics at the image provider 666. The generation of graphics at the image provider 666 is performed in step 872. Additionally, the generation of graphics in step 872 will also trigger an update to the order shipping database previously described as step 862.

The web site 854 is also capable of accessing an images database (step 874), which contains electronically formatted images of various visual components that are used in the design process. The images database 874 can be accessed by authorized users of the web site 854. The images database 874 is also used by the image provider 666 to generate graphics (step 872) that are used in the order process.

FIG. 40 illustrates one preferred imaging process 891. Referring to FIG. 40, and in the preferred embodiment illustrated therein, it will be seen that the substrate fabricator (not shown) is in possession of both the imaged decal assembly 622 (produced by process 600) and the specifications 623 for the finished product (produced in step 604). Armed with these, he then proceeds to prepare and apply adhesive to the desired substrate 803.

In one preferred embodiment, the sub-processes of imaging process 891 are accomplished in a clean room environment.

In one embodiment, the substrate 903 used comprises at least about 10 weight percent of an element selected from the group consisting of aluminum, silicon, magnesium, beryllium, titanium, boron, mixtures thereof, and the oxides and/or carbides and/or nitrides thereof. In one aspect of this embodiment, the preferred element is silicon, and its preferred compound is silica.

In one embodiment, the substrate 903 contains at least about 50 weight percent of silica. In another embodiment, the substrate 903 contains at least about 60 weight percent of silica. In yet another embodiment, the substrate 903 contains at least about 70 weight percent of silica. In one aspect of each of these embodiments, the substrate also contains minor amounts of the oxides of calcium and/or lead and/or lithium and/or cerium.

In one embodiment, the substrate 903 has a melting point greater than about 300 degrees Celsius.

In one embodiment, the substrate 903 is flat. In another embodiment, the substrate 903 is curved or arcuate. In one embodiment, the substrate is an optical fiber onto which digital information (such as, e.g., a bar code) has been printed.

In one embodiment, the substrate 903 has a Sheffield smoothness of less than about 200 and, more preferably, less than about 100. In one aspect of this embodiment, the Sheffield smoothness of the substrate is less than about 50 and, more preferably, less than about 20.

In one embodiment, the substrate 903 is transparent. In another embodiment, the substrate is tinted. In yet another embodiment, the substrate is opaque.

In one embodiment, the substrate 903 has a thickness range of about 0.01 inches to 1.0 inches. In another embodiment, the substrate 903 has a thickness range about 0.1 inches to 0.8 inches.

In one embodiment, the substrate 903 comprises at least about 50 weight percent silicon or consists essentially of glass. As is known to those skilled in the art, glass is an amorphous solid made by fusing silica with a basic oxide. See, e.g., pages 376-383 of George S. Brady et al.'s "Materials Handbook," Thirteenth Edition (McGraw-Hill, Inc., New York, N.Y. 1991).

The substrate 903 may be, e.g., bottle glass. As is known to those skilled in the art, bottle glass is a soda-lime glass with a greenish color due to iron impurities.

The substrate 903 may be, e.g., crown glass, which is a hard soda-lime glass that may contain, e.g., 72 percent of silica, 13 percent of calcium oxide, and 15 percent of sodium oxide. Crown glass is highly transparent and will take a brilliant polish.

The substrate 903 may be, e.g., hard glass (or "Bohemian glass"), which is a potash-lime glass with a high silica content.

The substrate 903 may be, e.g., a lead glass or a lead-alkali glass, with a lead content that ranges from low to high.

The substrate 903 may be, e.g., a borosilicate glass that contains boron oxide.

The substrate 903 may be, e.g., an aluminosilicate glass.

The substrate 903 may be, e.g., a Vicor glass, i.e., a silica glass made from a soft alkaline glass by leaching in hot acid to remove the alkalies and them heating (to 1093 degrees Celsius) to close the pores and shrink the glass.

The substrate 903 may be, e.g., a phosphate glass in which the silica is replaced by phosphorous pentoxide.

The substrate 903 may be, e.g., a sodium-aluminosilicate glass.

The substrate 903 may be fused silica glass, containing 100 percent of silica. Because of its high purity level, fused silica is one of the most transparent glasses.

The substrate 903 may be a flint glass, i.e. a highly transparent soda-lime quartz glass.

The substrate 903 may be a crystal glass that often contains lead to impart brilliance.

The substrate 903 may be an English crystal glass, which is a potash glass containing up to 33 percent of lead oxide. This glass has a high clarity and brilliancy.

The substrate 903 may be a 96 percent silica glass.

The substrate 803 may be a boric oxide ("borax") glass. In one aspect of this embodiment, the glass used is "invisible glass" which is a borax glass surface treated with a thin film of sodium fluoride. It transmits 99.6% of all visible light and, thus, gives the impression of invisibility.

The substrate 903 may be optical glass, which usually is a flint glass of special composition and which contains silica, soda (sodium carbonate), barium, boron, and lead.

The substrate 903 may be plate glass, i.e., any glass that has been cast or rolled into a sheet and then ground or polished. As is known to those skilled in the art, the good grades of plate glass are, next to optical glass, the most carefully prepared and the most perfect of all of the commercial glasses.

The substrate 903 may be, e.g., conductive glass, i.e., a plate glass with a thin coating of stannic oxide.

The substrate 903 may be, e.g., a transparent mirror made by coating plate glass on one side with a thin film of chromium. This glass is a reflecting mirror when the light behind the glass is less than in front, and it is transparent when the light intensity is higher behind the glass.

The substrate 903 may be, e.g., a colored glass. As is known to those skilled in the art, metal salts are used in glass for coloring as well as controlling the glass characteristics. Mangangese oxide colors glass violet to black. A mixture of cobalt oxide and ceric oxide produces "Jena blue glass." A mixture of selenium and cadmium sulfide produces Ruby glass with a rich red color. Amber glass is made with controlled mixtures of sulfur and iron oxide. Neophane glass is glass containing neodymium oxide. Opalescent glass (or opal glass) has structures that cause light falling on them to be scattered, and they thus are white or translucent.

The substrate 903 may be a Monax glass, i.e., a white diffusing glass for lamp shades and architectural glass.

The substrate 903 may be an oxycarbide glass, in which carbon has been substituted for oxygen (or even nitrogen).

The substrate 903 may be an optical fiber comprising glass.

The substrate 903 may be a glass-ceramic. As is known to those skilled in the art, glass ceramic materials are a family of fine-grained crystalline materials made by a process of controlled crystallization from special glass compositions containing nucleating agents.

The substrate 903 may itself be a coating on another substrate. Thus, e.g., the substrate may be a porcelain enamel coating on a steel substrate.

Referring again to FIG. 40, and in step 802 thereof, the substrate 903 is "fabricated" or "finished." As is known to those skilled in the art, after the substrate 903 leaves the annealing layer after being fabricated at the melting tank, it still may require one or more of a variety of secondary, or finishing operations, before the ware is complete. Thus, e.g., the substrate 803 may be cut to size, or subjected to grinding, or polished, or heat treated (such as, e.g., by tempering), or etched, or stained, or strengthened, or coated, etc.

In one preferred embodiment, in step 802 the substrate 803 is cut to size, and/or one or more holes are drilled in it, and/or it has "edge work" done (such as bevels).

After the substrate 803 has been fabricated, it is then preferably washed in step 804. In one preferred embodiment, the substrate is washed using a horizontal glass washer produced by manufacturers such as Bavone, Somaca, Billco, IRM, etc. The washers are preferably equipped with nylon brushes approximately 4.0" in diameters with 12" wide reversible segments. The number of segments is determined by the width of the washer.

In one embodiment, a circulatory hot wash, which may or may not include a detergent, at a temperature of from about 40 degrees Celsius to about 90 degrees Celsius, is followed by a circulatory first rinse and a fresh water final rinse. The final rinse in certain cases may include the use of distilled or deionized water.

The washed substrate is preferably transported to a drying chamber (not shown). In one embodiment, the drying chamber uses forced, filtered air through tear drop air knives to obtain a final moisture content of less than about 2.0 percent.

In step 906, which is optional, adhesive is then applied to the dried substrate 903. In the embodiment depicted in FIG. 40, a layer of a transfer adhesive assembly 908 is passed from roll 910 to roll 912 between laminator nips 914/916 to produce assembly 918, whereby the adhesive 920 adheres to the surface of substrate 903. It is preferred that, in one embodiment, in process 891 the pressure applied by laminator nips 914/916 be from about 10 pounds per square inch to about 100 pounds per square inch and that the process 891 be conducted at a temperature of from about 0 degrees Celsius to about 50 degrees Celsius.

Referring again to FIG. 40, and in the preferred embodiment depicted therein, the nip gap (or distance between the laminator rolls 914/916) preferably is smaller than the thickness of the substrate being laminated. Preferably, the nip gap distance between the laminator rolls 914/916 is from about 1/32" to about 1/8" smaller than the thickness of the substrate 903. In one embodiment, the rate of speed for the adhesive application ranges from about 5 feet per minute to about 10 feet per minute.

The adhesive and corresponding image can be placed in various positions on the substrate by entering the location information into a control panel and program logic controller (not shown). In another embodiment, employing more manual equipment features, the image can be placed in various positions on the substrate using measurement indicator devices.

In one embodiment, not shown, the step of applying the adhesive 920 is omitted. In this embodiment, the imaged decal assembly is adhered to the substrate using a combination of heat and pressure, as described elsewhere in this specification.

Referring again to FIG. 40, and to the preferred embodiment depicted therein, the imaged decal assembly 622 will preferably be in the form of a sheet. In step 922, imaged decal assembly 622 will be fed by means of a tray 924 so that it is in proper registry with substrate assembly 918. The imaged decal assembly is preferably moved to a predetermined locating point on tray 924 that establishes the leading edge as a datum. Simultaneously, the substrate 903 with adhesive 920 is preferably moved to a reference point, then in turn it is moved to the image location datum as defined in the control system. When the imaged decal assembly and substrate datums are aligned, tray 824 lowers to attach the leading edge of cover coating (616) to the substrate. Optical registration marks can also be used to register the image. While these marks are primarily used on images produced in rolls, the marks can also be used for images on sheets.

A sensor (not shown) preferably reads the registration mark (not shown) and moves the imaged decal assembly to a predetermined location for cutting. When the image is cut from the roll, this establishes an imaged decal assembly datum. The imaged decal assembly is then processed as a single sheet as defined above. After the imaged decal assembly 622 is properly registered with adhesive treated substrate assembly 918, surface 9826 of element 618 will be contacted with removal tape 928 while pressure is applied by nips 914/916 to remove element 618 and produce the assembly 930. As will be apparent, the assembly 930 comprises the substrate 903, the adhesive 908, the digitally printed image 624, and the cover coating 616.

FIG. 41 is a schematic of a heat treating process 1000 in which assembly 930 (see FIG. 40) is exposed to temperatures ranging from about degrees Celsius to about 1200 degrees Celsius. In one embodiment, assembly 930 is oscillated to prevent bending or distortion as a standard operating procedure of the tempering process. The duration of exposure of assembly 930 is determined by the thickness of the ceramic substrate and the temperature of the heat treatment. For example, for ¼" glass the duration is often from about 2 minutes to about 3 minutes at about 700 degrees Celsius. For a ½" glass substrate, the duration often extends to from about 5 minutes to about 6 minutes at about 700 degrees Celsius.

The heat treatment is often conducted in a furnace 1002. After the heat treatment in furnace 1002, the assembly 930 is preferably transported directly to a quenching chamber 1004. The quenching chamber supplies high volumes of circulated room temperature air that, in one embodiment, is generated by two 500-horsepower turbine motors.

In one embodiment, the duration of exposure to quenching is roughly the same as described for the heat exposure process; and the quenching preferably rapidly brings the assembly 930 back to ambient temperature.

During the process depicted in FIG. 41, the adhesive 920, the cover coating composition 616 and any carbonaceous materials contained in the image 624 are preferably completely burned away leaving the remaining digitally printed image 624 integrally fused to the surface of the substrate 903 to produce a finished product 1006. If a frosting in ribbon 612 is used in process 600, then the final product 1006 looks and feels like etched or sandblasted glass or ceramic, but with improved durability and is completely washable. If a ceramic ink ribbon 612 is used in process 600, then the final product 1006 will be an imaged substrate wherein said image is of the characteristics specified by the customer and has sufficient contrast with the substrate such that it may be easily seen.

EXAMPLES

The following Examples are presented to illustrate a portion of the claimed inventions but are not to be deemed limitative thereof. Unless otherwise specified, all parts are by weight, and all temperatures are in degrees Celsius.

In the Examples presented below, adhesion of the cover coat to the paper was measured, the percent elongation at break (at 20 degrees Celsius) of the cover coat was measured, and the ceramic ink image was characterized for change in opacity before and after heat treatment.

In these examples a flexible substrate, such as, for example, substrate 618, was used. The flexible substrate was a 90 gram per square meter basis paper made from bleached softwood and hardwood fibers. The surface was sized with starch. This base paper was coated with a release layer by extrusion coating a polyethylene and extrudable wax (Epolene, from Eastman Chemical Corporation of Kingsport, Tenn.) mixture to a coatweight of 20 gram per square meter.

The examples described below describe a variety of cover-coated flexible substrates. In each of such examples, a rectangular solid fill image was printed onto the cover coated flexible substrate with a ceramic ink ribbon using a Zebra 170X11 printer at an energy level setting of 25 and a print speed of 2 inches per minute to prepare a ceramic ink decal.

In the experiments described in these examples, the ceramic ink ribbon was prepared by the following procedure: A 4.5 micron thick poly (ethylene terephthalate) film (Toray F31) was used as a substrate film, and it was backcoated with a polydimethylsiloxane-urethane copolymer SP-2200 crosslinked with D70 toluene diisocyanate prepolymer (both of which are sold by the Advanced Polymer Company of New Jersey) at a coat weight of 0.03 grams per square meter. The copolymer composition was applied with a Myer Rod and dried in an oven at a temperature of 50 degrees Celsius for 15 seconds.

A release coating composition was prepared for application to the face coat of the polyester film. To a mixture of 38 grams of reagent grade toluene and 57 grams of reagent grade isopropyl alcohol were charged 0.58 grams of Diacarna 3B (an alpha-olefin sold by the Mitsubishi Kasai Company of Japan), 0.6 grams of EVALEX V577 (an ethylene-vinylacetate resin sold by the DuPont Mitsui and Polychemicals Company of Japan), and 3.82 grams of "POLYWAX 850" (a polyethylene wax sold by the Baker Hughes Baker Petroline Company of Sugarland, Tex.). This mixture was stirred until the components were fully dissolved. Then it was coated with a Myer Rod at a coating weight of 0.5 grams per square meter and thereafter dried for 15 seconds at 50 degrees Celsius. The polyester film, with its backcoating and release coating, then was coated with a ceramic ink layer at a coating weight of 5.6 grams per square meter; the ceramic ink layer was applied to the release layer. The ceramic ink was prepared by mixing 60.0 grams of hot toluene (at a temperature of 60 degrees Celsius) with 14.73 grams of a mixture of Dianal BR 106 and Dianal BR 113 binders in weight/weight ratio of 1/3; these binders were purchased from the Dianal America Company of Pasadena, Tex. Thereafter, 3.99 grams of dioctyl phthalate (sold by Eastman Chemical, Kingsport, Tenn.), 48.8 grams of Unleaded Glass Flux 23901 (sold by Johnson Matthey Ceramic Inc. of Downington, Pa.) with a refractive index of 1.4, 9.04 grams of Onglaze Unleaded Glass Flux 94C1001 (sold by Johnson Matthey Ceramic Inc. of Downington, Pa.) with a refractive index of 1.7, 8.17 grams of Superpax Zircon Opacifier (sold by Johnson Matthey Ceramic Inc. of Downington, Pa.) with a refractive index of 1.9, 8.17 grams of Cantal 290 (sold by Canada Talc, Marmora, Ontario, Canada), and 1.59 grams of Cerdec 1795 Black Oxide (sold by Cerdec-DMC$^2$, Washington, Pa.) were charged to the mixture. The composition thus produced was mixed with 50 grams of ceramic grinding media and milled on a paint shaker for 15 minutes until substantially all of the particles were smaller than 10 microns. Thereafter, 5.48 grams of Unilin 425 (a wax sold by the Baker Hughes Baker Petrolite Company) were dissolved in sufficient reagent grade methylethylketone to prepare a 15 percent solution, and this wax solution was then charged to the mixture with stirring, until a homogeneous mixture was obtained. Thereafter the mixture was filtered to separate the filtrate from the grinding media, and the filtrate was then coated onto the release layer of the polyester substrate at a coating weight of 5.6 grams per square meter using a Meyer Rod. The coated substrate thus produced was then dried with a hot air gun.

A transfer adhesive was prepared by mixing 61 grams of the UCAR 9569 acrylic emulsion (sold by the Union Carbide Corporation, a subsidiary of the Dow Chemical Company, Danbury, Conn.) with 32 grams of UCAR 413 acrylic emulsion (sold by the Union Carbide Corporation) and 6 grams of the BYK 438 polyether modified siloxane surfactant (sold by the Byk-Chemie USA company of Wallingford, Conn.).).

The transfer adhesive thus formed was then coated via Myer rod at a 5 grams coatweight to a 2 mil thick release liner coated with a ultraviolet-curable release coating known as UV10 (purchased from the CPFilms company of Greenboro, Va.). This adhesive coated liner was then laminated to a second 1 mil thick release liner coated with a platinum cured release coating known as P10 (also purchased from such CPFilms company).

A decal was then prepared by affixing the imaged, cover-coated transfer paper to a flat surface by taping the corners down.

The UV10 release liner of the adhesive was removed, and adhesive was placed adhesive side down onto the imaged transfer paper. The adhesive and paper were laminated to produce contact and remove air bubbles. The P10 release liner was then removed, and the transfer adhesive remained with the imaged decal.

The adhesive side of the decal was then positioned over the glass substrate and laminated to it as air bubbles were removed. The backing paper was then peeled away leaving the ceramic ink image and cover coat on the glass.

The glass, adhesive and ceramic ink image were then heat treated in a kiln for 10 minutes at 621 degrees Celsius. This thermal treatment caused the carbonaceous materials in the ceramic ink as well as the cover coat to burn away, leaving the mixture of film forming glass frit and opacifying agents on the glass sheet. The opacifying agents remained dispersed in this film, thus rendering the film translucent yet not transparent.

In the examples described hereinbelow, the ceramic ink image, on a transparent, glass substrate was characterized for change in opacity before and after heat treatment. The test for determining opacity was carried out according to the TAPPI Standard T519.

In the Examples presented below, adhesion of the cover coat to the paper was measured by cutting 0.5 inch wide×8 inch long strips of cover coated paper. The covercoat was manually separated from the paper backing for one inch at the top of the strip. Each half of the strip was mounted in the grips of the Sintech 200/S tensile apparatus described elsewhere in this specification. The peel adhesion was measured at room temperature (20 degrees Celsius) and at 25.4 centimeters per minute with a 5 pound load cell.

In the experiments of the examples, percent elongation at break (at 20 degrees Celsius) of the cover coat was measured by cutting 0.5" wide×8 inch long strips of cover coated paper. The covercoat was then separated from the paper backing, this free film of covercoat was mounted in the grips of the MTS Sintech 200/S tensile apparatus. The free film of covercoat was then pulled to determine the percent elongation at break of the film. The pull was performed at 5 inches per minute with a 5 pound load cell. The film thickness of each free film was measured using the Mahr micrometer.

In these examples, the covercoat was prepared in substantial accordance with the procedure described hereinabove.

Example 1

A covercoat coating composition was prepared for application to the face coat of the paper. The cover coat was prepared by coating Joncryl 617 (a styrene/acrylic emulsion sold by Johnson Polymers, Racine, Wis.) at a dry coat weight of 10 grams per square meter using a Meyer rod. The coated paper was then allowed to dry at ambient temperature for 16 hours.

In the experiment of this example, the styrenated acrylic covercoat cover coat had an adhesion value of 3.68 grams per centimeter, an elongation at break of 68.2 percent, and a delta opacity (as described elsewhere in this specification) of −5.27.

Example 2

A covercoat coating composition was prepared for application to the face coat of the paper. The cover coat was prepared by dissolving 12 grams of Ethocel (an ethylcellulose sold by the Dow Corporation of Midland, Mich.) into 44 grams of methyl ethyl ketone and 44 grams of toluene that had been heated to a temperature of 70 degrees Celsius. This solution was coated onto the release sheet at 10 grams per square using a Meyer rod. The coated paper was then allowed to dry at ambient temperature for 16 hours.

In the experiment of this example, the ethylcellulose cover coat had an adhesion value of 2.8 grams per centimeter, an elongation at break of 41 percent, and a delta opacity of 5.27.

Example 3

A covercoat coating composition was prepared for application to the face coat of the paper. The cover coat was prepared by dissolving 15 grams of Dynapoll 411 (a polyester sold by the Degussa-GoldSchmitt Company of Hopewell, Va.) into 75 grams of methyl ethyl ketone that had been heated to a temperature of 70 degrees Celsius. This solution was coated onto the release sheet at a dry weight of 10 grams per square using a Meyer rod. The coated paper was then allowed to dry at ambient temperature for 16 hours.

In the experiment of this example, the Polyester cover coat had an adhesion value of 17.7 grams per centimeter, an elongation at break of 753 percent, and a delta opacity of 13.25.

Example 4

A covercoat coating composition was prepared for application to the face coat of the paper. The cover coat was prepared by dissolving 20 grams of VROH (a vinylacetate vinylchloride sold by Dow Chemical Corporation of Midland, Mich.) into 80 grams of toluene that had been heated to a temperature of 70 degrees Celsius. This solution was coated onto the release sheet at a dry weight of 10 grams per square using a Mayer rod. The coated paper was then allowed to dry at ambient temperature for 16 hours.

In the experiment of this example, the vinylacetatevinylchloride cover coat had an adhesion value of 0.8 grams per centimeter, an elongation at break of 1.7 percent, and a delta opacity of 10.34.

Example 5

A covercoat coating composition was prepared for application to the face coat of the paper. The cover coat was prepared by dissolving 12 grams of Butvar 79 (a polyvinylbutyral sold by the Solutia Company of St. Louis, Mo.) into a mixture of 42 grams of isopropanol, 42 grams of 2-butanone and 4 grams of dioctyl phthalate (Eastman Chemical, Inc., Kingsport, Tenn.) that had been heated to a temperature of 70 degrees Celsius. This solution was coated onto the base paper at 10 grams per square using a Meyer rod. The coated paper was then allowed to dry at ambient temperature for 16 hours.

In the experiment of this example, the Polyvinylbutyral cover coat had an adhesion value of 0.7, an elongation at break of 7.7% and a delta opacity of 12.26.

Example 6

The substrate used in this example was a silicone coated release sheet purchased from the Sappy Fine Paper Company N.A. of Westbrook, Mass.; the catalog description of the paper was Strip Kote BOR Super matte. A covercoat coating composition was prepared for application to the face coat of the paper. A covercoat of Elvax 240 (an ethylene vinyl acetate sold by Dupont of Wilmington, Del.) was extrusion coated onto the substrate at a temperature of 121 degrees Celsius at a coat weight of 30 grams per square meter.

In this example, the imaged decal was then transferred to a sheet of borosilicate glass (10 centimeters×10 centimeters×0.5 centimeters) by pressing the ceramic ink decal against the glass sheet and heating this composite up to a temperature of 275 degrees Fahrenheit (132 degrees Celsius). The glass, adhesive and ceramic ink image were then heat treated in a kiln for 10 minutes at 621 degrees Celsius.

In the experiment of this example, the covercoat had an adhesion value of 3.2 grams per centimeter, an elongation at break of 1,167 percent, and a delta opacity of 1.95.

Example 7

This example utilized the procedure described in Example 6, except the covercoat coating composition was prepared for application to the face coat of the paper. The cover coat was prepared by coating Joncryl 617 (a styrene/acrylic emulsion sold by Johnson Polymers, Racine, Wis.) at a dry coat weight of 10 grams per square meter using a Meyer rod. The coated paper was then allowed to dry at ambient temperature for 16 hours.

In the experiment of this example, the styrenated acrylic covercoat cover coat had an adhesion value of 3.68 grams per centimeter, an elongation at break of 68.2 percent, and a delta opacity (as described elsewhere in this specification) of −0.38.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. A digitally printed assembly comprised of a substrate and, disposed on said substrate, a digitally printed ceramic ink image, wherein said ceramic ink image comprises from about 15 to about 94.5 weight percent of a solid, volatilizable carbonaceous binder, from about 5 to about 75 weight percent of a film-forming frit comprised of at least 5 weight percent of silica, and at least about 0.5 weight percent of a metal oxide containing ceramic colorant selected from the group consisting of metal oxide containing pigment, metal oxide containing opacifying agent, and mixtures thereof, and wherein:

(a) said metal oxide containing ceramic colorant has a first refractive index, and such film-forming frit has a second refractive index, such that the difference between said first refractive index and said second refractive index is at least 0.1;

(b) said metal oxide containing ceramic colorant has a first melting point, and said film-forming frit has a second melting point, such that said first melting point exceeds said second melting point by at least about 100 degrees Celsius; and (c) said metal oxide containing ceramic colorant has a first concentration in said ceramic ink layer, said film-forming frit has a second concentration in said ceramic ink layer, such that the ratio of said first concentration to said second concentration is no greater than about 1.25.

2. The digitally printed assembly as recited in claim 1, wherein said solid, volatilizable carbonaeous binder, after it has been heated at a temperature greater than 500 degrees Centigrade for at least 6 minutes in an atmosphere containing at least about 15 volume percent of oxygen, is volatilized such that less than about 5 weight percent of said volatilizable carbonaceous binder remains as a solid phase.

3. The digitally printed assembly as recited in claim 1, wherein said film-forming frit has a melting temperature of greater than about 300 degrees Celsius.

4. The digitally printed assembly as recited in claim 1, wherein said metal oxide containing ceramic colorant has a particle size distribution such that all of its particles are smaller than about 20 microns.

5. The digitally printed assembly as recited in claim 1, wherein said substrate is a ceramic substrate.

6. The digitally printed assembly as recited in claim 1, wherein said substrate comprises at least about 80 weight percent of a plastic material.

7. The digitally printed assembly as recited in claim 1, wherein said substrate comprises at least about 80 weight percent of a ceramic material.

8. The digitally printed assembly as recited in claim 1, wherein said substrate comprises at least about 80 weight percent of a glass-ceramic material.

9. The digitally printed assembly as recited in claim 1, wherein said substrate has a melting temperature of at least about 580 degrees Celsius.

10. The digitally printed assembly as recited in claim 1, wherein said substrate has a melting temperature of from about 580 to about 1,200 degrees Celsius.

11. The digitally printed assembly as recited in claim 1 wherein said substrate comprises at least about 80 weight percent of glass.

12. The digitally printed assembly as recited in claim 1, wherein said digitally printed ceramic ink image is heat treated at a temperature of at least 350 degrees Celsius for at least about 5 minutes, wherein prior to said heat treating said digitally printed ceramic ink image has a first opacity, wherein after said heat treating said digitally printed ceramic ink image has a second opacity, and wherein the difference between said first opacity and said second opacity is less than about 15 percent.

13. The digitally printed assembly as recited in claim 12, wherein said difference between said first opacity and said second opacity is less than about 8 percent.

14. The digitally printed assembly as recited in claim 1, wherein said digitally printed ceramic ink image is heat treated at a temperature of at least 350 degrees Centigrade for at least about 5 minutes, wherein prior to said heat treating said digitally printed ceramic ink image has a first transmission density, wherein after said heat treating said digitally printed ceramic ink image has a second transmission density, and said second transmission density is at least about 0.8 times as great as said first transmission density.

15. The digitally printed assembly as recited in claim 1, wherein said digitally printed ceramic ink image is heat treated at a temperature of at least 350 degrees Centigrade for at least about 5 minutes, wherein prior to said heat treating said digitally printed ceramic ink image has a first reflection density, wherein after said heat treating said digitally printed ceramic ink image has a second reflection density, and said second reflection density is at least about 0.8 times as great as said first reflection density.

16. The digitally printed assembly as recited in claim 1, wherein said film-forming frit has a melting temperature of greater than 550 degrees Centigrade.

17. The digitally printed assembly as recited in claim 1, wherein said film-forming frit has a melting temperature of greater than 750 degrees Centigrade.

18. The digitally printed assembly as recited in claim 1, wherein said film-forming frit has a melting temperature of greater than 950 degrees Centigrade.

19. The digitally printed assembly as recited in claim 18, wherein said film-forming frit has a particle size distribution such that all of its particles are smaller than about 10 microns.

20. The digitally printed assembly as recited in claim 2, wherein at least about 80 weight percent of said particles of said film-forming frit are smaller than about 5 microns.

21. The digitally printed assembly as recited in claim 1, wherein said carbonaceous binder has a softening point of from about 45 to about 150 degrees Centigrade.

22. The digitally printed assembly as recited in claim 21 wherein said carbonaceous binder is comprised of a mixture of a first synthetic resin and a second synthetic resin.

23. The digitally printed assembly as recited in claim 22, wherein said carbonaceous binder is comprised of polybutylmethacryate and polymethylmethacrylate, and wherein said metal oxide containing ceramic colorant is an opacifying agent, said first melting point is the melting point of said opacifying agent, and said first melting point is at least about 350 degrees Centigrade.

24. The digitally printed assembly as recited in claim 1, wherein said metal oxide containing agent is an opacifying agent, and wherein said first refractive index of said opacifying agent is greater than 2.0.

25. The digitally printed assembly as recited in claim 24, wherein said first refractive index of said opacifying agent is greater than 2.4.

26. The digitally printed assembly as recited in claim 25, wherein all of the particles in said opacifying agent are smaller than 10 microns.

27. The digitally printed assembly as recited in claim 26, wherein at least about 80 weight percent of the particles in said opacifying agent are smaller than 5 microns.

28. The digitally printed assembly as recited in claim 24, wherein said pigment has a particle size distribution such that at least about 90 weight percent of its particles are from about 0.2 to about 20 microns.

29. The digitally printed assembly as recited in claim 28, wherein said pigment has a refractive index greater than about 1.4.

30. The digitally printed assembly as recited in claim 29, wherein said pigment has a refractive index greater than about 1.6.

* * * * *